(12) United States Patent
Wu et al.

(10) Patent No.: US 11,195,084 B1
(45) Date of Patent: Dec. 7, 2021

(54) NEURAL NETWORK TRAINING SYSTEM

(71) Applicant: SAS Institute Inc., Cary, NC (US)

(72) Inventors: Xinmin Wu, Cary, NC (US); Yingjian Wang, Apex, NC (US); Xiangqian Hu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/198,737

(22) Filed: Mar. 11, 2021

Related U.S. Application Data

(60) Provisional application No. 63/089,989, filed on Oct. 9, 2020.

(51) Int. Cl.
*G06N 3/04* (2006.01)
*G06N 3/08* (2006.01)

(52) U.S. Cl.
CPC ......... *G06N 3/0454* (2013.01); *G06N 3/0445* (2013.01); *G06N 3/084* (2013.01)

(58) Field of Classification Search
CPC ..... G06N 3/0454; G06N 3/0445; G06N 3/084
See application file for complete search history.

(56) References Cited

U.S. PATENT DOCUMENTS 11,023,806 B2 * 6/2021 Sawada ............... G06N 3/0454

OTHER PUBLICATIONS

Fu et al., "MultiCAM: Multiple Class Activation Mapping for Aircraft Recognition in Remote Sensing Images," 2019, Remote Sensing , 11, 544, pp. 1-18 (Year: 2019).*
Chattopadhyay et al., "Grad-CAM++: Improved Visual Explanations for Deep Convolutions Networks," Nov. 9, 2018, arXiv: 1710.11063v3 [cs.CV], 17 pages (Year: 2018).*
Perera et al., "Deep Transfer Learning for Multiple Class Novelty Detection," 2019, Proceedings of the IEEE/CVF Conference on Computer Vision and Pattern Recognition (CVPR), p. 11544-11552 (Year: 2019).*
Chen et al., "Adapting Grad-CAM for Embedding Networks," 2020, Proceedings of the IEEE/CVF Winter Conference on Applications of Computer Vision (WACV), pp. 2794-280 (Year: 2020).*

(Continued)

*Primary Examiner* — Miranda M Huang
*Assistant Examiner* — Catherine F Lee
(74) *Attorney, Agent, or Firm* — Bell & Manning, LLC

(57) ABSTRACT

A computing device trains a neural network machine learning model. A forward propagation of a first neural network is executed. A backward propagation of the first neural network is executed from a last layer to a last convolution layer of a plurality of convolutional layers to compute a gradient vector for first weight values of the last convolution layer using observation vectors. A discriminative localization map is computed for each observation vector with the gradient vector using a discriminative localization map function. A forward and a backward propagation of a second neural network is executed to compute a second weight value for each neuron of the second neural network using the discriminative localization map computed for each observation vector. A predefined number of iterations of the forward and the backward propagation of the second neural network is repeated.

30 Claims, 35 Drawing Sheets
(13 of 35 Drawing Sheet(s) Filed in Color)

(56) References Cited

OTHER PUBLICATIONS

Fu et al., "Look Closer to See Better: Recurrent Attention Convolutional Neural Network for Fine-grained Image Recognition," 2017, Proceedings of the IEEE Conference on Computer Vision and Pattern Recognition (CVPR), pp. 4438-4446 (Year: 2017).*

Wang et al., "Score-CAM: Improved Visual Explanations via Score-Weighted Class Activation Mapping," Oct. 3, 2019, arXiv: 1910.01279v1 [cs.CV], pp. 1-11 (Year: 2019).*

K. Simonyan and A. Zisserman, Very Deep Convolutional Networks for Large-Scale Image Recognition, arXiv:1409.1556 [cs.CV], 2014.

Szegedy C, Wei Liu, Yangqing Jia, et al. (2015) Going deeper with convolutions. In: 2015 IEEE Conference on Computer Vision and Pattern Recognition (CVPR). IEEE, pp. 1-9.

K. He, X.Zhang, S. Ren, and J.Sun. Deep residual learning for image recognition. In Proceedings of the IEEE conference on computer vision and pattern recognition, pp. 770-778, 2016.

M. T. Ribeiro, S. Singh, and C. Guestrin. "Why Should I Trust You?": Explaining the Predictions of Any Classier. In SIGKDD, 2016.

B. Zhou, A. Khosla, A. Lapedriza, A. Oliva, and A. Torralba. Learning Deep Features for Discriminative Localization. CVPR'16 (arXiv:1512.04150, 2015).

K. Simonyan, A. Vedaldi, and A. Zisserman. Deep inside convolutional networks: Visualising image classication models and saliency maps. CoRR, abs/1312.6034, 2013.

J. T. Springenberg, A. Dosovitskiy, T. Brox, and M. A. Riedmiller. Striving for Simplicity: The All Convolutional Net. CoRR, abs/1412.6806, 2014.

B. Zhou, A. Klosla and A. Oliver, "Learning Deep Features for Discriminative Localization", arXivpreprint arXir: 1512.04150, 2015.

R. Selvaraju, M. Cogswell and A. Das, "Grad-CAM: Visual Explanation from Deep Networks via Gradient-based Localization", arXivpreprint arXir:1610.02391,2017.

Ian J. Goodfellow, Jonathon Shlens, and Christian Szegedy. Explaining and harnessing adversarial examples. CoRR, abs/1412.6572, 2014. URL http://arxiv.org/abs/1412.6572.

Image Processing—Nearest Neighbour Interpolation, https://theaileamer.com/2018/12/29/image-processing-nearest-neighbour-interpolation/.

Don Lancaster, "A Review of Some Image Pixel Interpolation Algorithms," Synergetics, 2007.

Understanding Digital Image Interpolation, Cambridge in Colour A Learning Community for Photographers, Copyright 2005-2020 Cambridge in Colour.

* cited by examiner

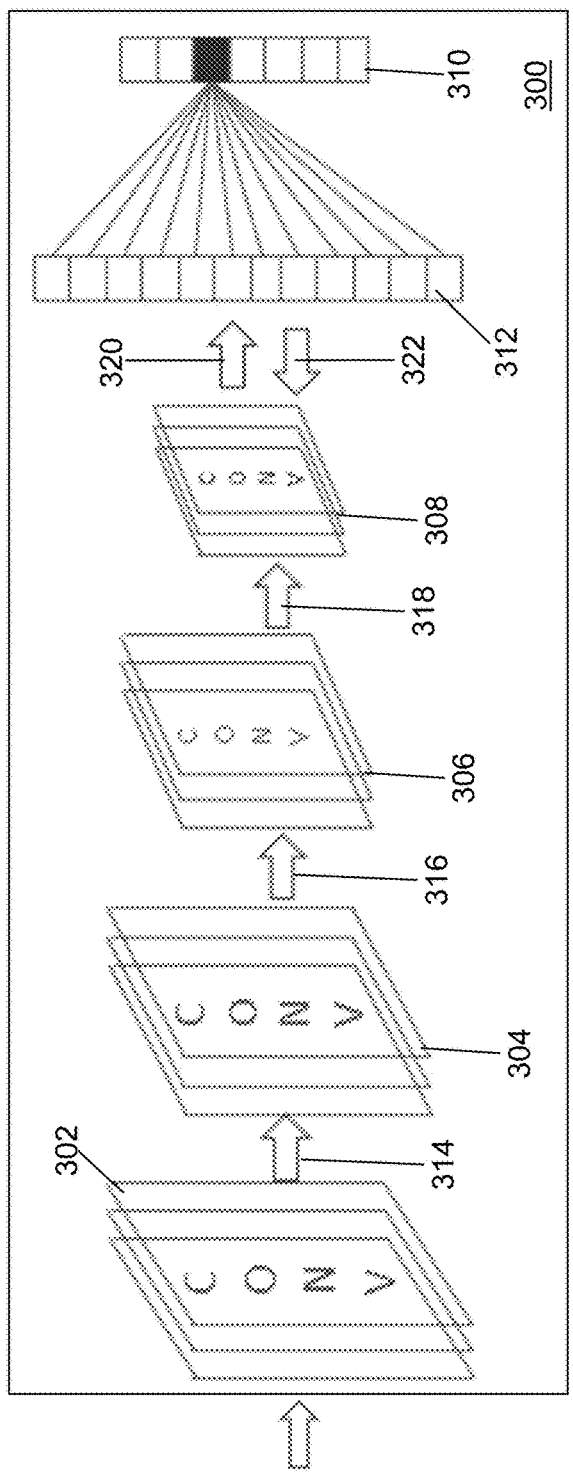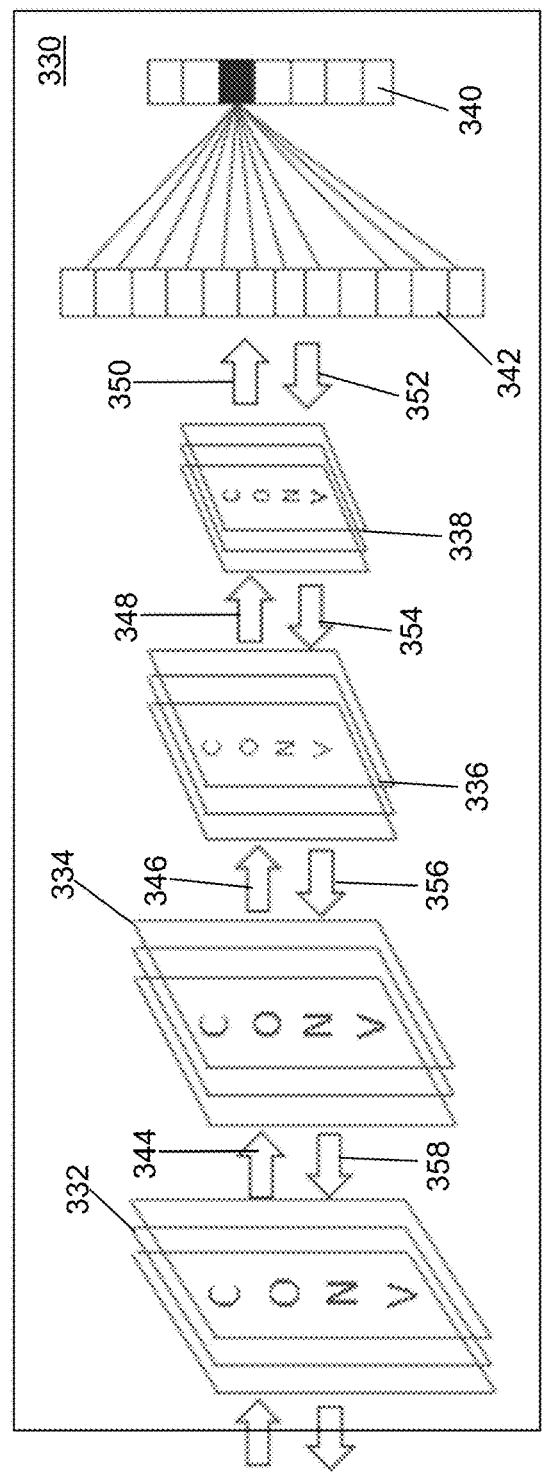
FIG. 3A
FIG. 3B

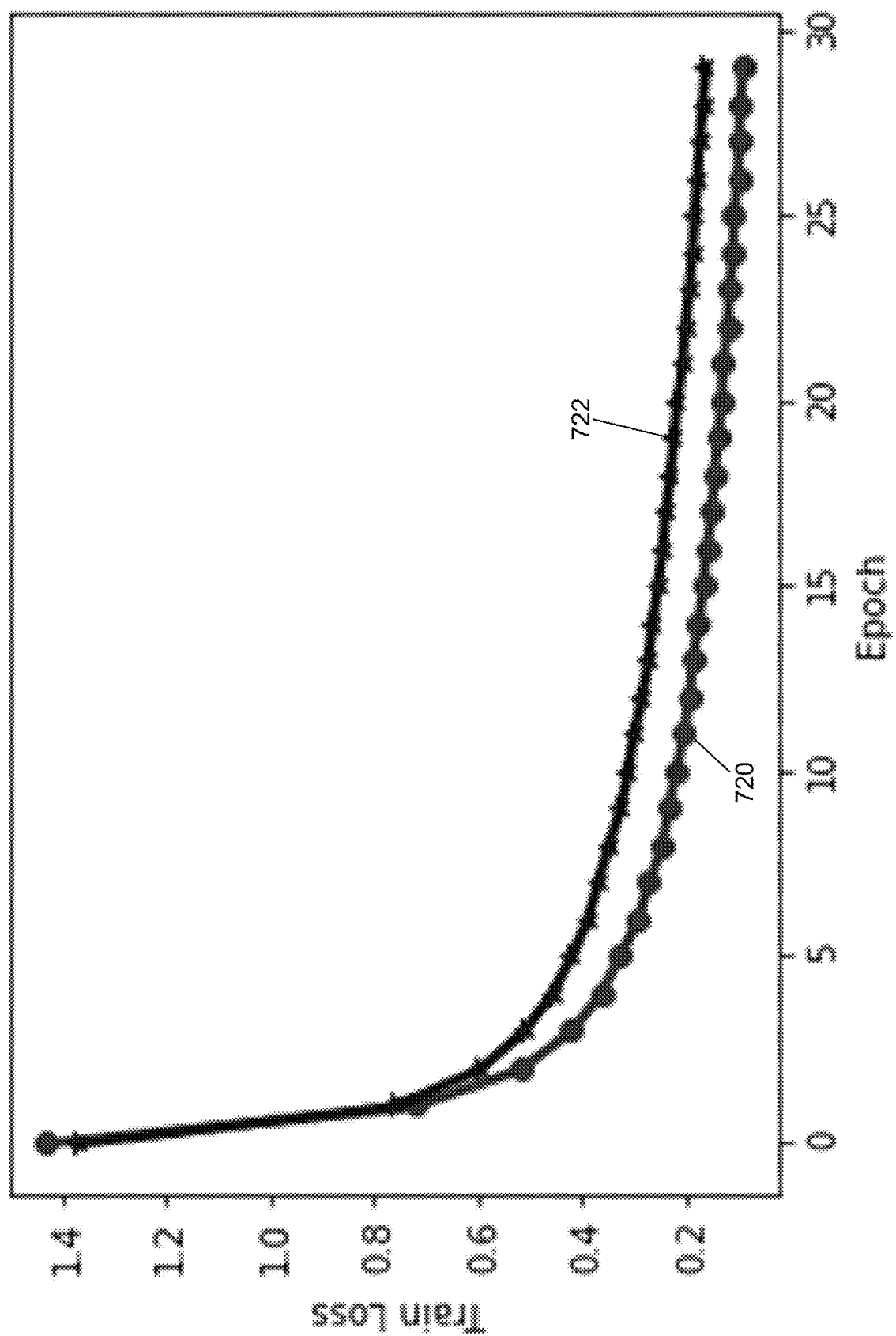

NEURAL NETWORK TRAINING SYSTEM

CROSS-REFERENCE TO RELATED APPLICATIONS

The present application claims the benefit of and priority under 35 U.S.C. § 119(e) to U.S. Provisional Patent Application No. 63/089,989 filed on Oct. 9, 2020.

BACKGROUND

Machine learning defines models that can be used to predict occurrence of an event, for example, from sensor or signal data, or recognize/classify an object, for example, in an image, in text, in a web page, in voice data, in sensor data, etc. For example, convolutional neural networks (CNNs) have played a key role in the area of deep learning and have proven to be successful in various tasks such as image classification, object detection, image segmentation, etc. However, deep learning models are generally considered black boxes due to a lack of understanding how they work internally. Traditionally, deep learning interpretation models have been applied to provide analysis of internal functions after training is complete.

SUMMARY

In an example embodiment, a non-transitory computer-readable medium is provided having stored thereon computer-readable instructions that, when executed by a computing device, cause the computing device to train a neural network machine learning model. A forward propagation of a first neural network is executed to compute a first weight value for each neuron of the first neural network using a plurality of observation vectors. The first neural network includes a layer type for each layer of a plurality of neural network layers, wherein the plurality of neural network layers include a plurality of convolutional layers. A backward propagation of the first neural network is executed from a last layer to a last convolution layer of the plurality of convolutional layers to compute a gradient vector for first weight values of the last convolution layer using the plurality of observation vectors. A discriminative localization map is computed for each observation vector of the plurality of observation vectors with the computed gradient vector using a discriminative localization map function. A forward and a backward propagation of a second neural network is executed to compute a second weight value for each neuron of the second neural network using the discriminative localization map computed for each observation vector of the plurality of observation vectors. A predefined number of iterations of the forward and the backward propagation of the second neural network is repeated. The computed weight value is output for each neuron of the second neural network to define a trained second neural network model.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to train a neural network machine learning model.

In an example embodiment, a method of training a neural network machine learning model is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 3A depicts an illustrative feedback neural network process in accordance with an illustrative embodiment.

FIG. 3B depicts an illustrative main neural network training process in accordance with an illustrative embodiment.

FIG. 7C shows a training loss improvement that results using the training application of FIG. 2 with the first dataset and with a third neural network architecture.

DETAILED DESCRIPTION

Neural networks are a class of machine learning models that consist of one or more transformation layers. Loosely speaking, each layer i may have $d_i$ inputs and $h_i$ outputs, may define a set of weights denoted by the matrix $W_i \in R^{h_i \times d_i}$ with a set of input $x_i \in R^{d_i}$ (neurons) and a bias term $\beta_i \in R^{h_i}$. The corresponding output of the layer is itself a set of neurons $\alpha_i(x_i) \in R^{h_i}$ defined by the transformation:

$$\alpha_i(x_i) = \sigma(W_i x_i + \beta_i),$$

where $\sigma$ denotes a corresponding activation function. If there are l layers, the union of the set of parameters $\cup\{W_i, \beta_i\}_{i=1}^{l}$ are the corresponding optimization variables or parameters. For simplicity, a map from this set to a weight vector $w \in R^d$ is assumed, where d corresponds to a total number of variables across all layers. Henceforth, all notation is with respect to the weight vector w.

Deep learning models are a class of neural networks consisting of many layers. As in other machine learning approaches, in deep learning, an objective function is minimized $$\min_{w \in R^d} f(w) = \frac{1}{N} \sum_{i=1}^{N} f_i(w),$$

where each objective function $f_i(w)$ provides a measure of accuracy for the deep learning model applied to the $i^{th}$ observation in training data 124 which includes N observations. For loss functions such as those arising in deep-learning models, $f(w)$ may be nonconvex while both d and N may be arbitrarily large.

A training application 122 provides an improved trained neural network model that more accurately classifies unclassified observation vectors and also provides an improved inference. Experiments shown and described herein demonstrate the improved classification accuracy and inference provide by training application 122 through use of discriminative localization mapping as part of the training process.

Figure 1:
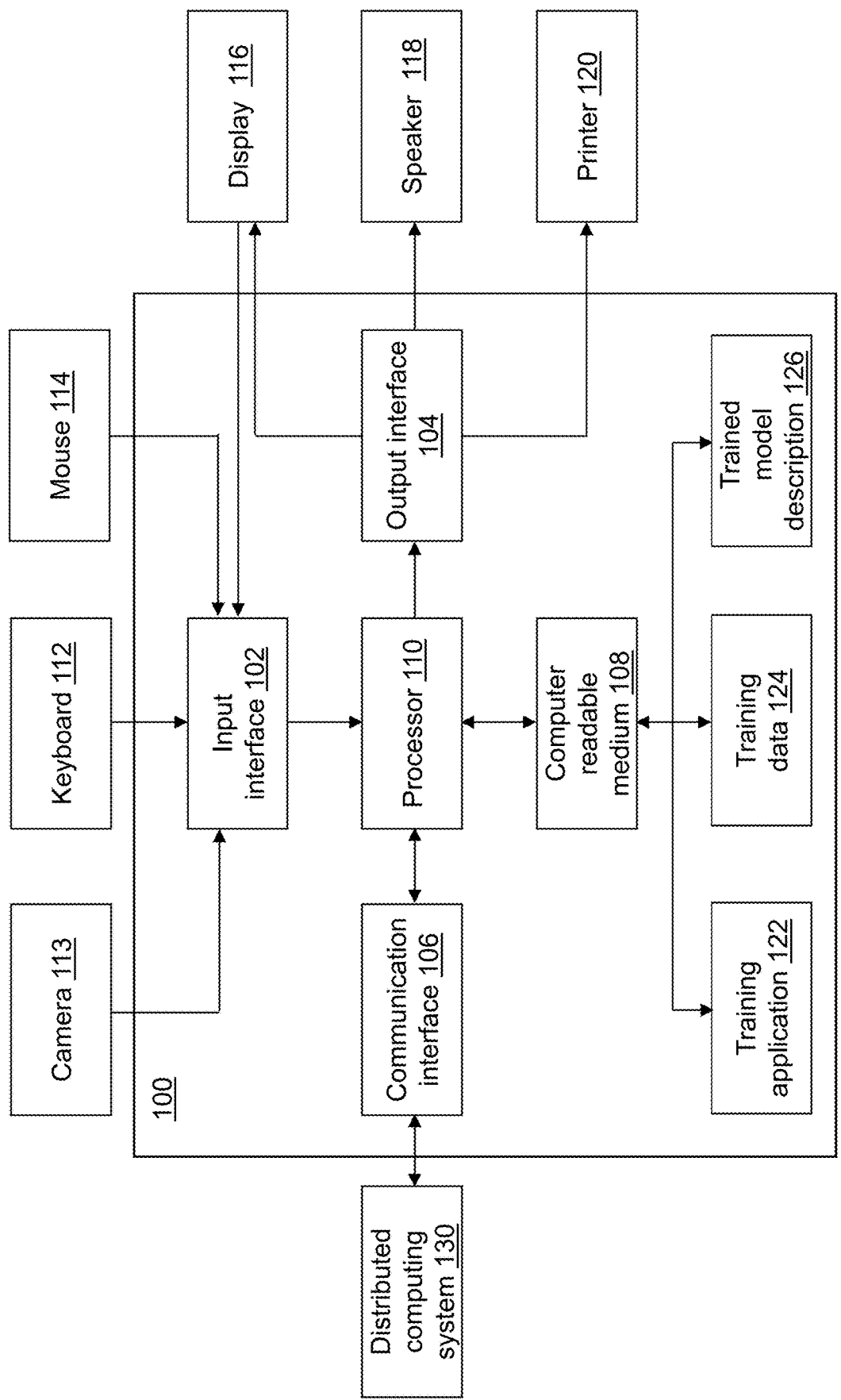
FIG. 1 depicts a block diagram of a training device in accordance with an illustrative embodiment.

Referring to FIG. 1, a block diagram of training device 100 is shown in accordance with an illustrative embodiment. Training device 100 may include an input interface 102, an output interface 104, a communication interface 106, a non-transitory computer-readable medium 108, a processor 110, training application 122, training data 124, and a trained model description 126. Fewer, different, and/or additional components may be incorporated into training device 100.

Input interface 102 provides an interface for receiving information from the user or another device for entry into training device 100 as understood by those skilled in the art. Input interface 102 may interface with various input technologies including, but not limited to, a keyboard 112, a camera 113, a mouse 114, a display 116, a track ball, a keypad, one or more buttons, etc. to allow the user to enter information into training device 100 or to make selections presented in a user interface displayed on display 116. The same interface may support both input interface 102 and output interface 104. For example, display 116 comprising a touch screen provides a mechanism for user input and for presentation of output to the user. Training device 100 may have one or more input interfaces that use the same or a different input interface technology. The input interface technology further may be accessible by training device 100 through communication interface 106.

Output interface 104 provides an interface for outputting information for review by a user of training device 100 and/or for use by another application or device. For example, output interface 104 may interface with various output technologies including, but not limited to, display 116, a speaker 118, a printer 120, etc. Training device 100 may have one or more output interfaces that use the same or a different output interface technology. The output interface technology further may be accessible by training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Training device 100 may have one or more communication interfaces that use the same or a different communication interface technology. For example, training device 100 may support communication using an Ethernet port, a Bluetooth antenna, a telephone jack, a USB port, etc. Data and/or messages may be transferred between training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Training device 100 also may have one or more drives that support the loading of a memory media such as a CD, DVD, an external hard drive, etc. One or more external hard drives further may be connected to training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with defining trained model description 126 from data stored in training data 124. Trained model description 126 may be used to predict a characteristic value for data stored training data 124 or in a second data 424 (shown referring to FIG. 4). The characteristic value may include one or more values that may be a probability that the associated observation vector has a predefined characteristic associated with each probability. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. Merely for illustration, training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training data 124 may include, for example, a plurality of rows and a plurality of columns. The plurality of rows may be referred to as observation vectors or records (observations), and the columns may be referred to as variables. In an alternative embodiment, training data 124 may be transposed. The plurality of variables defines a vector $x_i$ for each observation vector i=1, 2, . . . , N, where N is a number of the observation vectors included in training data 124. Training data 124 may include additional variables that are not included in the plurality of variables. One or more variables of the plurality of variables may describe a characteristic of a physical object. For example, if training data 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in training data 124 for analysis and processing or streamed to training device 100 as it is generated. Training data 124 may include data captured as a function of time for one or more physical objects. The data stored in training data 124 may be captured at different time points periodically, intermittently, when an event occurs, etc. Training data 124 may include data captured at a high data rate such as 200 or more observation vectors per second for one or more physical objects. One or more columns of training data 124 may include a time and/or date value. Training data 124 may include data captured under normal and abnormal operating conditions of the physical object.

The data stored in training data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in training data 124 may be generated as part of the Internet of Things (IoT), where things (e.g., machines, devices, phones, sensors) can be connected to networks and the data from these things collected and processed within the things and/or external to the things before being stored in training data 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training data 124.

The data stored in training data 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Training data 124 may be stored on computer-readable medium 108 or on one or more computer-readable media of distributed computing system 130 and accessed by training device 100 using communication interface 106, input interface 102, and/or output interface 104. Training data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training data 124 may be stored using various data structures as known to those skilled in the art including one or more files of a file system, a relational database, one or more tables of a system of tables, a structured query language database, etc. on training device 100 or on distributed computing system 130. Training device 100 may coordinate access to training data 124 that is distributed across distributed computing system 130 that may include one or more computing devices. For example, training data 124 may be stored in a cube distributed across a grid of computers as understood by a person of skill in the art. As another example, training data 124 may be stored in a multi-node Hadoop® cluster. For instance, Apache™ Hadoop® is an open-source software framework for distributed computing supported by the Apache Software Foundation. As another example, training data 124 may be stored in a cloud of computers and accessed using cloud computing technologies, as understood by a person of skill in the art. The SAS® LASR™ Analytic Server may be used as an analytic platform to enable multiple users to concurrently access data stored in training data 124. The SAS Viya open, cloud-ready, in-memory architecture also may be used as an analytic platform to enable multiple users to concurrently access data stored in training data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
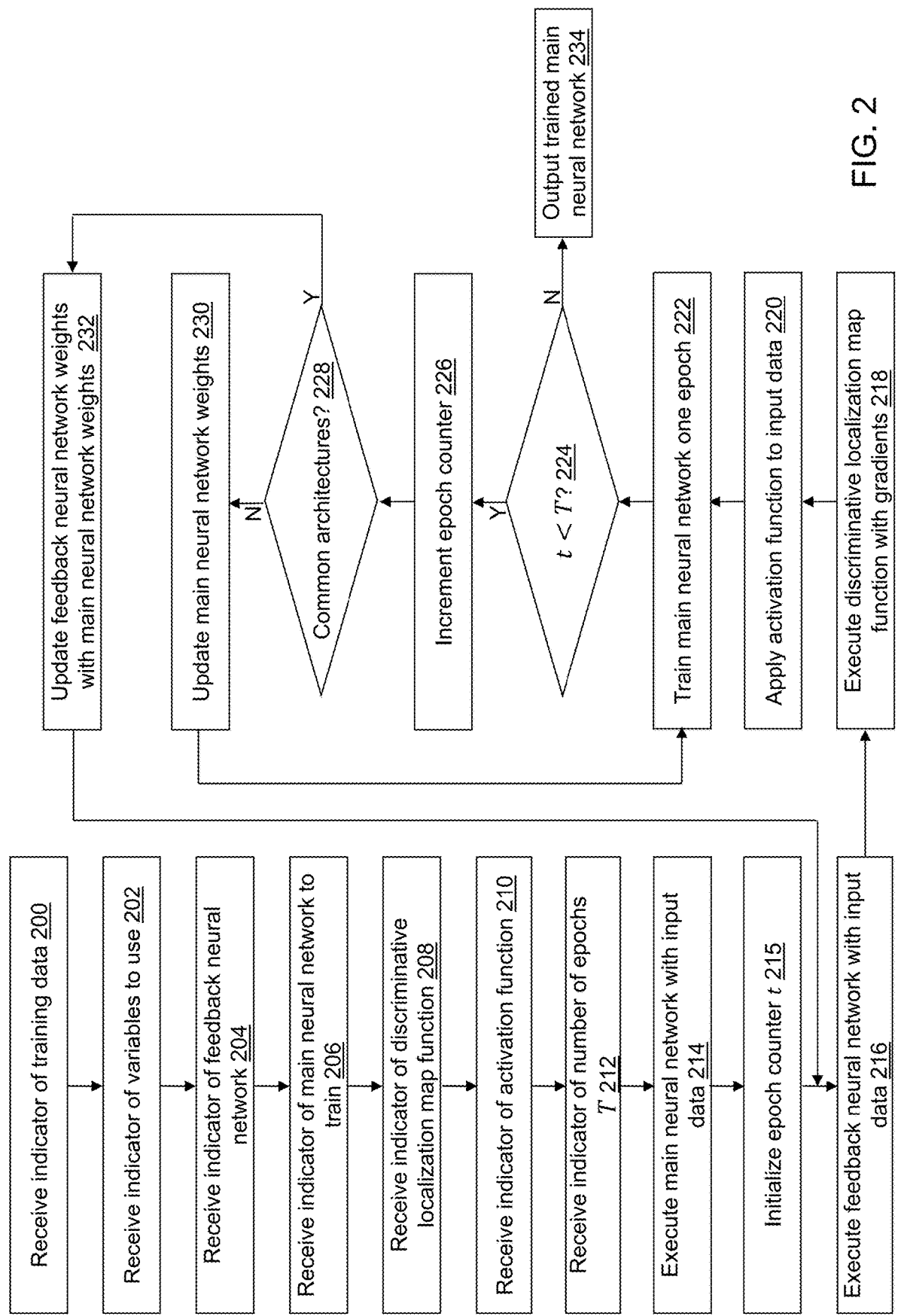
FIG. 2 depicts a flow diagram illustrating examples of operations performed by a training application of the training device of FIG. 1 in accordance with an illustrative embodiment.

Referring to FIG. 2, example operations associated with training application 122 are described. Additional, fewer, or different operations may be performed depending on the embodiment of training application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute training application 122, which causes presentation of a first user interface window, which may include a plurality of menus and selectors such as drop-down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122. The operations of training application 122 further may be performed in parallel using a plurality of threads and/or a plurality of worker computing devices.

In an operation 200, a first indicator may be received that indicates training data 124. For example, the first indicator indicates a location and a name of training data 124. As an example, the first indicator may be received by training application 122 after selection from a user interface window or after entry by a user into a user interface window. In an alternative embodiment, training data 124 may not be selectable. For example, a most recently created dataset may be used automatically.

In an operation 202, a second indicator may be received that indicates a plurality of variables or features to include in training a neural network model using training data 124. For example, the second indicator may indicate a plurality of column numbers or a plurality of column names. As another option, all of the columns except a last column may be used by default. Each observation vector $x_i$, i=1, . . . , d read from training data 124 may include a value for each variable of the plurality of variables to define d dimensions or features. Training data 124 includes a set of observation vectors $X=[x_{j,i}]$, i=1, . . . , d, j=1, . . . , N. When a value for a variable of the plurality of variables is missing, the observation vector may not be included in the number of observation vectors N, or a value may be computed for the missing variable, for example, based on neighbor values, etc. Training data 124 may be partitioned or otherwise divided into training, validation, and/or test datasets as part of training a neural network model. For example, each variable may be a pixel of an image so that d represents a number of pixels that define each image.

The second indicator may further indicate a target variable (column) associated with each observation vector included in training data 124 to define a target variable vector $y_i$, i=1, . . . , N. The target variable may be a label for the associated observation vector, where a target variable value of a respective observation vector is a label or class selected for the respective observation vector. For example, the label may indicate a characteristic determined about the observation vector. For example, the third indicator indicates a variable to use by name, column number, etc. In an alternative embodiment, the third indicator may not be received. For example, the last variable in training data 124 may be used automatically as the target variable vector $y_i$.

In an operation 204, a third indicator may be received that indicates an architecture of a feedback neural network model. The third indicator may be received by training application 122 from a user interface window or after entry by a user into a user interface window. A default value for the architecture of the feedback neural network model may further be stored, for example, in computer-readable medium 108.

For illustration, the architecture of the feedback neural network model defines a plurality of layers and their connectivity including a type of each layer. Illustrative layer types include an input layer, a convolution layer, a batch normalization layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters. For example, the architecture of the feedback neural network model may define a convolutional neural network, and/or a deep, fully connected neural network. Initial weights may further be provided for each neuron.

For illustration, the architecture of the feedback neural network model may be selected from "VCG", "GoogleNet", "ResNet", "DenseNet", etc. For illustration, VCG may be an architecture described in a paper by K. Simonyan and A. Zisserman titled *Very Deep Convolutional Networks for Large-Scale Image Recognition* published at arXiv: 1409.1556 [cs.CV] in 2014. For illustration, GoogleNet may be an architecture described in a paper by C. Szegedy, Wei Liu, and Yangqing Jia, et al. titled *Going deeper with convolutions* published in the Proceedings of the IEEE Conference on Computer Vision and Pattern Recognition on pages 1-9 in 2015. For illustration, ResNet may be an architecture described in a paper by K. He, X. Zhang, S. Ren, and J. Sun titled *Deep residual learning for image recognition* published in the Proceedings of the IEEE Conference on Computer Vision and Pattern Recognition IEEE pages 770-778 in 2016. For illustration, DenseNet may be an architecture described in a paper by G. Huang, Z. Liu, L. Maaten, and K. Weinberger titled Densely connected convolutional networks published in the Proceedings of the IEEE Conference on Computer Vision and Pattern Recognition IEEE volume 1, page 3 in 2017.

Referring to FIG. 3A, an architecture 300 is shown in accordance with an illustrative embodiment. Training data 124 includes images such as an image of a car 301. Architecture 300 includes a first convolution layer 302 that provides input 314 to a second convolution layer 304 that provides input 316 to a third convolution layer 306 that provides input 318 to a fourth convolution layer 308 that provides input 320 to an output layer 310 that provides a predicted logit array for each image. The predicted logit array includes a predicted likelihood value or score for each unique value of the target variable value $y_i$ (class) of each respective observation vector. A maximum predicted likelihood value may be used to define a category or class for each respective observation vector. A weight array 312 may be defined for each observation vector (e.g., image) included in training data 124 and for each entry in the predicted logit array. A weight is included in weight array 312 for each feature map of fourth convolution layer 308. Gradients 322 may be computed and fed back through back propagation from output layer 310 to a last convolution layer, which in the illustrative embodiment is fourth convolution layer 308. Initial weights may further be provided for each neuron.

Referring again to FIG. 2, in an operation 206, a fourth indicator indicates an architecture of a main neural network model to be trained to predict a value for the target variable. For illustration, the architecture of the main neural network model may be selected from "VCG", "GoogleNet", "ResNet18", "DenseNet121", etc. Resnet18 is a version of the ResNet family of neural networks with 18 convolution layers. DenseNet121 is a version of the DenseNet family of neural networks with 121 convolution layers. The main neural network model and the feedback neural network model may or may not have the same architecture. The fourth indicator may be received by training application 122 from a user interface window or after entry by a user into a user interface window. A default value for the architecture of the main neural network model may further be stored, for example, in computer-readable medium 108.

For illustration, the architecture of the main neural network model defines a plurality of layers and their connectivity including a type of each layer. Illustrative layer types include an input layer, a convolution layer, a batch normalization layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. For example, the architecture of the feedback neural network model may define a convolutional neural network, and/or a deep, fully connected neural network. An automatic tuning method (autotune option) may be specified with one or more values or ranges of values to evaluate for each hyperparameter. The automatic tuning process may be used to identify the best settings for the hyperparameters though the hyperparameters may optionally be selected as an input option by a user.

Referring to FIG. 3B, a second architecture 330 is shown in accordance with an illustrative embodiment. Masked training data includes masked images computed from training data 124 after application of the feedback neural network and discriminative localization mapping. Second architecture 330 includes a first convolution layer 332 that provides input 344 to a second convolution layer 334 that provides input 346 to a third convolution layer 336 that provides input 348 to a fourth convolution layer 338 that provides input 350 to an output layer 340 that provides a predicted logit array for each image. The predicted logit array includes a predicted likelihood value or score for each unique value of the target variable value $y_i$ (class) of each respective observation vector. A maximum predicted likelihood value may be used to define a category or class for each respective observation vector. A weight array 342 may be defined for each observation vector (e.g., image) included in training data 124 and for each entry in the predicted logit array. A weight is included in weight array 342 for each feature map of fourth convolution layer 338.

A measure of the error in terms of an objective function is fed back to drive an adjustment of weights associated with each neuron of second architecture 330. Gradients may be computed each iteration through backward propagation through second architecture 330 and also used to drive the adjustment of weights associated with each neuron of second architecture 330. For example, gradients 352 computed from output layer 340 are fed back to fourth convolution layer 338; gradients 354 computed from fourth convolution layer 338 are fed back to third convolution layer 336; gradients 356 computed from third convolution layer 336 are fed back to second convolution layer 334; and gradients 358 computed from second convolution layer 334 are fed back to first convolution layer 332.

Referring again to FIG. 2, in an operation 208, a fifth indicator of a discriminative localization map function may be received. The discriminative localization map function provides visual insight into why a deep neural network results in a predicted target variable value, and which pixels in the input image are important relative to others. The discriminative localization map function can be applied to evaluate a feature importance of input layers of a neural network to expose an implicit attention of the feedback neural network on input images. In an alternative embodiment, the fifth indicator may not be received. A default value may be stored, for example, in computer-readable medium 108 and used automatically. In another alternative embodiment, the discriminative localization map function may not be selectable. Instead, a specific discriminative localization map function may be implemented and used automatically. For example, the discriminative localization map function may be selected from "CAM", "Grad-CAM", "Grad-CAM++", "Fast Grad", "Saliency Map", etc.

For example, CAM (Class activation mapping) may refer to a discriminative localization map function described in a paper by B. Zhou, A. Khosla, A. Lapedriza, A. Oliva, and A. Torralba titled *Learning Deep Features for Discriminative Localization* published in the Proceedings of the IEEE Conference on Computer Vision and Pattern Recognition in 2016. For example, Grad-CAM may refer to a discriminative localization map function described in a paper by R. Selvaraju, M. Cogswell and A. Das titled *Grad-CAM: Visual Explanation from Deep Networks via Gradient-based Localization* published at arXivpreprint arXir: 1610.02391 in 2017. For example, Grad-CAM++ may refer to a discriminative localization map function described in a paper by A. Chattopadhay, A. Sarkar, P. Howlader and V. N. Balasubramanian, titled *Grad-CAM++: Generalized Gradient—Based Visual Explanations for Deep Convolutional Networks* published on pages 839-847 for the IEEE Winter Conference on Applications of Computer Vision in 2018. For example, Fast Grad may refer to a discriminative localization map function described in a paper by Ian J. Goodfellow, Jonathon Shlens, and Christian Szegedy titled *Explaining and harnessing adversarial examples* published as a conference paper at the International Conference on Learning Representations in 2015. For example, Saliency Map may refer to a discriminative localization map function described in a paper by K. Simonyan, A. Vedaldi, and A. Zisserman titled *Deep inside convolutional networks: Visualising image classification models and saliency maps* published in CoRR, abs/ 1312.6034 in 2014.

In an operation 210, a sixth indicator of an activation function may be received. In an alternative embodiment, the sixth indicator may not be received. For example, a default activation function may be stored, for example, in computer-readable medium 108 and used automatically or no activation function may be used. In another alternative embodiment, the activation function may not be selectable. Instead, a fixed, predefined activation function may be used. For illustration, a default activation function may provide up sampling based on a digital image interpolation technique such as nearest neighbor interpolation, bilinear interpolation, bicubic interpolation, etc. Other activation functions may include a rectified linear unit, an identity function, a Softmax function, a hyperbolic tangent function, a sigmoid function, etc.

In an operation 212, a seventh indicator of a number of epochs T may be received. In an alternative embodiment, the seventh indicator may not be received. For example, a default value may be stored, for example, in computer-readable medium 108 and used automatically. In another alternative embodiment, the value of the number of epochs T may not be selectable. Instead, a fixed, predefined value may be used. For illustration, a default value for the number of epochs T value may be T=100 though other values may be used. The number of epochs T indicates a number of iterations to train the main neural network.

In an operation 214, the main neural network defined by the architecture specified in operation 204 is trained with images from training data 124 a predefined number of starting epochs. Operation 214 provides a warm start to the main neural network. In an illustrative embodiment, the predefined number of starting epochs is ten though the predefined number of starting epochs may be any value greater than or equal to zero, where a value of zero indicates a warm start is not performed.

In an operation 215, an epoch counter t is initialized. For example, an epoch counter t is initialized, for example, as t=0.

In an operation 216, a forward propagation of the feedback neural network defined by the architecture indicated in operation 204 is executed with the observation vectors included in training data 124 to compute weight values for each neuron of the feedback neural network. A backward propagation of the feedback neural network is executed from a last layer to a last convolution layer to compute a gradient vector $g_1$ fed back to the last convolution layer included in the feedback neural network such as gradients 322 of FIG. 3A.

Referring again to FIG. 2, in an operation 218, the discriminative localization map function indicated in operation 208 is executed with the gradient vector $g_1$ to define a discriminative localization map $g_2$. The discriminative localization map for each respective observation vector is selected based on the target variable value defined by the target variable for the respective observation vector.

Figure 3C:
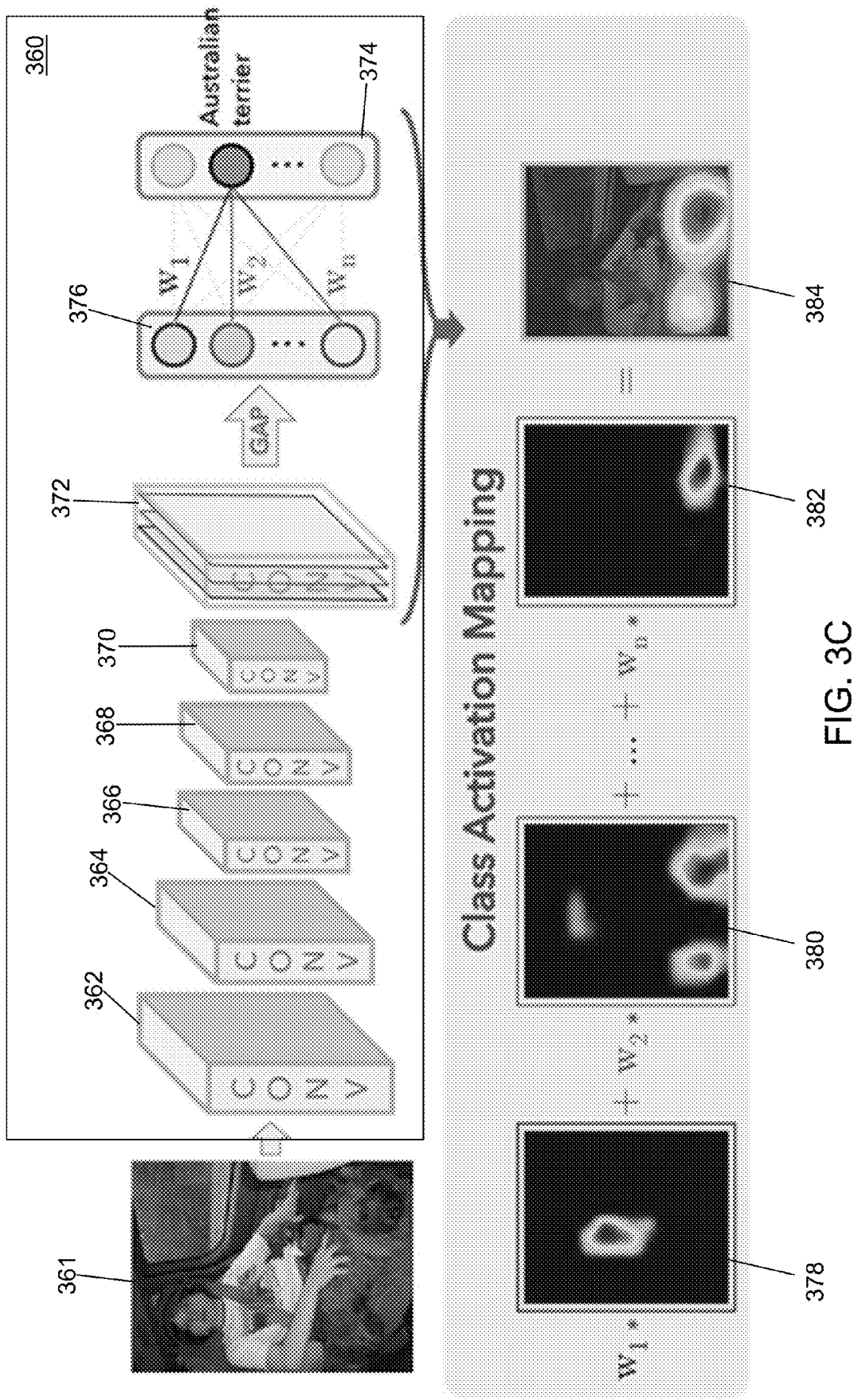
FIG. 3C depicts an illustrative neural network with discriminative localization mapping in accordance with an illustrative embodiment.

For example, referring to FIG. 3C, a third architecture 360 is shown with a discriminative localization map function in accordance with an illustrative embodiment. For example, third architecture 360 is described in a paper by B. Zhou et al. titled *Learning Deep Features for Discriminative Localization* published in IEEE Conference on Computer Vision and Pattern Recognition in 2016. An image 361 is shown input to third architecture 360 for illustration. Third architecture 360 includes a first convolution layer 362 that provides input to a second convolution layer 364 that provides input to a third convolution layer 366 that provides input to a fourth convolution layer 368 that provides input to a fifth convolution layer 370 that provides input to a sixth convolution layer 372 that provides input to an output layer 374 that provides a predicted logit array for each image. A weight array 376 may be defined for each observation vector (e.g., image) included in training data 124 and for each entry in the predicted logit array. A weight is included in weight array 376 for each feature map of sixth convolution layer 372.

In the illustrative embodiment of FIG. 3C, the discriminative localization map function computes a sum from each feature map multiplied by a respective weight included in weight array 376. For example, a first feature map 378 of sixth convolution layer 372 is multiplied by a first weight value, a second feature map 380 of sixth convolution layer 372 is multiplied by a second weight value, . . . , and an $n^{th}$ feature map 382 of sixth convolution layer 372 is multiplied by an $n^{th}$ weight value. The weighted feature maps of sixth convolution layer 372 are summed to define a discriminative localization map 384 for a specific class such as Australian terrier. The weights are computed from the gradient vector $g_1$. Discriminative localization map 384 is selected for image 361 based on the target variable value defined by the target variable indicating "Australian terrier".

In an operation 220, the activation function indicated in operation 210, if any, is applied to the defined discriminative localization map to define a modified discriminative localization map for each image included in training data 124. For example, the activation function may up sample the discriminative localization map defined for each image to a dimension of each respective image in training data 124.

For example, a biased binary feature map $G_{ij}$ is computed based on the discriminative localization mapping function using $$G_{ij} = \begin{cases} 1 \text{ if } \sum_K \beta_{ij}^k A_{ij}^k \geq a \\ 0 \text{ otherwise} \end{cases},$$

where $$\beta_{ij}^k = \frac{\partial y^l}{\partial A_{ij}^k},$$

i and j are indices into a feature map $A^k$ of a channel k in the last convolution layer, and K is a total number of channels in the last convolution layer. $\beta_{ij}^k$ are the gradient for the elements in the feature map $A^k$ with respect to the logit y of ground truth class l, and a is a threshold for outliers among the elements that may be defined by the user with the discriminative localization map function in operation 208. In an illustrative embodiment, $\alpha=0.1$. The value of $G_{ij}$ is zero when the value of $\Sigma_K \beta_{ij}^k A_{ij}^k < \alpha$ and is considered an outlier. Otherwise, the value of $G_{ij}$ is one.

$G_{ij}$ is up-sampled to the original size of the respective observation vector and attention is applied to each pixel. When based on Grad-CAM, a rectified linear unit may not be applied because negative pixels in Grad-CAM are likely to belong to other class levels in the respective observation vector, and those pixels will most likely fall into the outliers anyway. The goal is to determine which regions in each observation vector are least relevant to the main neural network model and to minimize an intensity of those regions. For example, the modified discriminative localization map $X_{mn}'$ to which attention has been applied is computed using $X_{mn}'=F(G_{ij})X_{mn}$, where $X_{mn}$ is the observation vector from training data 124 having dimensions m×n, and F is the activation function that up samples the image. $X_{mn}'$ may be referred to as an image after feature engineering. $X_{mn}'$ is input to the main neural network to be trained. The masked regions $G_{ij}=0$ for each respective observation vector represent the least important areas with respect to predicting a true class based on the target variable value defined by the target variable for the respective observation vector.

In an operation 222, the main neural network defined by the architecture specified in operation 206 is executed with the modified discriminative localization map, if an activation function is indicated in operation 210, or with the discriminative localization map, if no activation function is indicated in operation 210, to compute a weight vector $w_k$ and a gradient vector $g_k$ that include values for each neuron of the neural network.

In an operation 224, a determination is made concerning whether t<T. When t<T, processing continues in an operation 226. When t≥T, processing continues in an operation 234.

In operation 226, the epoch counter t is incremented, for example, using t=t+1.

In an operation 228, a determination is made concerning whether the feedback neural network and the main neural network have a common architecture. When feedback neural network and the main neural network have the common architecture, processing continues in an operation 232.

When feedback neural network and the main neural network do not have the common architecture, processing continues in an operation 230. For example, if the layers defined for the feedback neural network and the main neural network are identical, they have the common architecture.

In operation 230, the weights of the main neural network are updated and fed back to train the main neural network another epoch, and processing continues in operation 222.

In operation 232, the weights of the feedback neural network are updated with the weights of the main neural network and fed back to evaluate the feedback neural network another epoch, and processing continues in operation 216 to compute a new $G_{ij}$ and $X_{mn}'$.

In operation 234, a trained model description of the main neural network including the weights $w_k$ is output. For example, the trained model description may be output to trained model description 126. The trained model description may include the main neural network architecture. For illustration, the trained model description may be stored using the ASTORE procedure provided by SAS® Visual Data Mining and Machine Learning software.

To summarize, the feedback neural network takes images from training data 124 as input, while the main neural network to be trained is updated based on the input images with attention generated from the feedback neural network and the discriminative localization maps. The feedback neural network is in evaluation mode and its purpose is to compute discriminative localization maps using model interpretation techniques. An activation function transforms the computed discriminative localization maps through a series of one or more actions like up sampling to apply the transformed discriminative localization maps to the input images. The feedback neural network and the main neural network to be trained are not required to have a common architecture. If the architectures are the same, the localization map of the feedback neural network is updated using new parameters from a most recent epoch of the main neural network training. Though described with reference to image classification, training application 122 can be applied to various convolutional neural network related tasks such as autoencoder, image captioning, visual question answering models, etc.

In the model forward path, the masked images make the model parameters with respect to masked areas (zero blocks) insignificant, shifting the feature maps in a current convolution layer to capture more relevant features. Bigger zero blocks lead to smaller zero blocks in the convolution layers downstream, so this effect continues through the main neural network. Experimental results discussed below show that when existing models are extended to use training application 122, a higher accuracy and a lower loss result without any modification of the parameters of the main neural network. Attention shifts to areas that are not masked helping the training process converge faster with lower loss values. The added attention to the original images serves as a regularization similar to a drop out effect to prevent over fitting and make the trained model generalize well.

Figure 4:
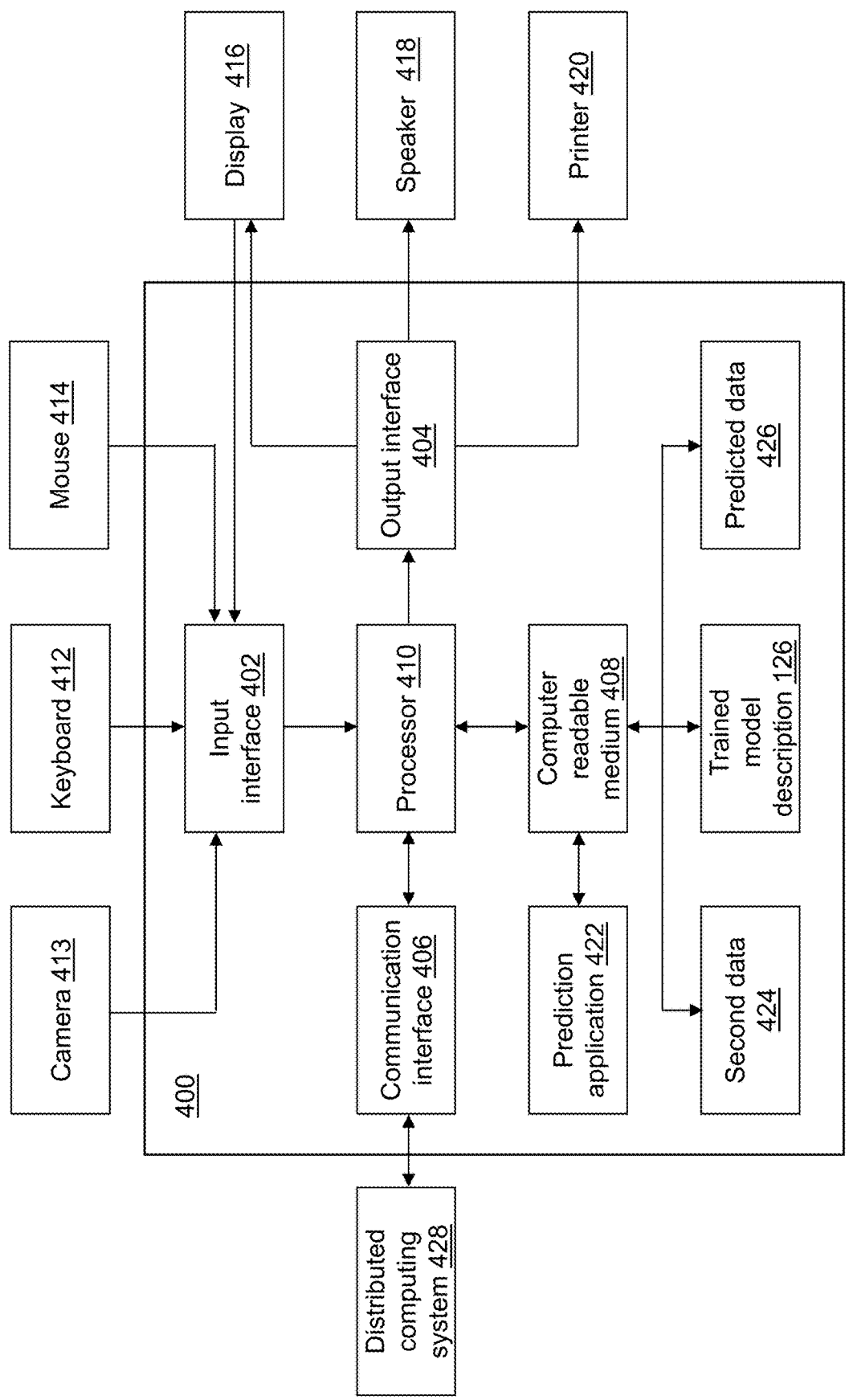
FIG. 4 depicts a block diagram of a prediction device in accordance with an illustrative embodiment.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a prediction application 422, trained model description 126, second data 424, and predicted data 426. Fewer, different, and/or additional components may be incorporated into prediction device 400. Prediction device 400 and training device 100 may be the same or different devices.

Second input interface 402 provides the same or similar functionality as that described with reference to input interface 102 of training device 100 though referring to prediction device 400. Second output interface 404 provides the same or similar functionality as that described with reference to output interface 104 of training device 100 though referring to prediction device 400. Second communication interface 406 provides the same or similar functionality as that described with reference to communication interface 106 of training device 100 though referring to prediction device 400. Data and messages may be transferred between prediction device 400 and a distributed computing system 428 using second communication interface 406. Distributed computing system 130 and distributed computing system 428 may be the same or different computing systems. Second computer-readable medium 408 provides the same or similar functionality as that described with reference to computer-readable medium 108 of training device 100 though referring to prediction device 400. Second processor 410 provides the same or similar functionality as that described with reference to processor 110 of training device 100 though referring to prediction device 400.

Prediction application 422 performs operations associated with classifying or predicting a characteristic value related to each observation vector included in second data 424. The predicted characteristic value may be stored in predicted data 426 to support various data analysis functions as well as provide alert/messaging related to each prediction that may be a classification. Dependent on the type of data stored in training data 124 and second data 424, prediction application 422 may identify anomalies as part of process control, for example, of a manufacturing process, for machine condition monitoring, for image classification, for intrusion detection, for fraud detection, for text recognition, for voice recognition, for language translation, etc. Some or all of the operations described herein may be embodied in prediction application 422. The operations may be implemented using hardware, firmware, software, or any combination of these methods.

Referring to the example embodiment of FIG. 4, prediction application 422 is implemented in software (comprised of computer-readable and/or computer-executable instructions) stored in second computer-readable medium 408 and accessible by second processor 410 for execution of the instructions that embody the operations of prediction application 422. Prediction application 422 may be written using one or more programming languages, assembly languages, scripting languages, etc. Prediction application 422 may be integrated with other analytic tools. As an example, prediction application 422 may be part of an integrated data analytics software application and/or software architecture such as that offered by SAS Institute Inc. of Cary, N.C., USA. For example, prediction application 422 may be part of SAS® Enterprise Miner™ developed and provided by SAS Institute Inc. of Cary, N.C., USA. Merely for further illustration, prediction application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA.

One or more operations of prediction application 422 further may be performed by an ESPE on an event stream instead of reading observation vectors from second data 424. Prediction application 422 and training application 122 may be the same or different applications that are integrated in various manners to train a neural network model using training data 124 that may be distributed on distributed computing system 130 and to execute the trained neural network model to predict the characteristic of each observation vector included in second data 424 that may be distributed on distributed computing system 428.

Prediction application 422 may be implemented as a Web application. Prediction application 422 may be integrated with other system processing tools to automatically process data generated as part of operation of an enterprise, to classify data in the processed data, and/or to provide a warning or alert associated with the prediction using second input interface 402, second output interface 404, and/or second communication interface 406 so that appropriate action can be initiated in response. For example, a warning or an alert may be presented using a second display 416, a second speaker 418, a second printer 420, etc. or sent to one or more computer-readable media, display, speaker, printer, etc. of distributed computing system 428.

Training data 124 and second data 424 may be generated, stored, and accessed using the same or different mechanisms. The target variable is not defined in second data 424. Similar to training data 124, second data 424 may include a plurality of rows and a plurality of columns with the plurality of rows referred to as observations or records, and the columns referred to as variables that are associated with an observation. Second data 424 may be transposed.

Similar to training data 124, second data 424 may be stored on second computer-readable medium 408 or on one or more computer-readable media of distributed computing system 428 and accessed by prediction device 400 using second communication interface 406. Data stored in second data 424 may be a sensor measurement or a data communication value, for example, from a camera 413, may be generated or captured in response to occurrence of an event or a transaction, generated by a device such as in response to an interaction by a user with the device, for example, from a second keyboard 412 or a second mouse 414, etc. The data stored in second data 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second data 424 may be captured at different time points periodically, intermittently, when an event occurs, etc. One or more columns may include a time value. Similar to training data 124, data stored in second data 424 may be generated as part of the IoT, and some or all data may be pre- or post-processed by an ESPE.

Similar to training data 124, second data 424 may be stored in various compressed formats such as a coordinate format, a compressed sparse column format, a compressed sparse row format, etc. Second data 424 further may be stored using various structures as known to those skilled in the art including a file system, a relational database, a system of tables, a structured query language database, etc. on prediction device 400 and/or on distributed computing system 428. Prediction device 400 may coordinate access to second data 424 that is distributed across a plurality of computing devices that make up distributed computing system 428. For example, second data 424 may be stored in a cube distributed across a grid of computers as understood by a person of skill in the art. As another example, second data 424 may be stored in a multi-node Hadoop® cluster. As another example, second data 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second data 424.

Figure 5:
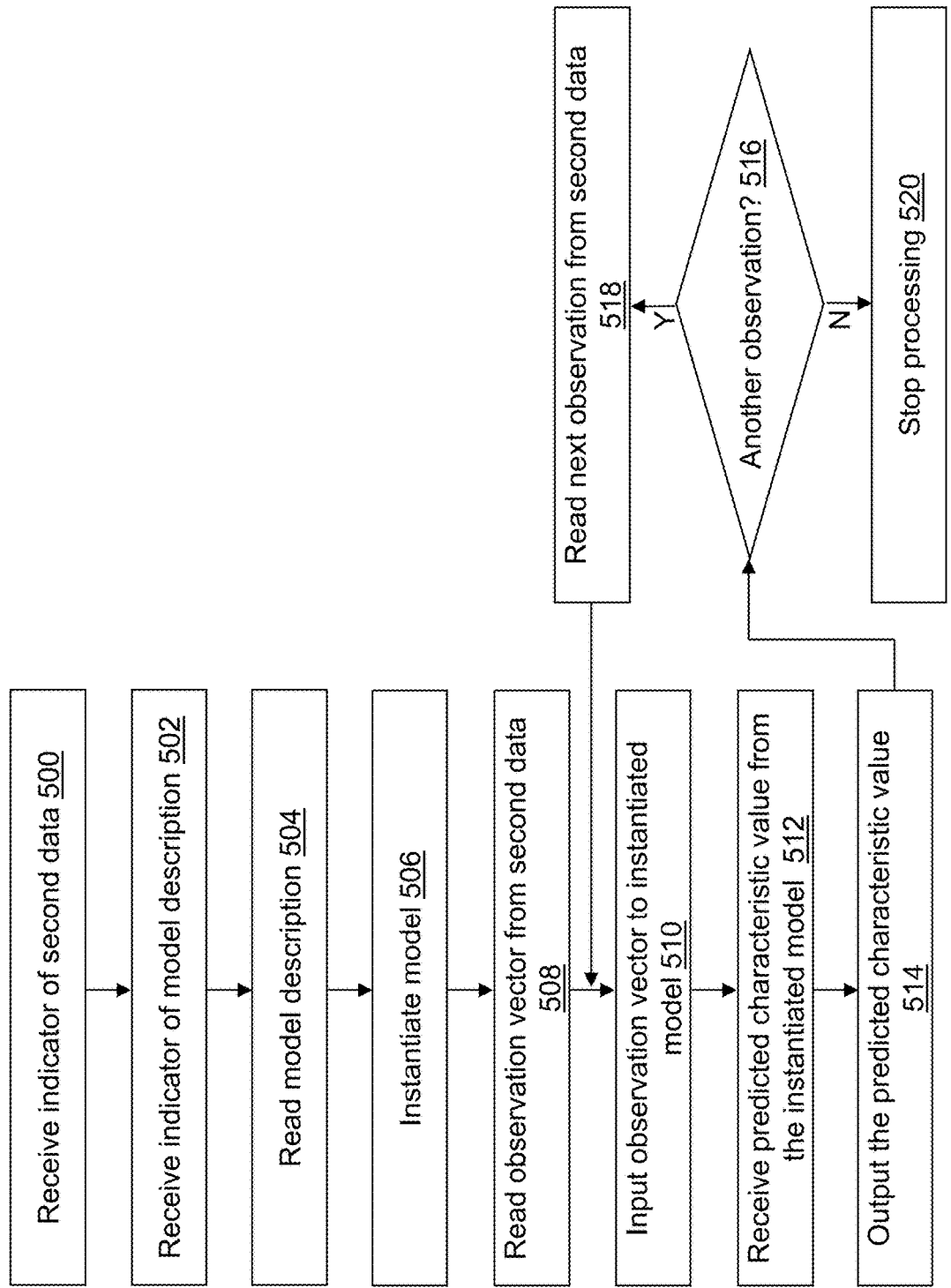
FIG. 5 depicts a flow diagram illustrating examples of operations performed by the prediction device of FIG. 4 in determining a classification in accordance with an illustrative embodiment.

Referring to FIG. 5, example operations of prediction application 422 are described. Additional, fewer, or different operations may be performed depending on the embodiment of prediction application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 428), and/or in other orders than those that are illustrated.

In an operation 500, an eighth indicator may be received that indicates second data 424. For example, the eighth indicator indicates a location and a name of second data 424. As an example, the eighth indicator may be received by prediction application 422 after selection from a user interface window or after entry by a user into a user interface window. In an alternative embodiment, second data 424 may not be selectable. For example, a most recently created dataset may be used automatically.

In an operation 502, a ninth indicator may be received that indicates trained model description 126. For example, the ninth indicator indicates a location and a name of trained model description 126. As an example, the ninth indicator may be received by prediction application 422 after selection from a user interface window or after entry by a user into a user interface window. In an alternative embodiment, trained model description 126 may not be selectable. For example, a most recently created model configuration data may be used automatically. As another example, trained model description 126 may be provided automatically as part of integration with training application 122.

In an operation 504, a neural network model description is read from trained model description 126.

In an operation 506, a neural network model is instantiated with the neural network model description. For example, the architecture of the neural network model, its hyperparameters, its weight vector, and other characterizing elements are read and used to instantiate a neural network model based on the information output from the training process in operation 234.

In an operation 508, an observation vector is read from second data 424.

In an operation 510, the observation vector is input to the instantiated model.

In an operation 512, a predicted characteristic value for the read observation vector is received as an output of the instantiated model. The output may include a probability that the observation vector has one or more different possible characteristic or class values.

In an operation 514, the predicted characteristic value may be output, for example, by storing the predicted characteristic value with the observation vector to predicted data 426. In addition, or in the alternative, the predicted characteristic value may be presented on second display 416, printed on second printer 420, sent to another computing device using second communication interface 406, an alarm or other alert signal may be sounded through second speaker 418, etc.

In an operation 516, a determination is made concerning whether or not second data 424 includes another observation vector. When second data 424 includes another observation vector, processing continues in an operation 518. When second data 424 does not include another observation vector, processing continues in an operation 520.

In operation 518, a next observation vector is read from second data 424, and processing continues in operation 510.

In operation 520, processing is stopped.

The operations of training application 122 can be executed in parallel to speed up the training process. Training application 122 may be executed in a synchronous mode that distributes the gradient computations across a plurality of worker computing devices. Each worker computing device computes the gradient for a portion of training data 124 that resides on that worker computing device, and the computed gradients are aggregated on a controller computing device. The weights are updated with the computed gradients and are sent to each worker computing device so that the processing for the next iteration can proceed with the updated weights.

A performance of training application 122 on standard neural network benchmarks was evaluated. Training application 122 shows significantly better results compared to existing neural networks, as described below, by applying discriminative localization mapping to input layers while the main neural network model is being trained. The model interpretation provided by training application 122 serves as a feedback loop to the main neural network model being trained, and while the model improves, the feedback to the feedback neural network is improved as well. The applied discriminative localization mapping acts as a feature engineering step that identifies the most important variables (pixels) for training the main neural network model.

A first dataset CIFAR-10 and a second dataset CFIAR-100 were used. CIFAR-10 consists of images taken from 10 classes and CIFAR-100 from 100 classes. CIFAR-10 and CIFAR-100 consist of colored natural images with 32×32 pixels resized to 224×224 pixels. The training and test sets contained 50,000 and 10,000 images, respectively. A random flip was applied and standard normalization was adopted in a data augmentation process. For architectures, three different state-of-the art architectures, GoogleNet, Resnet18, and DenseNet121, were used for both the feedback neural network and the main neural network with their last fully connected layers replaced by a fully connected layer with a neural size as the number of classes in CIFAR-10 and CIFAR-100, respectively. Stochastic gradient descent with a batch size of 50 was used with the other hyperparameters defined using default values.

Figure 6A:
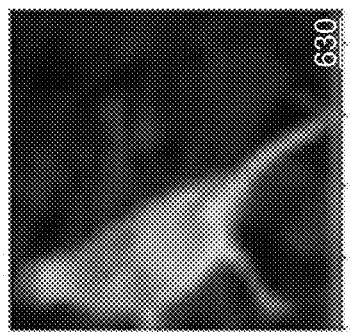
FIGS. 6A and 6B show processing of eight different images to define an image input to a neural network to be trained.
Figure 6A:
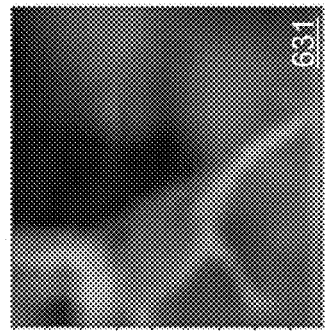
Figure 6A:
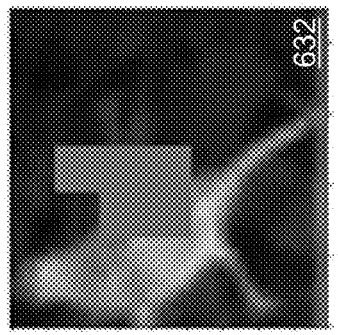
Figure 6A:
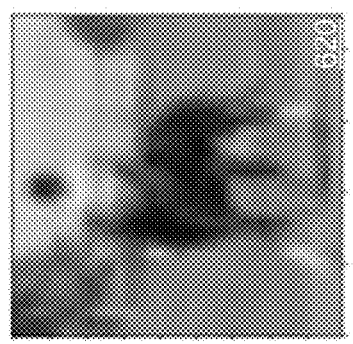
Figure 6A:
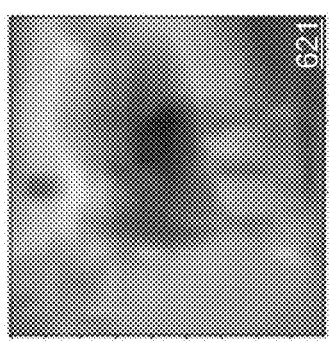
Figure 6A:
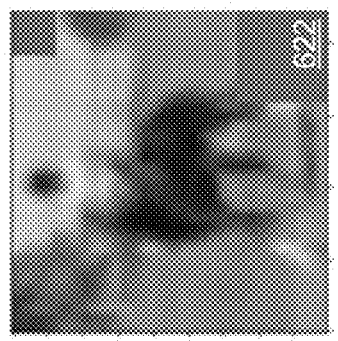
Figure 6A:
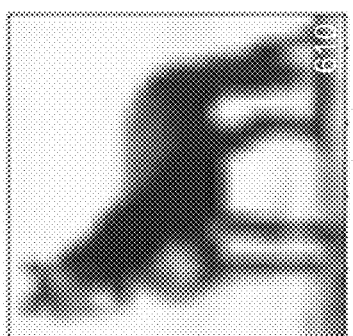
Figure 6A:
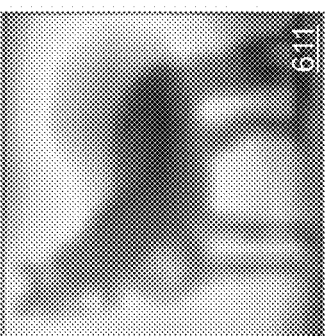
Figure 6A:
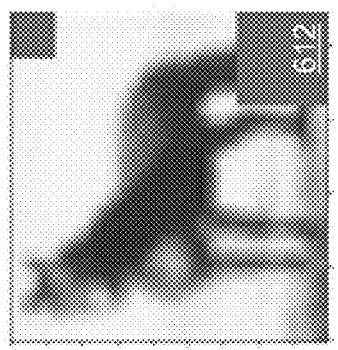
Figure 6A:
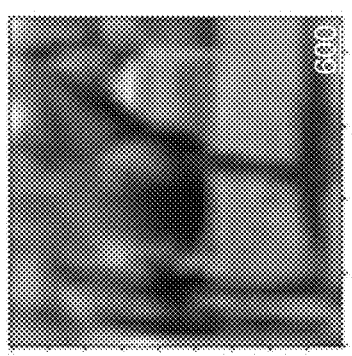
Figure 6A:
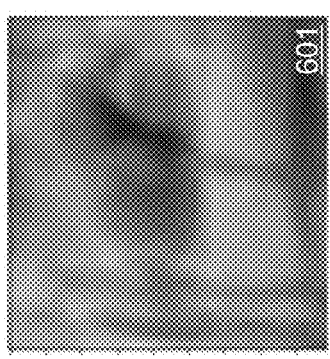
Figure 6A:
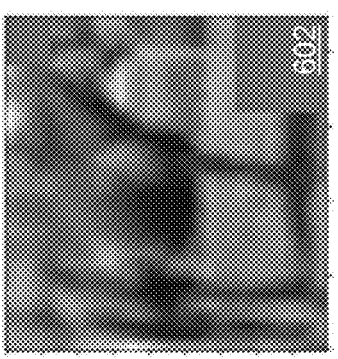
Figure 6B:
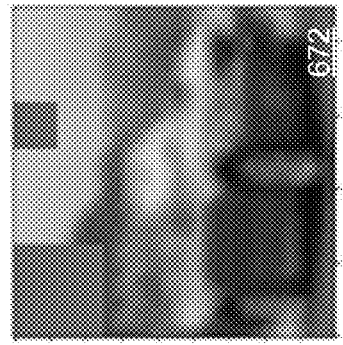
Figure 6B:
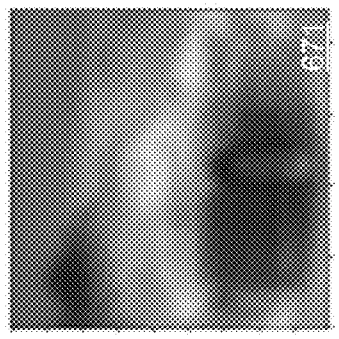
Figure 6B:
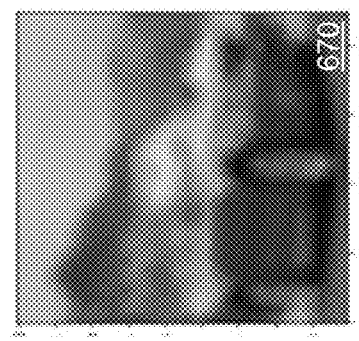
Figure 6B:
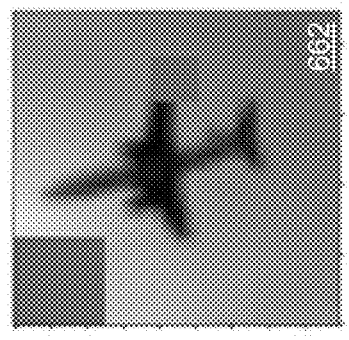
Figure 6B:
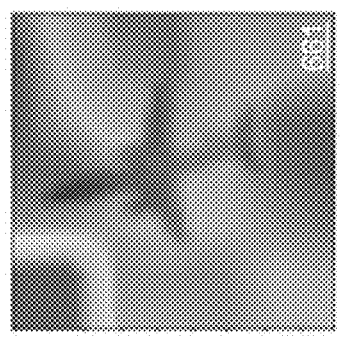
Figure 6B:
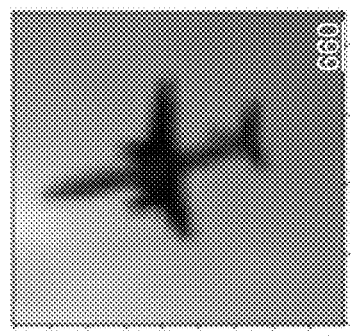
Figure 6B:
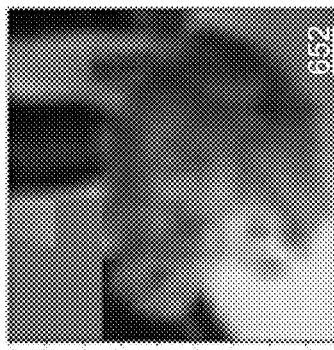
Figure 6B:
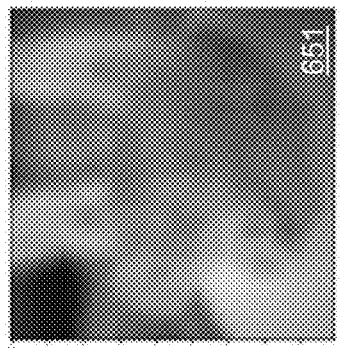
Figure 6B:
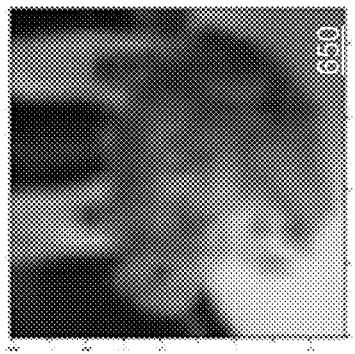
Figure 6B:
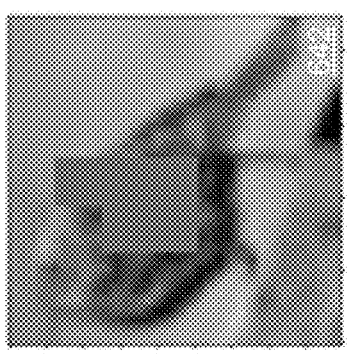
Figure 6B:
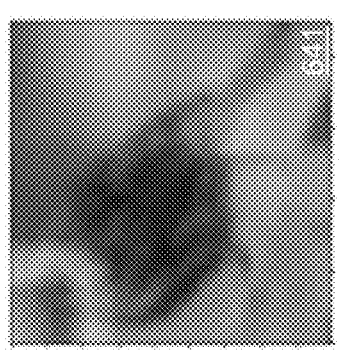
Figure 6B:
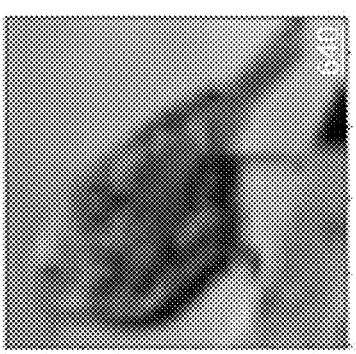

Referring to FIGS. 6A and 6B, processing of eight different images from CIFAR-10 is shown. A first image 600 was input from training data 124. Referring to FIG. 6A, a first heatmap 601 for its true class of horse shows an area of attention determined by the feedback neural network defined using DenseNet121 with Grad-CAM as the discriminative localization map. A first masked image 602 is computed from first heat map 601 and first image 600 as an output of operation 220 used as an input to train the main neural network also defined using DenseNet121.

A second image 610 was input from training data 124. A second heatmap 611 for its true class of horse shows an area of attention determined by the feedback neural network defined using DenseNet121 with Grad-CAM as the discriminative localization map. A second masked image 612 is computed from second heat map 611 and second image 610 as an output of operation 220 used as an input to train the main neural network also defined using DenseNet121.

A third image 620 was input from training data 124. A third heatmap 621 for its true class of horse shows an area of attention determined by the feedback neural network defined using DenseNet121 with Grad-CAM as the discriminative localization map. A third masked image 622 is computed from third heat map 621 and third image 620 as an output of operation 220 used as an input to train the main neural network also defined using DenseNet121.

A fourth image 630 was input from training data 124. A fourth heatmap 631 for its true class of bird shows an area of attention determined by the feedback neural network defined using DenseNet121 with Grad-CAM as the discriminative localization map. A fourth masked image 632 is computed from fourth heat map 631 and fourth image 630 as an output of operation 220 used as an input to train the main neural network also defined using DenseNet121.

Referring to FIG. 6B, a fifth image 640 was input from training data 124. A fifth heatmap 641 for its true class of bird shows an area of attention determined by the feedback neural network defined using DenseNet121 with Grad-CAM as the discriminative localization map. A fifth masked image 642 is computed from fifth heat map 641 and fifth image 640 as an output of operation 220 used as an input to train the main neural network also defined using DenseNet121.

A sixth image 650 was input from training data 124. A sixth heatmap 651 for its true class of frog shows an area of attention determined by the feedback neural network defined using DenseNet121 with Grad-CAM as the discriminative localization map. A sixth masked image 652 is computed from sixth heat map 651 and sixth image 650 as an output of operation 220 used as an input to train the main neural network also defined using DenseNet121.

A seventh image 660 was input from training data 124. A seventh heatmap 661 for its true class of plane shows an area of attention determined by the feedback neural network defined using DenseNet121 with Grad-CAM as the discriminative localization map. A seventh masked image 662 is computed from seventh heat map 661 and seventh image 660 as an output of operation 220 used as an input to train the main neural network also defined using DenseNet121.

An eighth image 670 was input from training data 124. An eighth heatmap 671 for its true class of car shows an area of attention determined by the feedback neural network defined using DenseNet121 with Grad-CAM as the discriminative localization map. An eighth masked image 672 is computed from eighth heat map 671 and eighth image 670 as an output of operation 220 used as an input to train the main neural network also defined using DenseNet121.

The gray areas in the last row of FIGS. 6A and 6B indicate masked regions. The masked regions are identified as pixels not needed to identify the true class and effectively provide feature engineering by reducing a number of variables (pixels) to process.

Figure 7A:
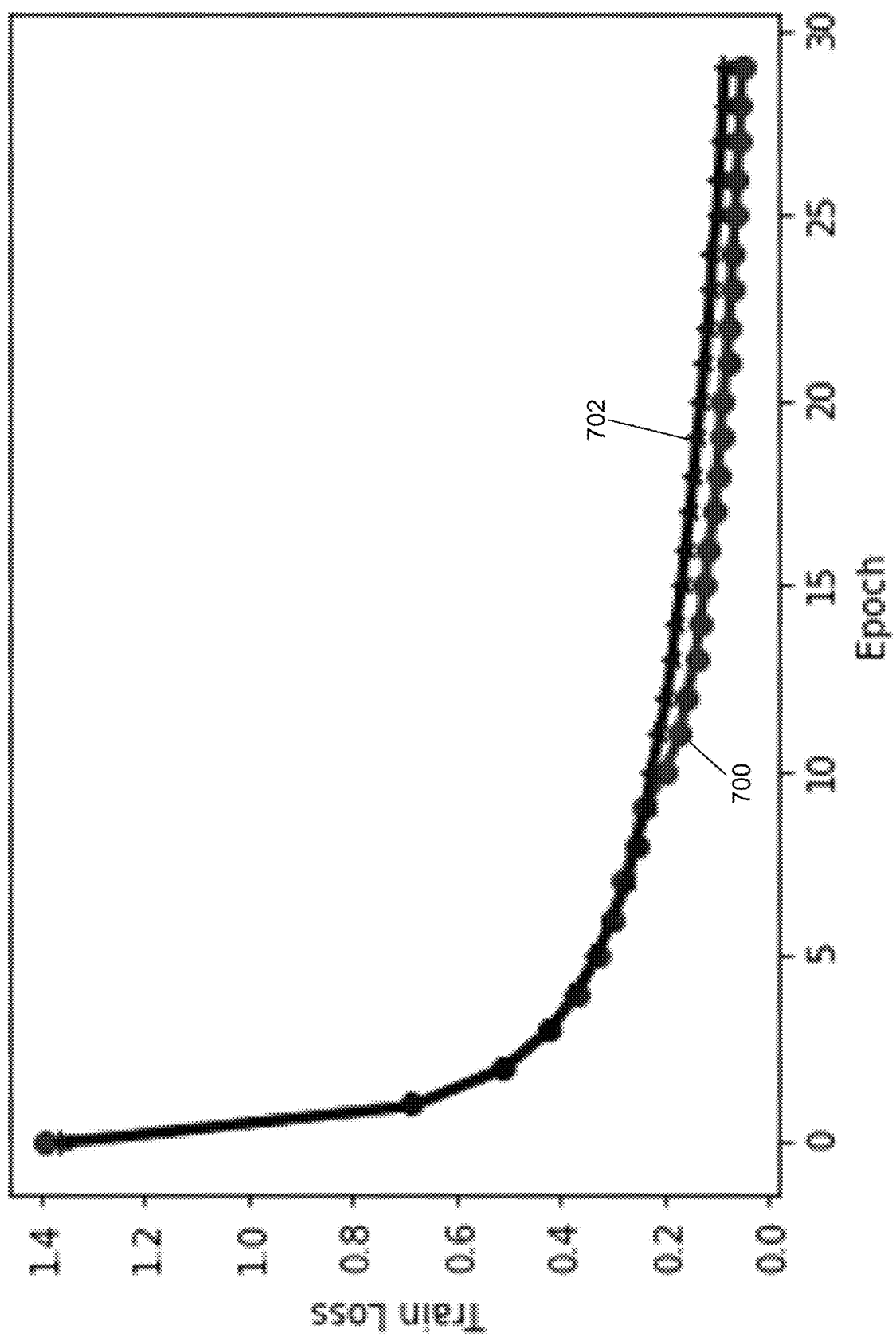
FIG. 7A shows a training loss improvement that results using the training application of FIG. 2 with a first dataset and with a first neural network architecture.

For the performance metrics, a training loss, an accuracy, and a final test error at the end of the thirtieth training epoch were computed. Referring to FIG. 7A, a training loss curve 700 was computed using training application 122 with CIFAR-10 and with DenseNet121 used to define the feedback neural network and the main neural network. A training loss curve 702 shows the training loss using DenseNet121 without the feedback neural network and discriminative localization mapping. Training loss curve 700 and training loss curve 702 are identical the first ten epochs that were used to warm start the training because feature extractions in the first few epochs may be poor, and it is preferable to use more accurate localization maps once the main neural network model warms up.

Figure 7B:
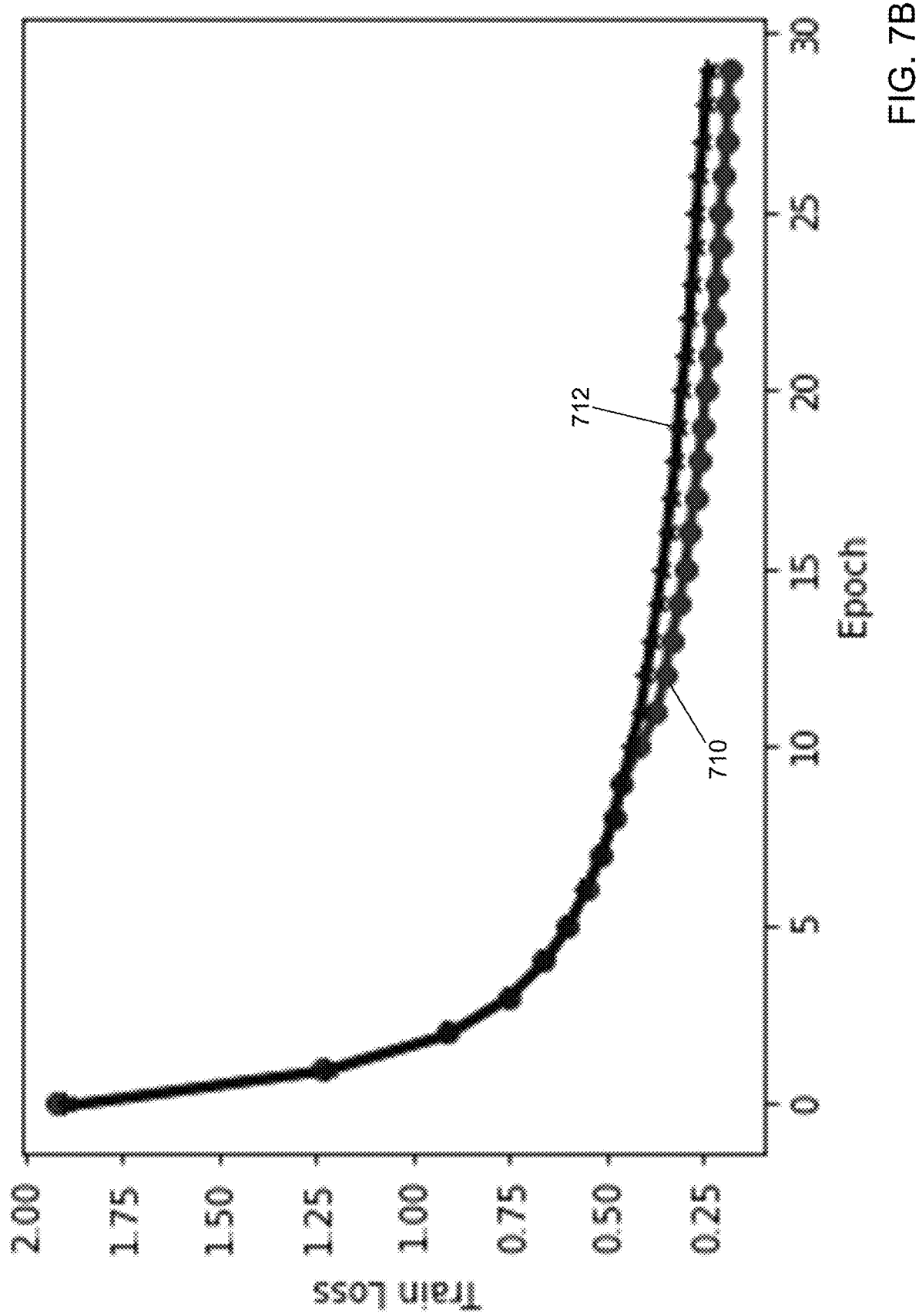
FIG. 7B shows a training loss improvement that results using the training application of FIG. 2 with the first dataset and with a second neural network architecture.

Referring to FIG. 7B, a training loss curve 710 was computed using training application 122 with CIFAR-10 and with GoogleNet used to define the feedback neural network and the main neural network. A training loss curve 712 shows the training loss using GoogleNet without the feedback neural network and discriminative localization mapping. Again, ten epochs were used to warm start the training.

Referring to FIG. 7C, a training loss curve 720 was computed using training application 122 with CIFAR-10 and with ResNet18 used to define the feedback neural network and the main neural network. A training loss curve 722 shows the training loss using ResNet18 without the feedback neural network and discriminative localization mapping. Again, ten epochs were used to warm start the training.

Figure 8A:
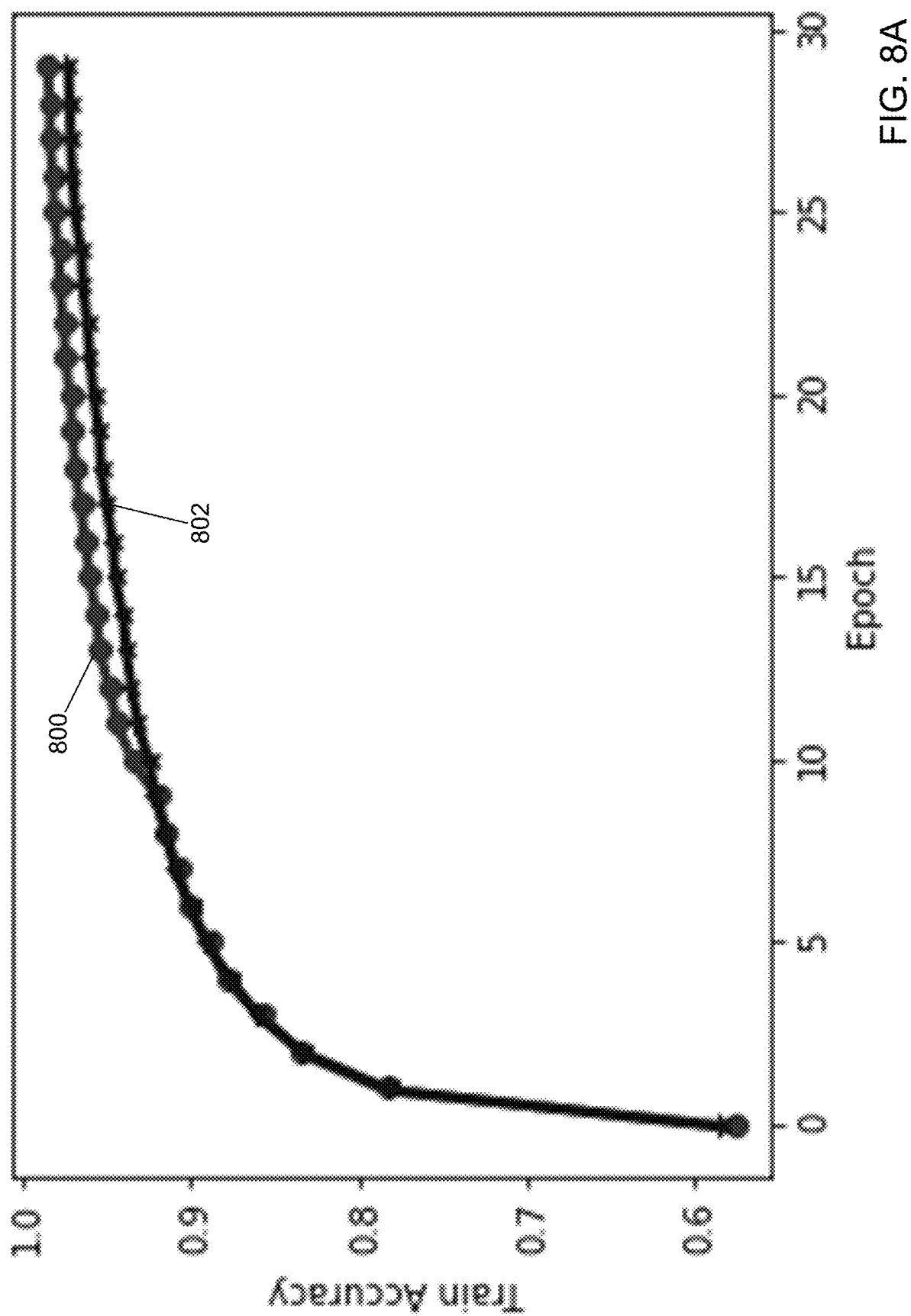
FIG. 8A shows an accuracy improvement that results using the training application of FIG. 2 with the first dataset and with the first neural network architecture.
Figure 8B:
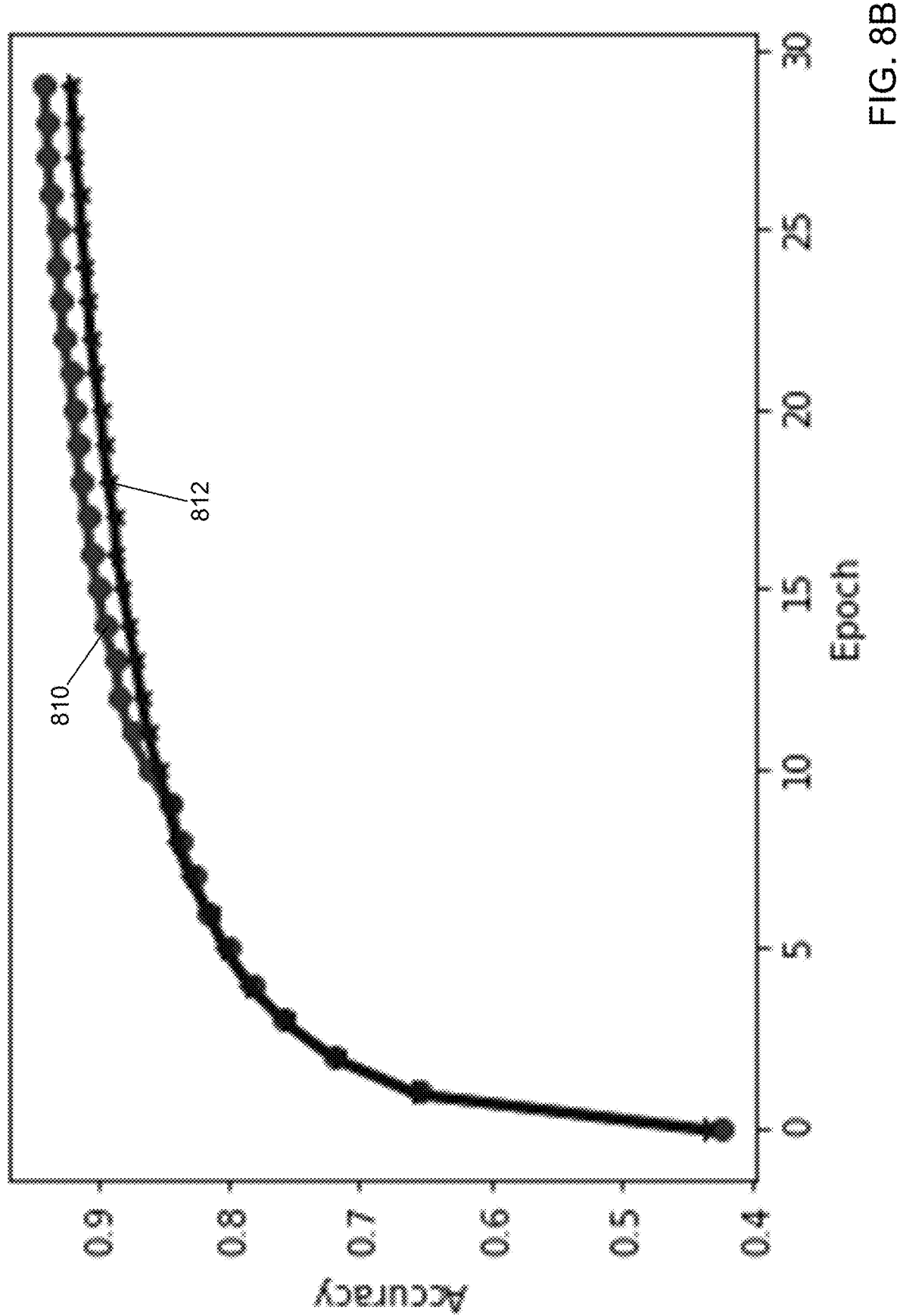
FIG. 8B shows an accuracy improvement that results using the training application of FIG. 2 with the first dataset and with the second neural network architecture.
Figure 8C:
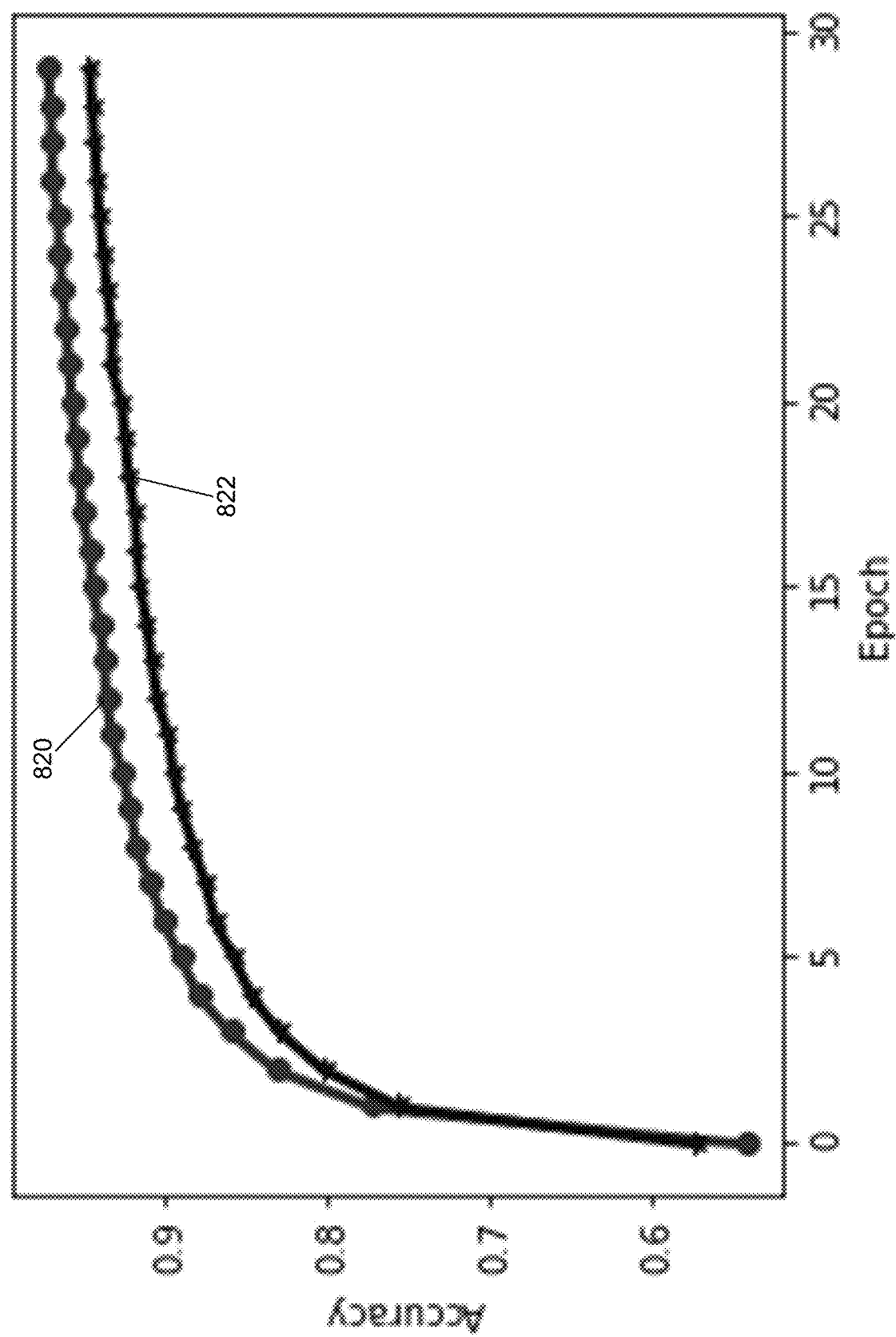
FIG. 8C shows an accuracy loss improvement that results using the training application of FIG. 2 with the first dataset and with the third neural network architecture.

Referring to FIG. 8A, an accuracy curve 800 was computed using training application 122 with CIFAR-10 and with DenseNet121 used to define the feedback neural network and the main neural network. A training loss curve 802 shows the accuracy using DenseNet121 without the feedback neural network and discriminative localization mapping. Referring to FIG. 8B, an accuracy curve 810 was computed using training application 122 with CIFAR-10 and with GoogleNet used to define the feedback neural network and the main neural network. A training loss curve 812 shows the accuracy using GoogleNet without the feedback neural network and discriminative localization mapping. Referring to FIG. 8C, an accuracy curve 820 was computed using training application 122 with CIFAR-10 and with ResNet18 used to define the feedback neural network and the main neural network. A training loss curve 822 shows the accuracy using ResNet18 without the feedback neural network and discriminative localization mapping.

Figure 9A:
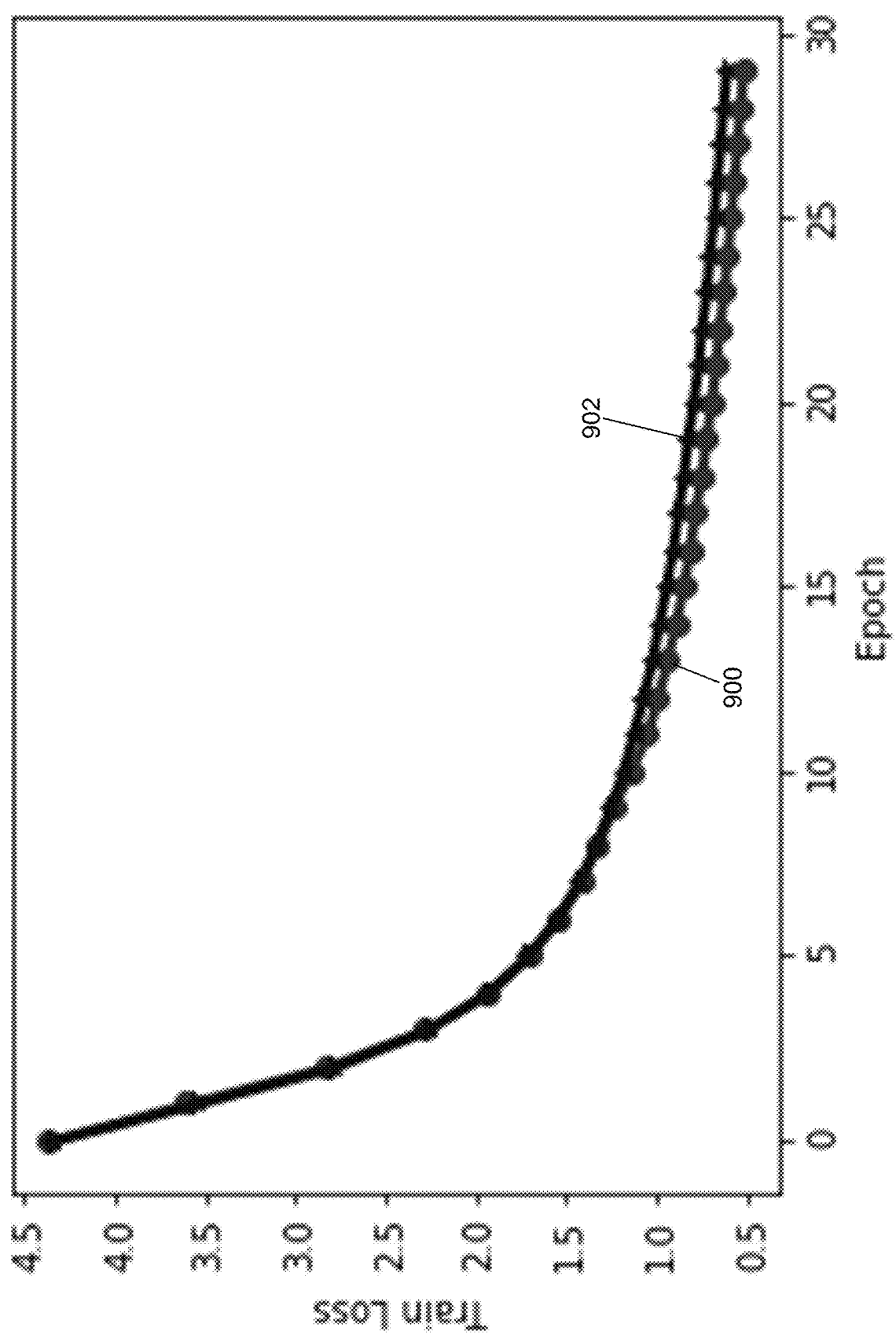
FIG. 9A shows a training loss improvement that results using the training application of FIG. 2 with a second dataset and with a first neural network architecture.

Referring to FIG. 9A, a training loss curve 900 was computed using training application 122 with CIFAR-100 and with DenseNet121 used to define the feedback neural network and the main neural network. A training loss curve 902 shows the training loss using DenseNet121 without the feedback neural network. Again, ten epochs were used to warm start the training.

Figure 9B:
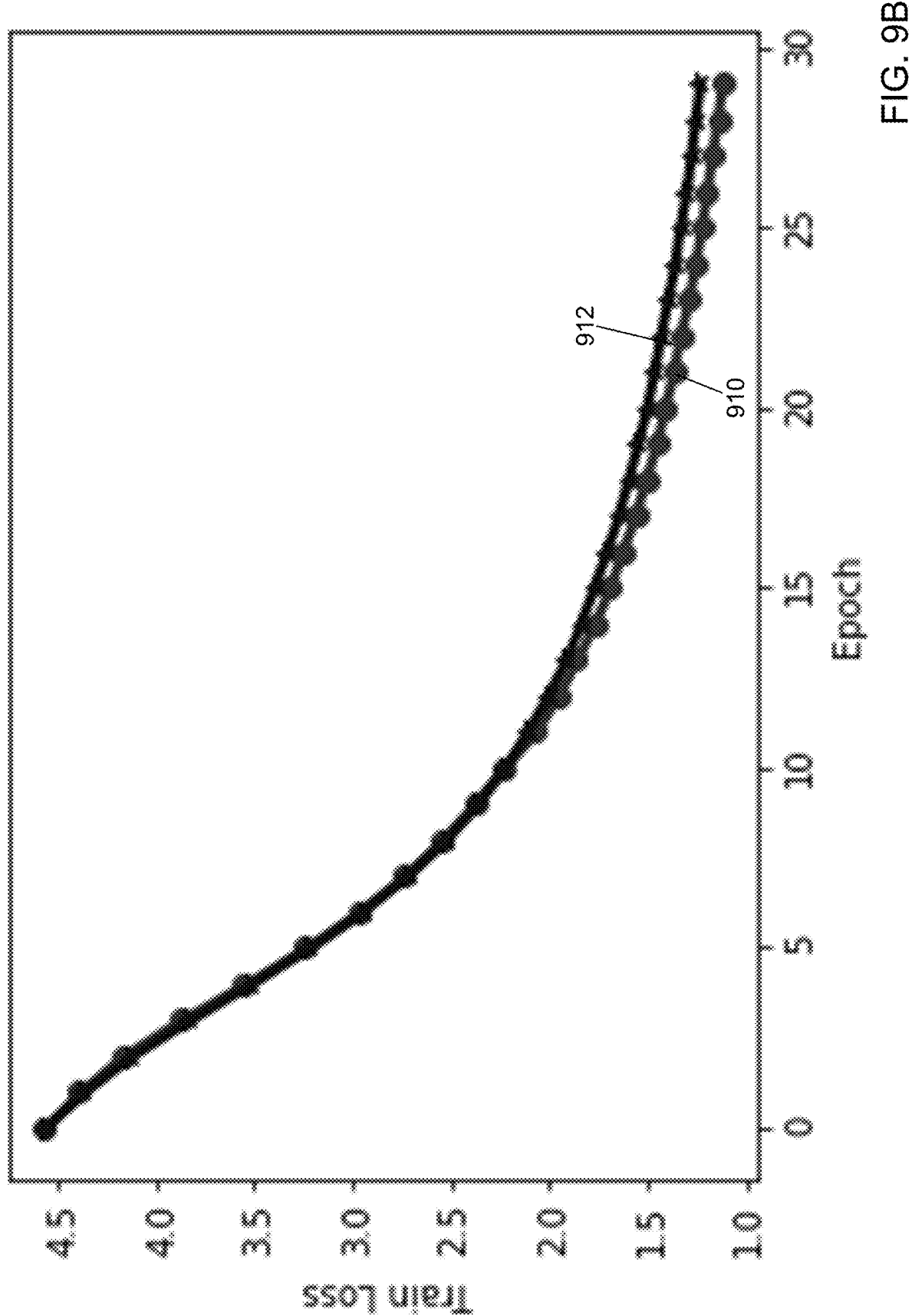
FIG. 9B shows a training loss improvement that results using the training application of FIG. 2 with the second dataset and with a second neural network architecture.

Referring to FIG. 9B, a training loss curve 910 was computed using training application 122 with CIFAR-100 and with GoogleNet used to define the feedback neural network and the main neural network. A training loss curve 912 shows the training loss using GoogleNet without the feedback neural network and discriminative localization mapping. Again, ten epochs were used to warm start the training.

Figure 9C:
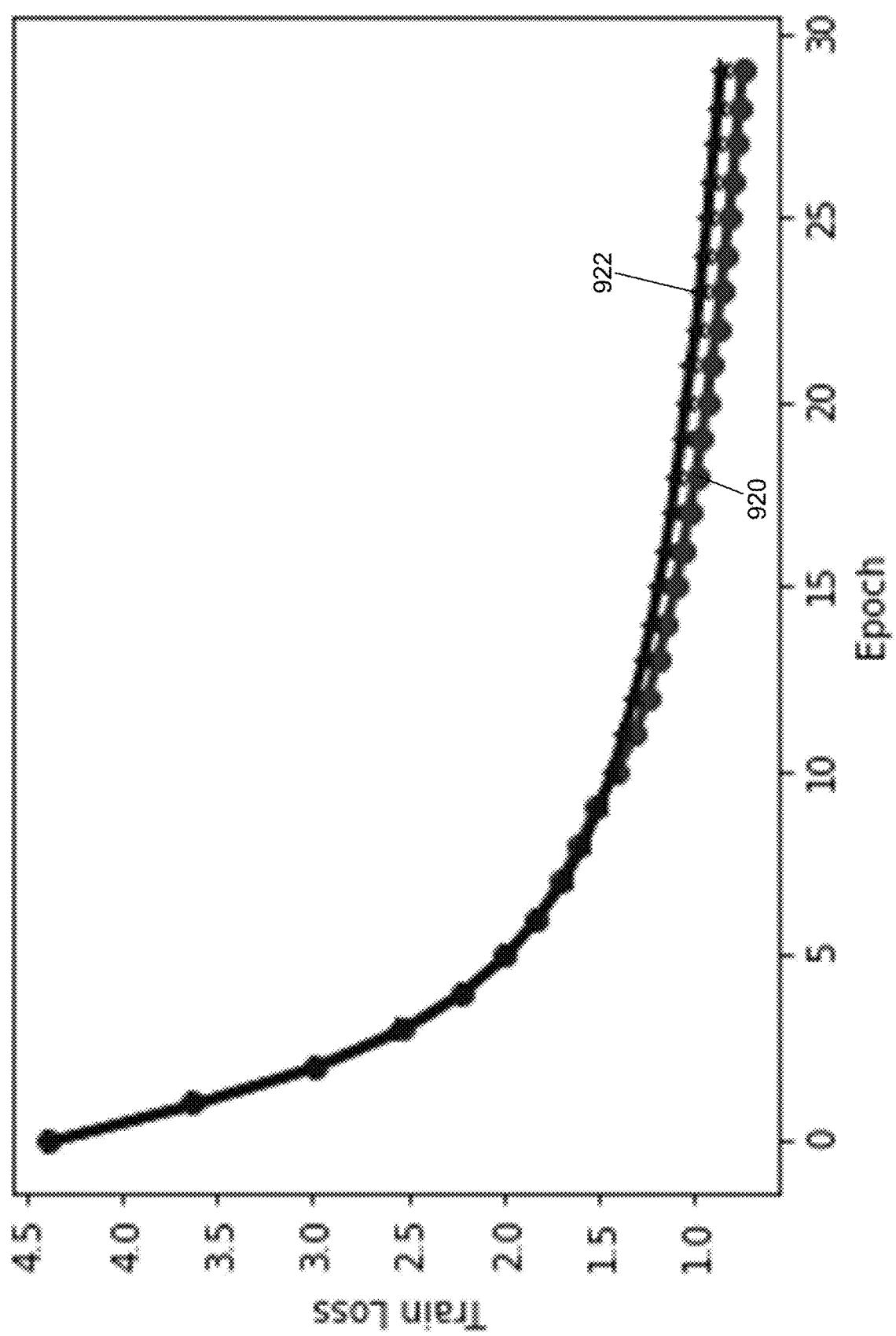
FIG. 9C shows a training loss improvement that results using the training application of FIG. 2 with the second dataset and with a third neural network architecture.

Referring to FIG. 9C, a training loss curve 920 was computed using training application 122 with CIFAR-100 and with ResNet18 used to define the feedback neural network and the main neural network. A training loss curve 922 shows the training loss using ResNet18 without the feedback neural network and discriminative localization mapping. Again, ten epochs were used to warm start the training.

Figure 10A:
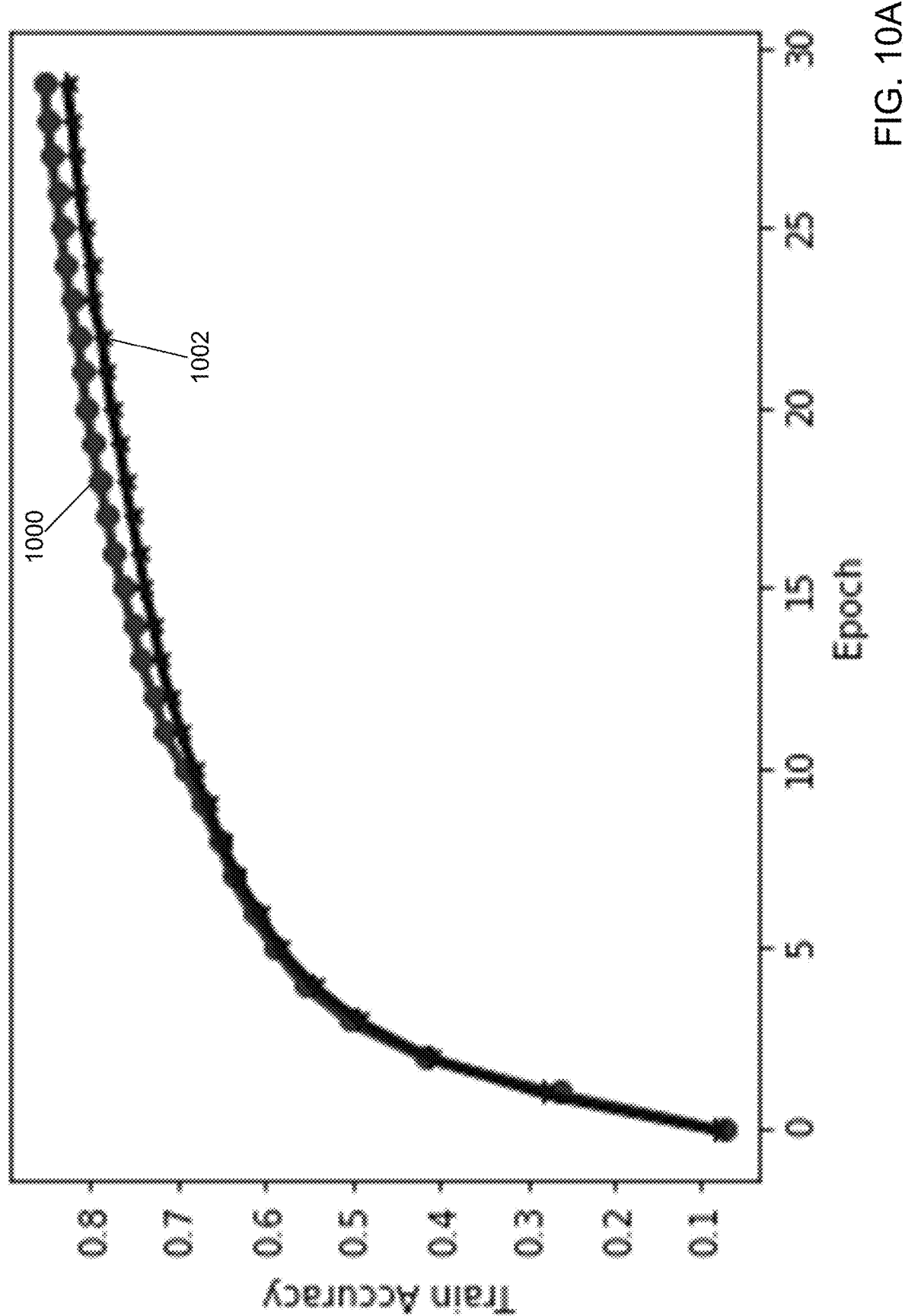
FIG. 10A shows an accuracy improvement that results using the training application of FIG. 2 with the second dataset and with the first neural network architecture.
Figure 10B:
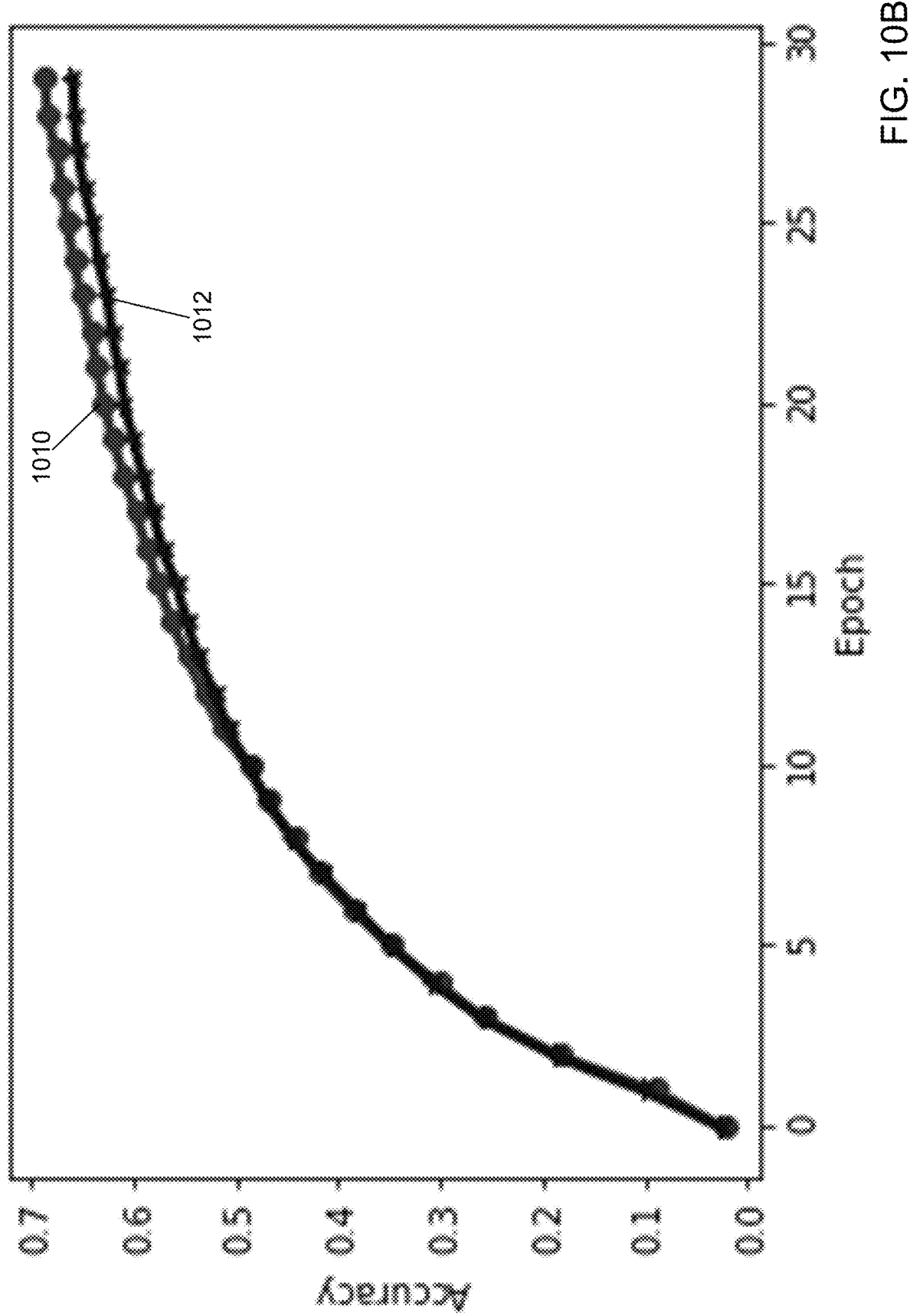
FIG. 10B shows an accuracy improvement that results using the training application of FIG. 2 with the second dataset and with the second neural network architecture.
Figure 10C:
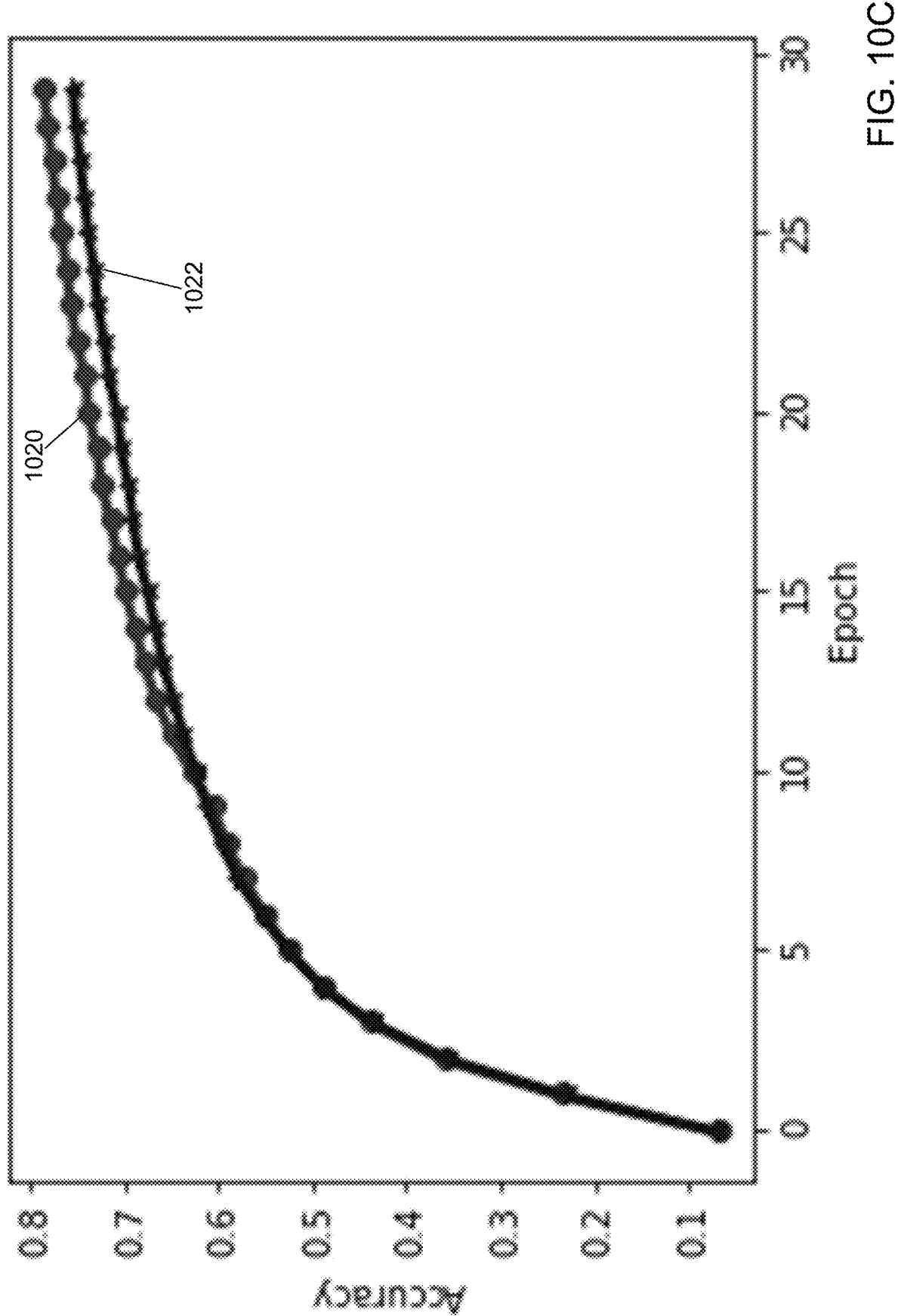
FIG. 10C shows an accuracy loss improvement that results using the training application of FIG. 2 with the second dataset and with the third neural network architecture.

Referring to FIG. 10A, an accuracy curve 1000 was computed using training application 122 with CIFAR-100 and with DenseNet121 used to define the feedback neural network and the main neural network. A training loss curve 1002 shows the accuracy using DenseNet121 without the feedback neural network and discriminative localization mapping. Referring to FIG. 10B, an accuracy curve 1010 was computed using training application 122 with CIFAR-100 and with GoogleNet used to define the feedback neural network and the main neural network. A training loss curve 1012 shows the accuracy using GoogleNet without the feedback neural network and discriminative localization mapping. Referring to FIG. 10C, an accuracy curve 1020 was computed using training application 122 with CIFAR-100 and with ResNet18 used to define the feedback neural network and the main neural network. A training loss curve 1022 shows the accuracy using ResNet18 without the feedback neural network and discriminative localization mapping.

Training application 122 immediately results in a lower training loss and a higher training accuracy using both datasets and all three architectures. In addition, training application 122 achieves an overall in-training performance gain on the test dataset as well. Table 1 below shows that an average improvement in a misclassification error is 2.3%. There is a 5% jump in test accuracy with ResNet18 and the CIFAR-100 dataset. Training application 122 achieves a better generalization due to use of the masked images computed using discriminative localization mapping.

TABLE 1

| Architecture | CIFAR-10 | CIFAR-100 |
| --- | --- | --- |
| GoogleNet | 9.16 | 33.88 |
| Training application 122 with GoogleNet | 6.25 | 31.53 |
| ResNet18 | 7.82 | 27.27 |
| Training application 122 with ResNet18 | 6.6 | 22.22 |
| DenseNet121 | 5.8 | 23.08 |
| Training application 122 with DenseNet121 | 3.9 | 22.54 |

Training application 122 can also improve an inference performance with pre-trained models. For example, an inference loss was 50% lower with training application 122 using DenseNet121. First Grad-CAM was used with the pre-trained DenseNet121 models to produce the masked images input to the inference. A base line case was inference of raw images with the same pre-trained weights. The test dataset accuracy and cross-entropy loss are shown in Table 2.

TABLE 2

| Architecture | CIFAR-10 accuracy | CIFAR-10 mean cross-entropy | CIFAR-100 accuracy | CIFAR-100 mean cross-entropy |
| --- | --- | --- | --- | --- |
| GoogleNet | 9.17 | 2.34 | 0.92 | 4.65 |
| Training application 122 with GoogleNet | 13.73 | 2.27 | 1.66 | 4.58 |
| ResNet18 | 7.12 | 2.49 | 1.3 | 4.82 |
| Training application 122 with ResNet18 | 11.57 | 2.35 | 1.73 | 4.69 |
| DenseNet121 | 6.64 | 2.47 | 0.61 | 4.74 |
| Training application 122 with DenseNet121 | 11.76 | 2.28 | 1.19 | 4.61 |

The percentage improvements achieved using training application 122 are shown in Table 3.

TABLE 3

| Architecture | CIFAR-10 accuracy | CIFAR-10 mean cross-entropy | CIFAR-100 accuracy | CIFAR-100 mean cross-entropy |
| --- | --- | --- | --- | --- |
| GoogleNet | 49.73 | 2.89 | 80.43 | 1.52 |
| ResNet18 | 60.47 | 5.55 | 2.72 | 4.69 |
| DenseNet121 | 77.11 | 7.5 | 95.08 | 2.91 |

A significant performance improvement is realized using training application 122 even with the same neural network model parameters showing the benefits of using training application 122 in production without any retraining. This experiment shows that the masked images from discriminative localization mapping can improve deep learning networks by shifting the attention to focus on more relevant pixels with respect to the correct label. In the model forward path, the attention-added images make the neural network model parameters of those zero blocks insignificant, shifting the feature maps in both upstream and downstream convolution layers to more relevant features.

Figure 11B:
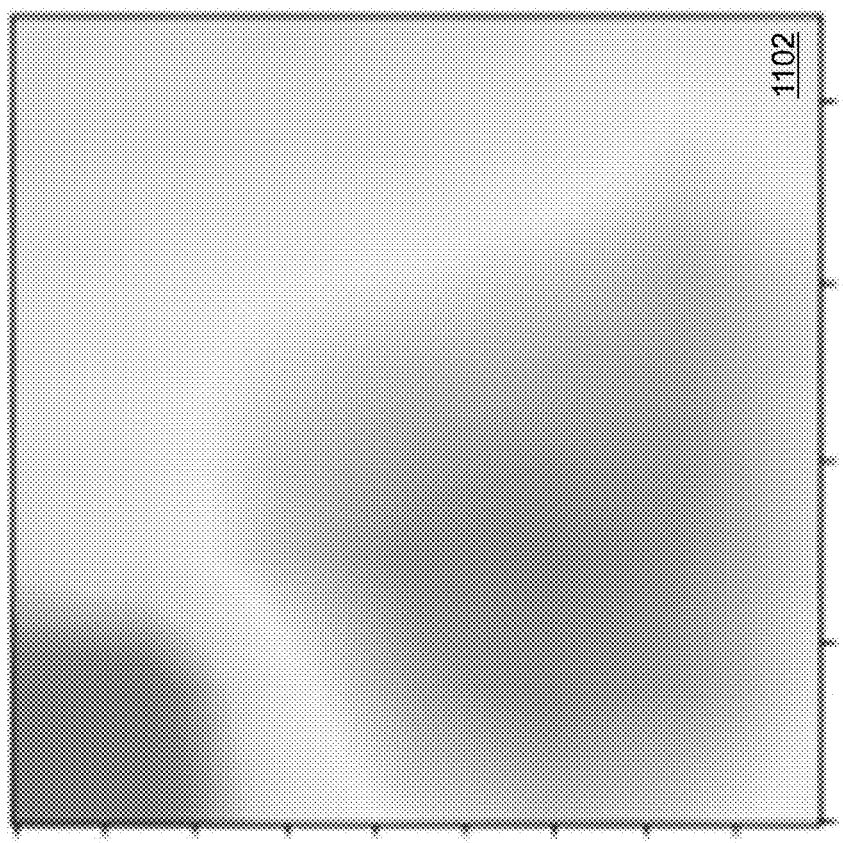
FIG. 11B shows a heat map of the first image of FIG. 11A computed from class activation mapping after training the neural network to be trained.
Figure 11A:
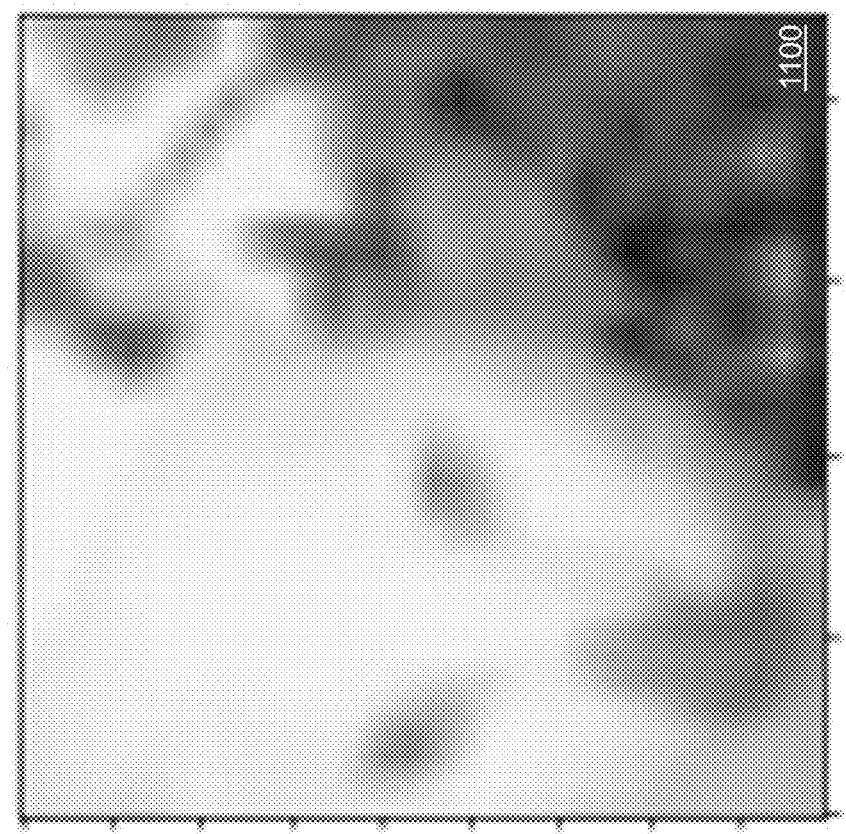
FIG. 11A shows a first image.

FIGS. 11A through 15E provide a visualization to explain how training application 122 works. FIG. 11A shows a first image 1100; FIG. 12A shows a second image 1200; FIG. 13A shows a third image 1300; FIG. 14A shows a fourth image 1400; and FIG. 15A shows a fifth image 1500. FIG. 11B shows a first heat map 1102 of first image 1100 computed from discriminative localization mapping; FIG. 12B shows a second heat map 1202 of second image 1200 computed from discriminative localization mapping; FIG. 13B shows a third heat map 1302 of third image 1300 computed from discriminative localization mapping; FIG. 14B shows a fourth heat map 1402 of fourth image 1400 computed from discriminative localization mapping; and FIG. 15B shows a fifth heat map 1502 of fifth image 1500 computed from discriminative localization mapping.

Figure 11D:
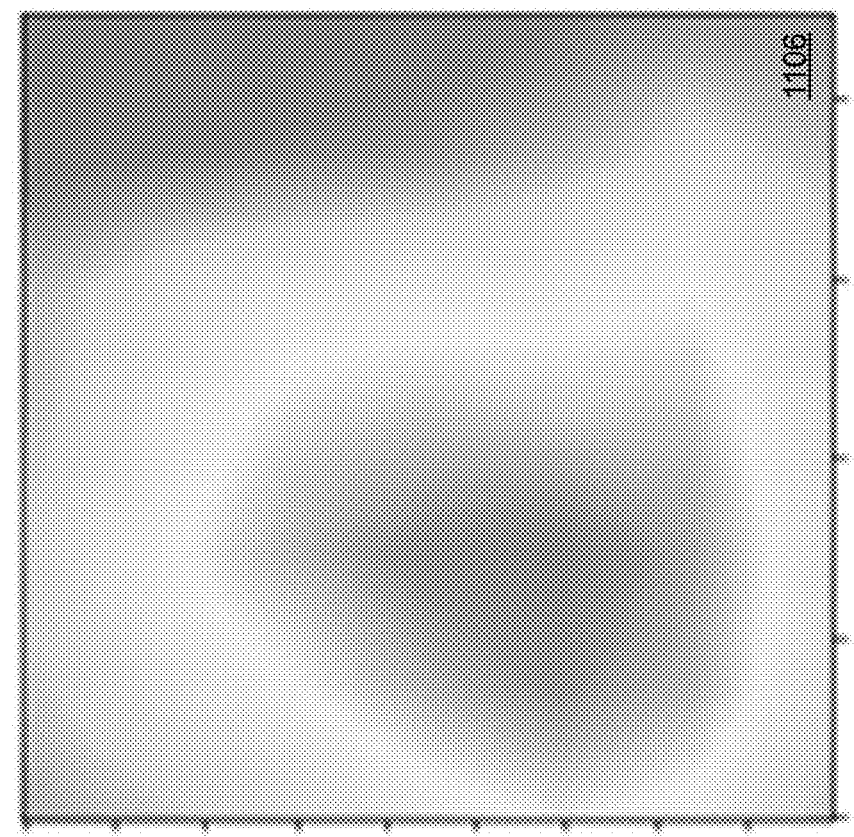
FIG. 11D shows a heat map of the first image of FIG. 11B computed from class activation mapping after training the neural network to be trained.
Figure 11C:
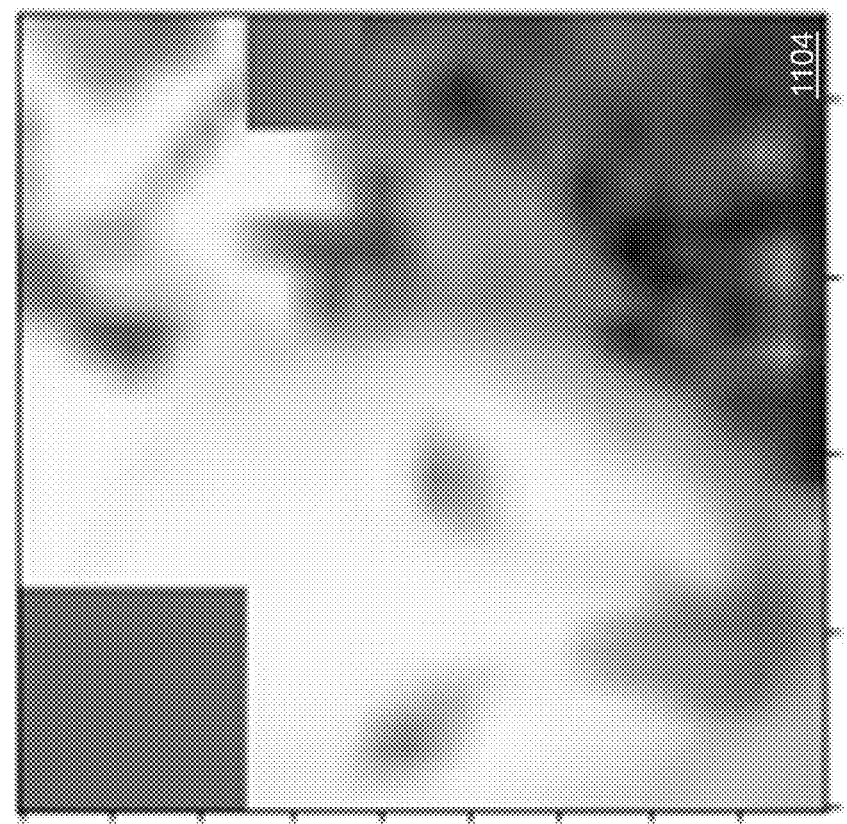
FIG. 11C shows the first image of FIG. 11A after masking that is input to the neural network to be trained.
Figure 12B:
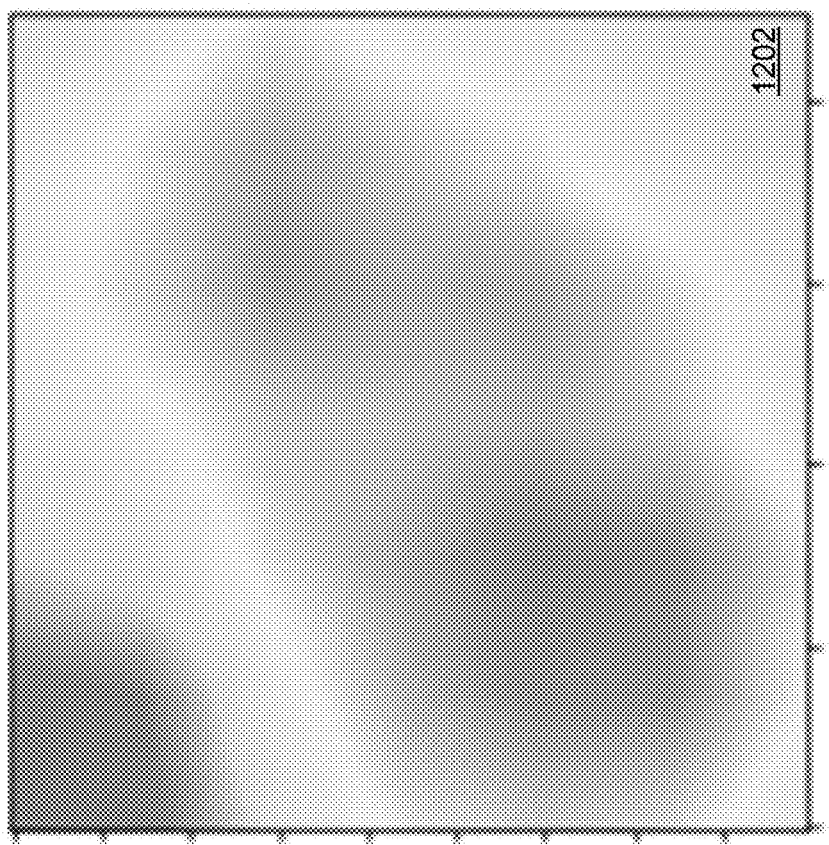
FIG. 12B shows a heat map of the second image of FIG. 12A computed from class activation mapping.
Figure 12A:
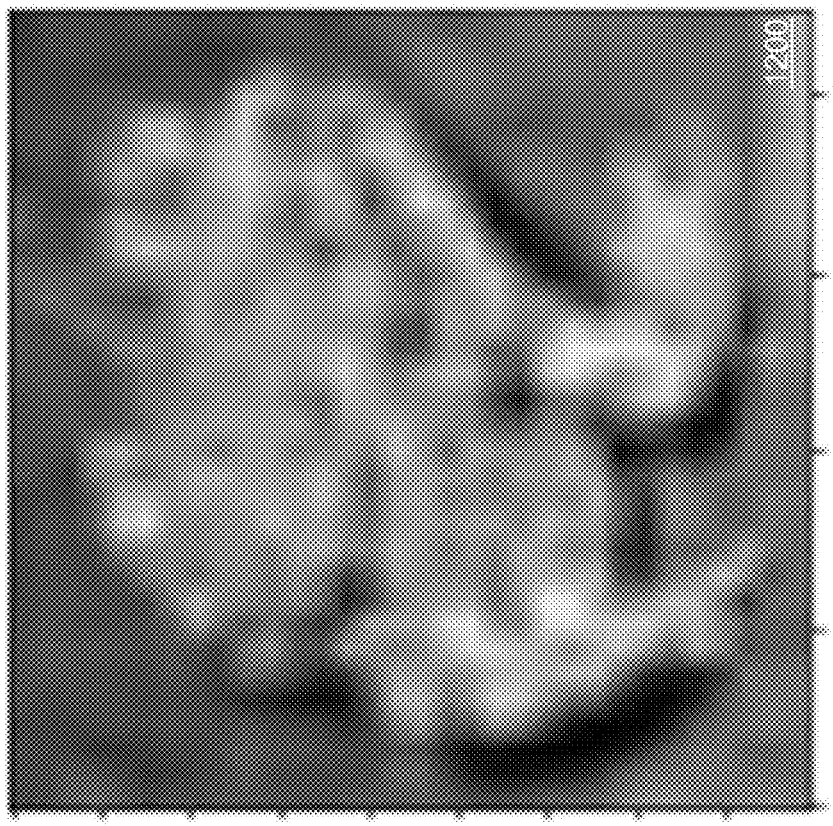
FIG. 12A shows a second image.
Figure 12D:
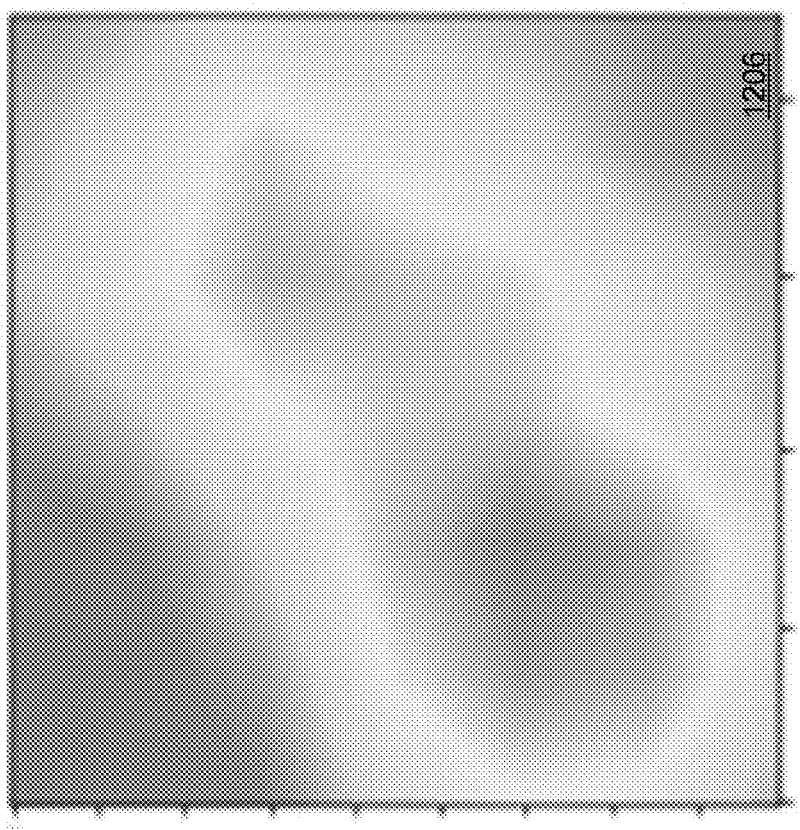
FIG. 12D shows a heat map of the second image of FIG. 12B computed from class activation mapping after training the neural network to be trained.
Figure 12C:
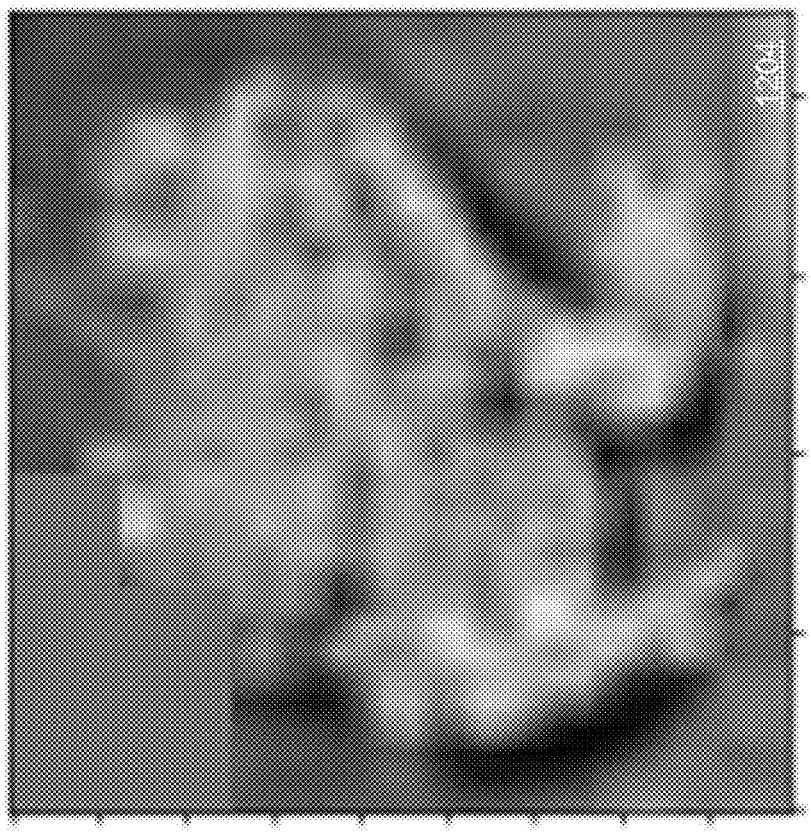
FIG. 12C shows the second image of FIG. 12A after masking that is input to the neural network to be trained.
Figure 13B:
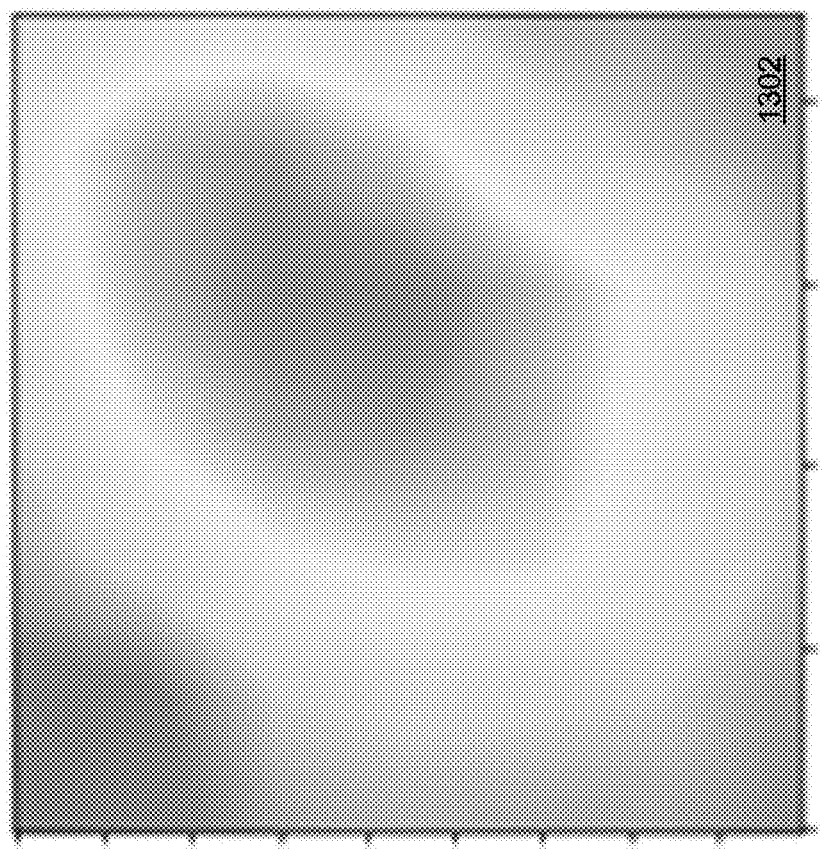
FIG. 13B shows a heat map of the third image of FIG. 13A computed from class activation mapping.
Figure 13A:
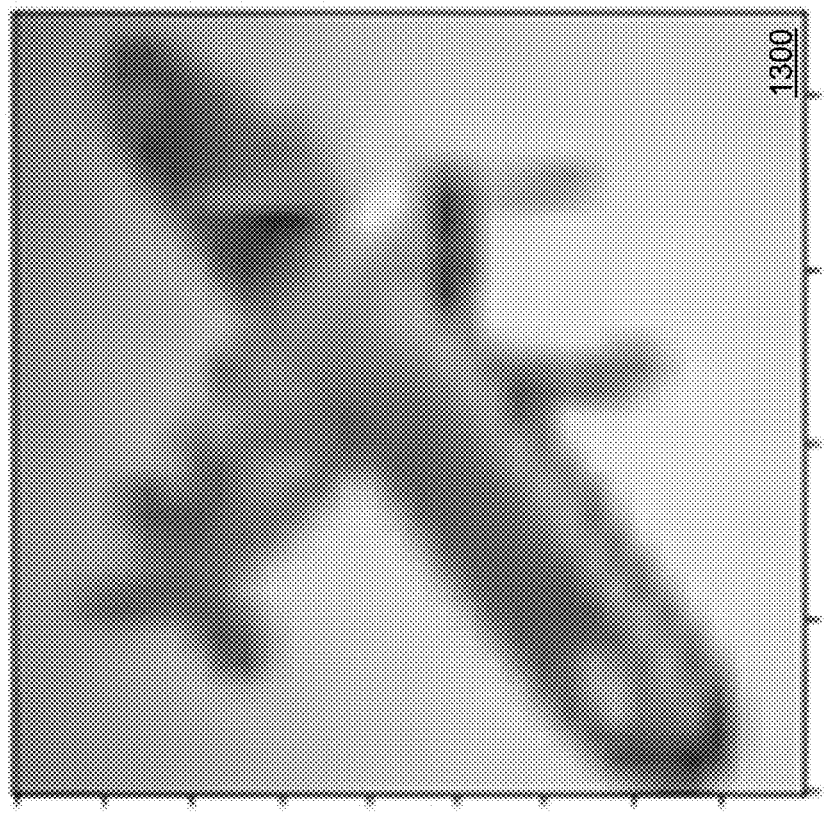
FIG. 13A shows a third image.
Figure 13C:
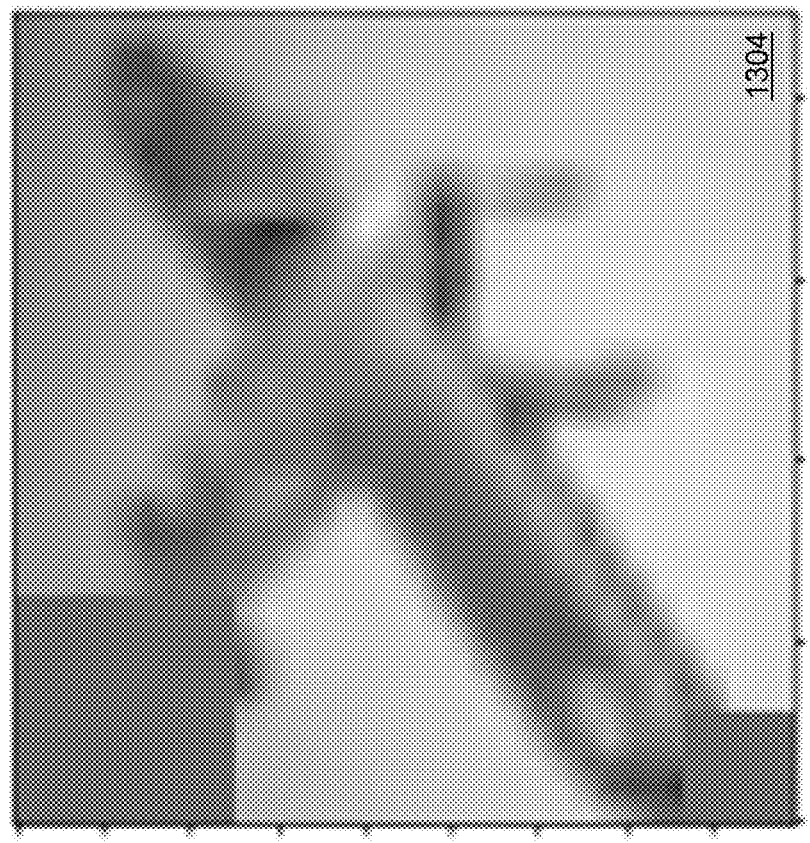
FIG. 13C shows the third image of FIG. 13A after masking that is input to the neural network to be trained.
Figure 14B:
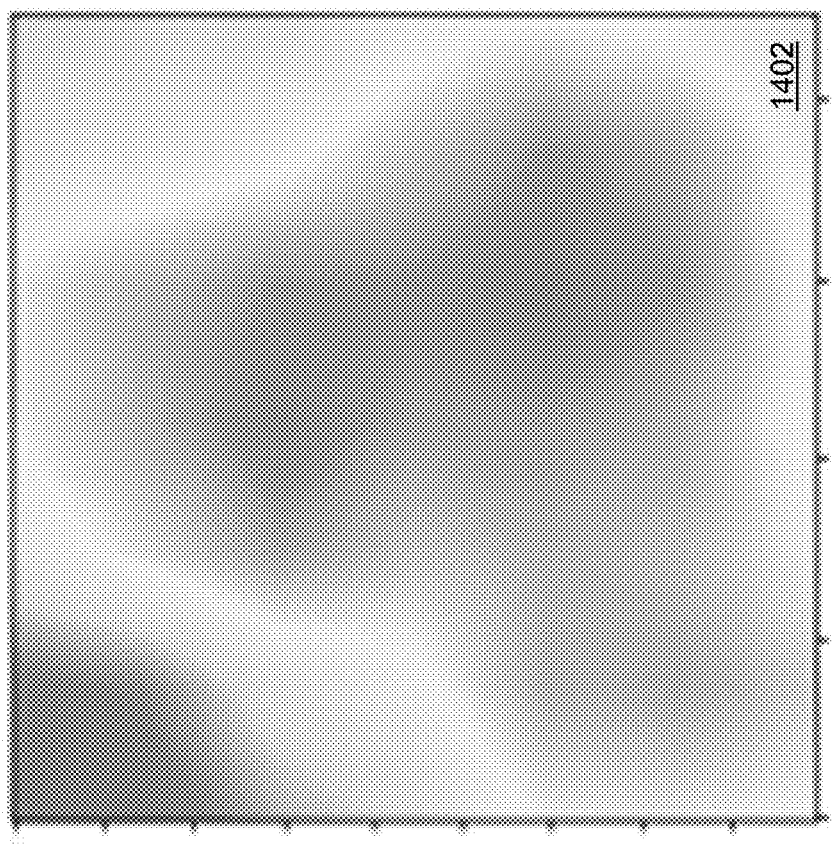
FIG. 14B shows a heat map of the fourth image of FIG. 14A computed from class activation mapping.
Figure 14A:
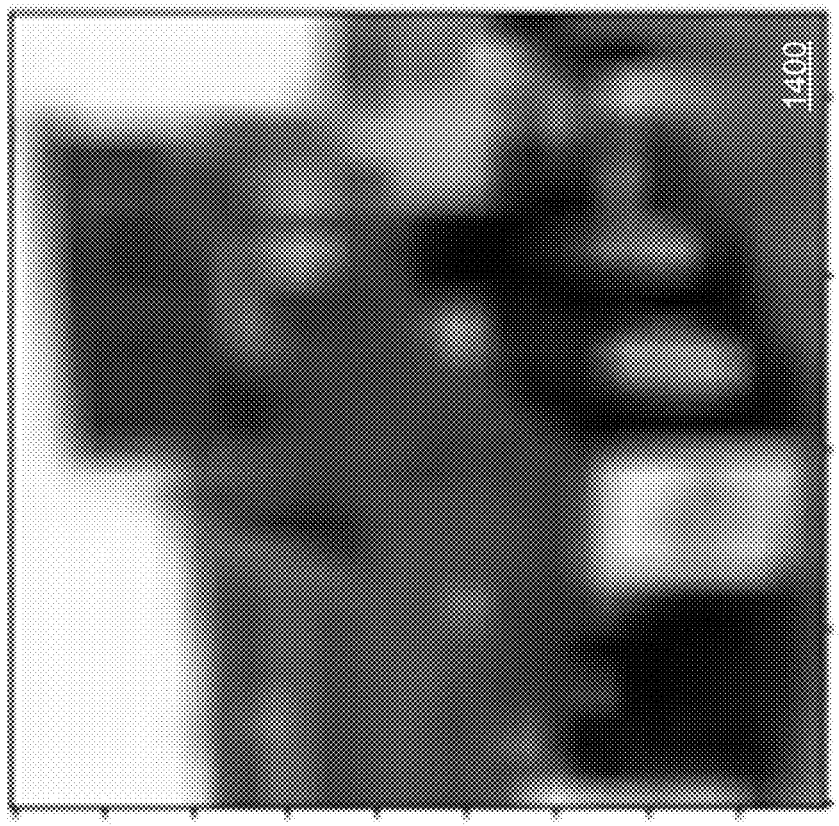
FIG. 14A shows a fourth image.
Figure 14D:
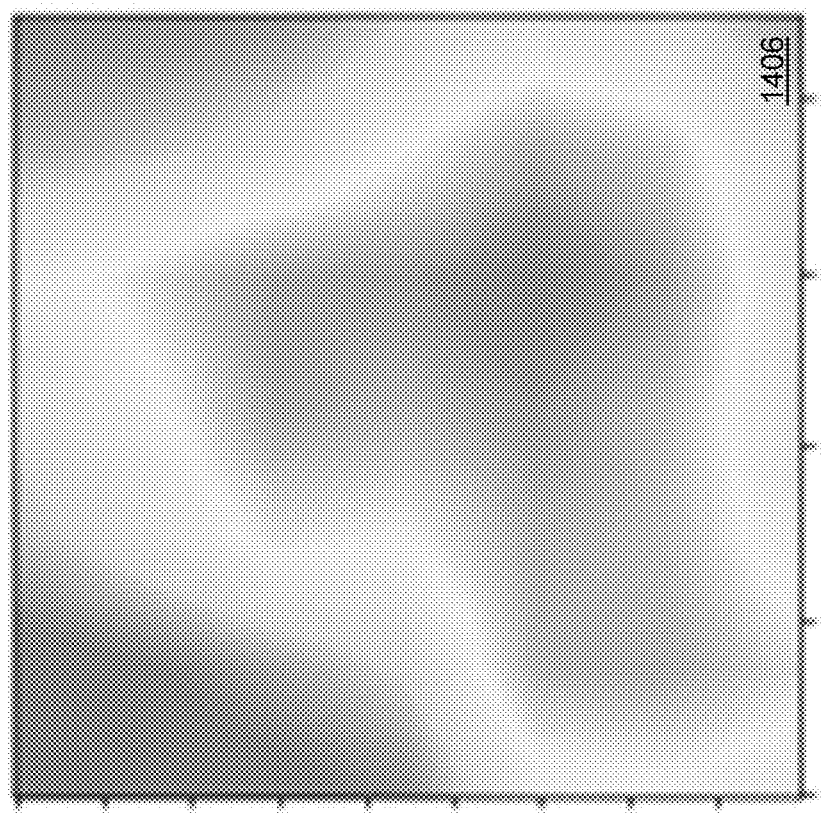
FIG. 14D shows a heat map of the fourth image of FIG. 14B computed from class activation mapping after training the neural network to be trained.
Figure 14C:
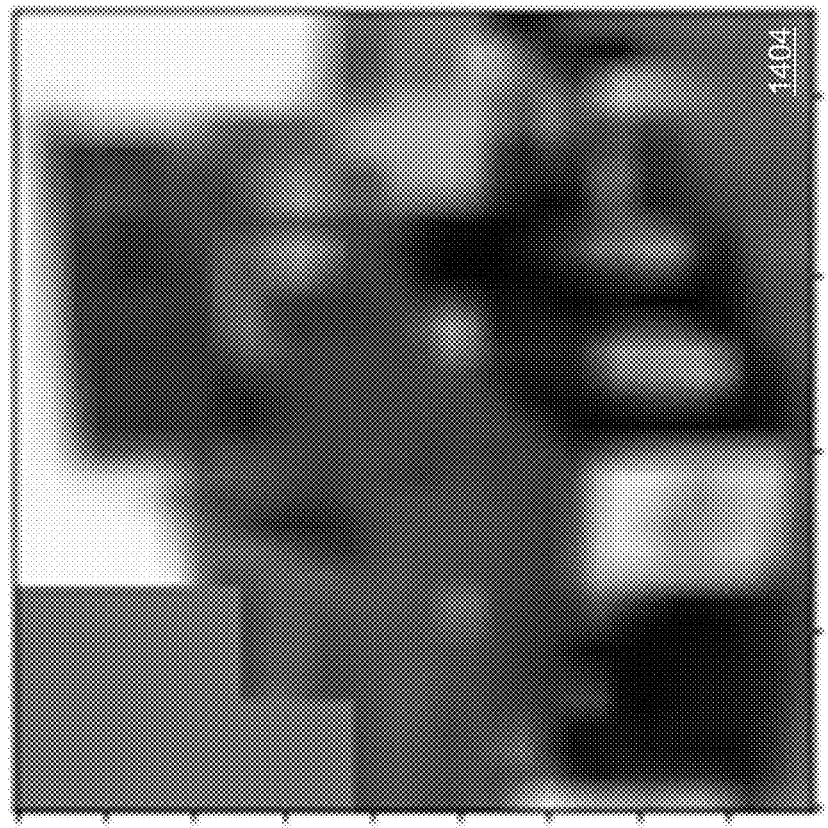
FIG. 14C shows the fourth image of FIG. 14A after masking that is input to the neural network to be trained.
Figure 15B:
FIG. 15B shows a heat map of the fifth image of FIG. 15A computed from class activation mapping.
Figure 15A:
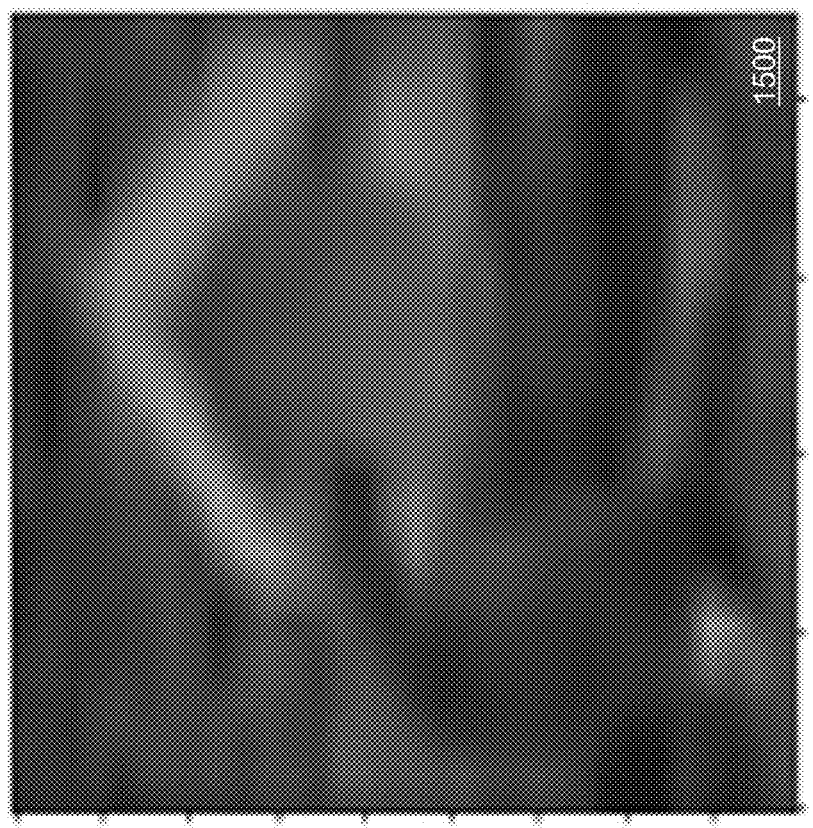
FIG. 15A shows a fifth image.
Figure 15D:
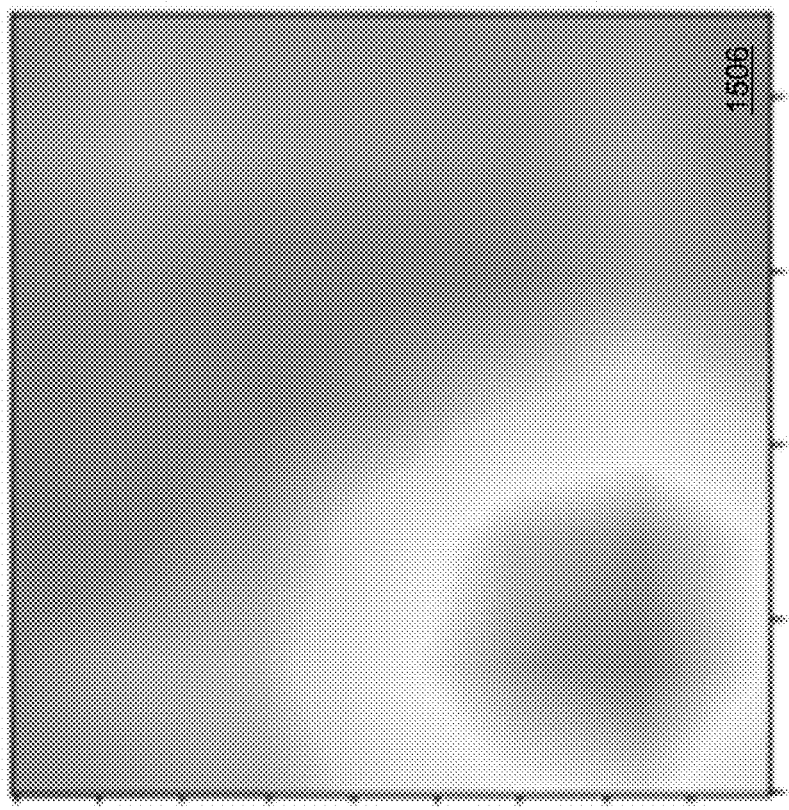
FIG. 15D shows a heat map of the fifth image of FIG. 15A computed from class activation mapping after training the neural network to be trained.
Figure 15C:
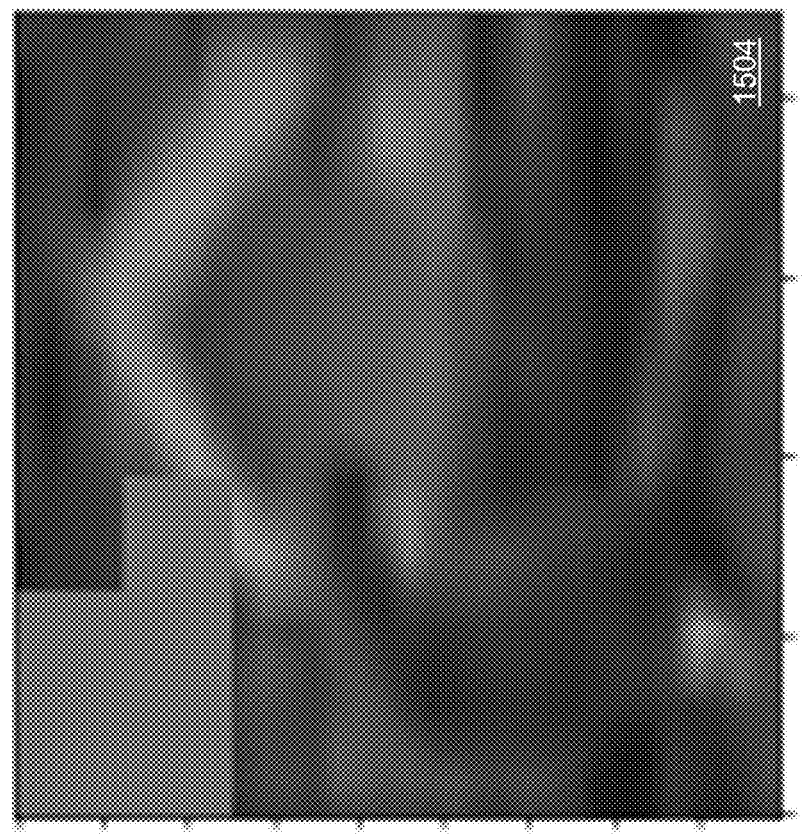
FIG. 15C shows the fifth image of FIG. 15A after masking that is input to the neural network to be trained.

FIG. 11C shows a first masked image 1104 that is input to the neural network to be trained after operation 220; FIG. 12C shows a second masked image 1204 that is input to the neural network to be trained after operation 220; FIG. 13C shows a third masked image 1304 that is input to the neural network to be trained after operation 220; FIG. 14C shows a fourth masked image 1404 that is input to the neural network to be trained after operation 220; and FIG. 15C shows a fifth masked image 1504 that is input to the neural network to be trained after operation 220.

Figure 13D:
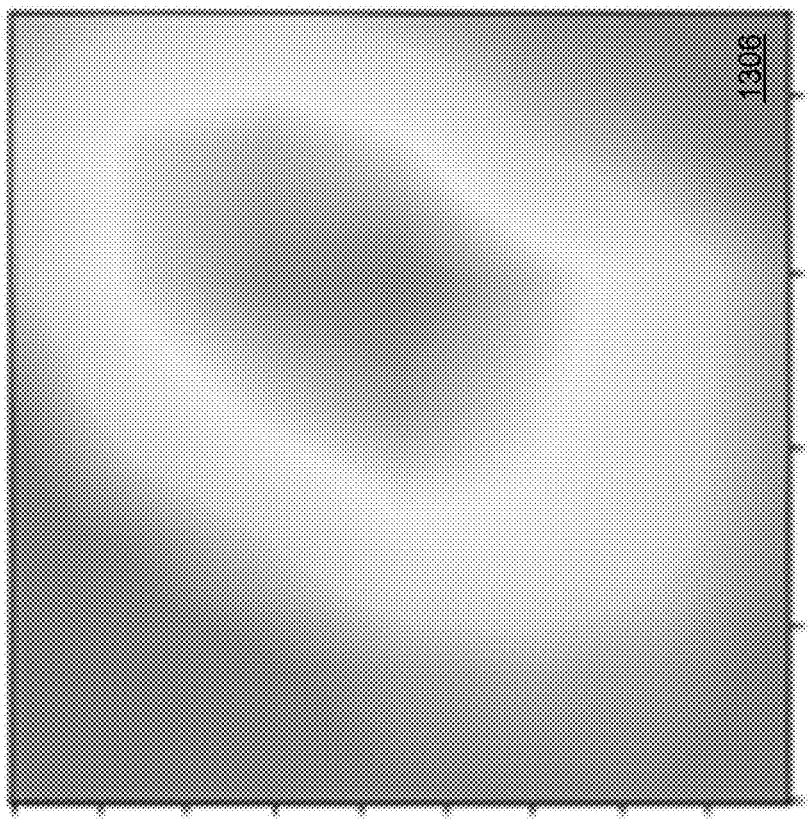
FIG. 13D shows a heat map of the third image of FIG. 13B computed from class activation mapping after training the neural network to be trained.

FIG. 11D shows a first heat map 1106 of first masked image 1104 computed from discriminative localization mapping; FIG. 12D shows a second heat map 1206 of second masked image 1204 computed from discriminative localization mapping; FIG. 13D shows a third heat map 1306 of third masked image 1304 computed from discriminative localization mapping; FIG. 14D shows a fourth heat map 1406 of fourth masked image 1404 computed from discriminative localization mapping; and FIG. 15D shows a fifth heat map 1506 of fifth masked image 1504 computed from discriminative localization mapping.

Figure 11E:
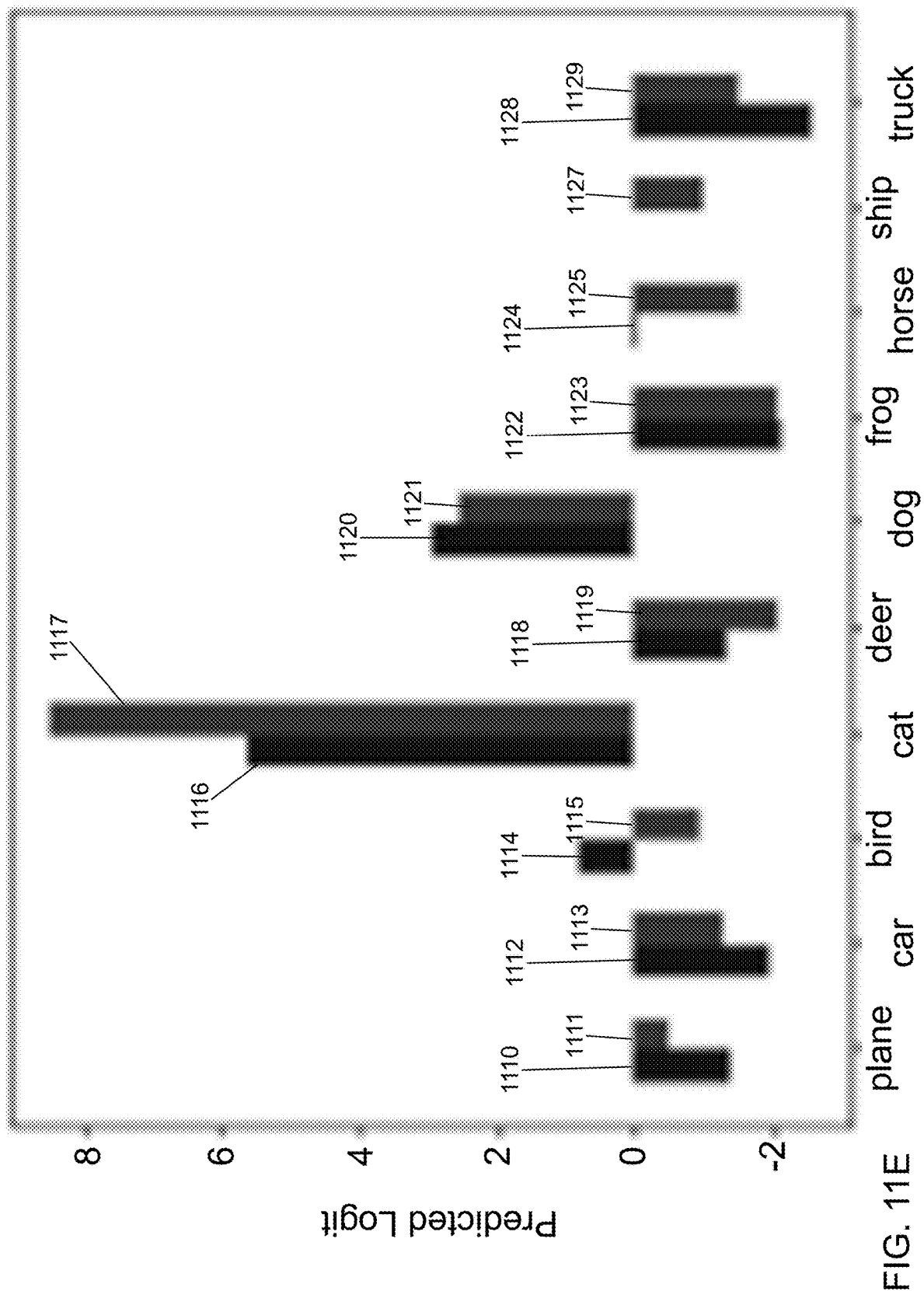
FIG. 11E shows a logit value for the first image of FIG. 11A predicted by the trained neural network.

FIG. 11E shows a logit value for first image 1100 predicted by the trained neural network for each class of CIFAR-10. A first histogram bar 1110 provides the logit value for a plane class prediction for first image 1100 after training DenseNet121 without using training application 122, and a second histogram bar 1111 provides the logit value for a plane class prediction for first image 1100 after training DenseNet121 using training application 122. A third histogram bar 1112 provides the logit value for a car class prediction for first image 1100 after training DenseNet121 without using training application 122, and a fourth histogram bar 1113 provides the logit value for a car class prediction for first image 1100 after training DenseNet121 using training application 122. A fifth histogram bar 1114 provides the logit value for a bird class prediction for first image 1100 after training DenseNet121 without using training application 122, and a sixth histogram bar 1115 provides the logit value for a bird class prediction for first image 1100 after training DenseNet121 using training application 122. A seventh histogram bar 1116 provides the logit value for a cat class prediction for first image 1100 after training DenseNet121 without using training application 122, and an eighth histogram bar 1117 provides the logit value for a cat class prediction for first image 1100 after training DenseNet121 using training application 122. A ninth histogram bar 1118 provides the logit value for a deer class prediction for first image 1100 after training DenseNet121 without using training application 122, and a tenth histogram bar 1119 provides the logit value for a deer class prediction for first image 1100 after training DenseNet121 using training application 122. An eleventh histogram bar 1120 provides the logit value for a dog class prediction for first image 1100 after training DenseNet121 without using training application 122, and a twelfth histogram bar 1121 provides the logit value for a dog class prediction for first image 1100 after training DenseNet121 using training application 122. A thirteenth histogram bar 1122 provides the logit value for a frog class prediction for first image 1100 after training DenseNet121 without using training application 122, and a fourteenth histogram bar 1123 provides the logit value for a frog class prediction for first image 1100 after training DenseNet121 using training application 122. A fifteenth histogram bar 1124 provides the logit value for a horse class prediction for first image 1100 after training DenseNet121 without using training application 122, and a sixteenth histogram bar 1125 provides the logit value for a horse class prediction for first image 1100 after training DenseNet121 using training application 122. A seventeenth histogram bar having a zero value provides the logit value for a ship class prediction for first image 1100 after training DenseNet121 without using training application 122, and an eighteenth histogram bar 1127 provides the logit value for a ship class prediction for first image 1100 after training DenseNet121 using training application 122. A nineteenth histogram bar 1128 provides the logit value for a truck class prediction for first image 1100 after training DenseNet121 without using training application 122, and a twentieth histogram bar 1129 provides the logit value for a truck class prediction for first image 1100 after training DenseNet121 using training application 122. The logit value for the correct class of cat for first image 1100 is much larger using training application 122, and the logit value for the incorrect classes for first image 1100 tends to be smaller using training application 122.

Figure 12E:
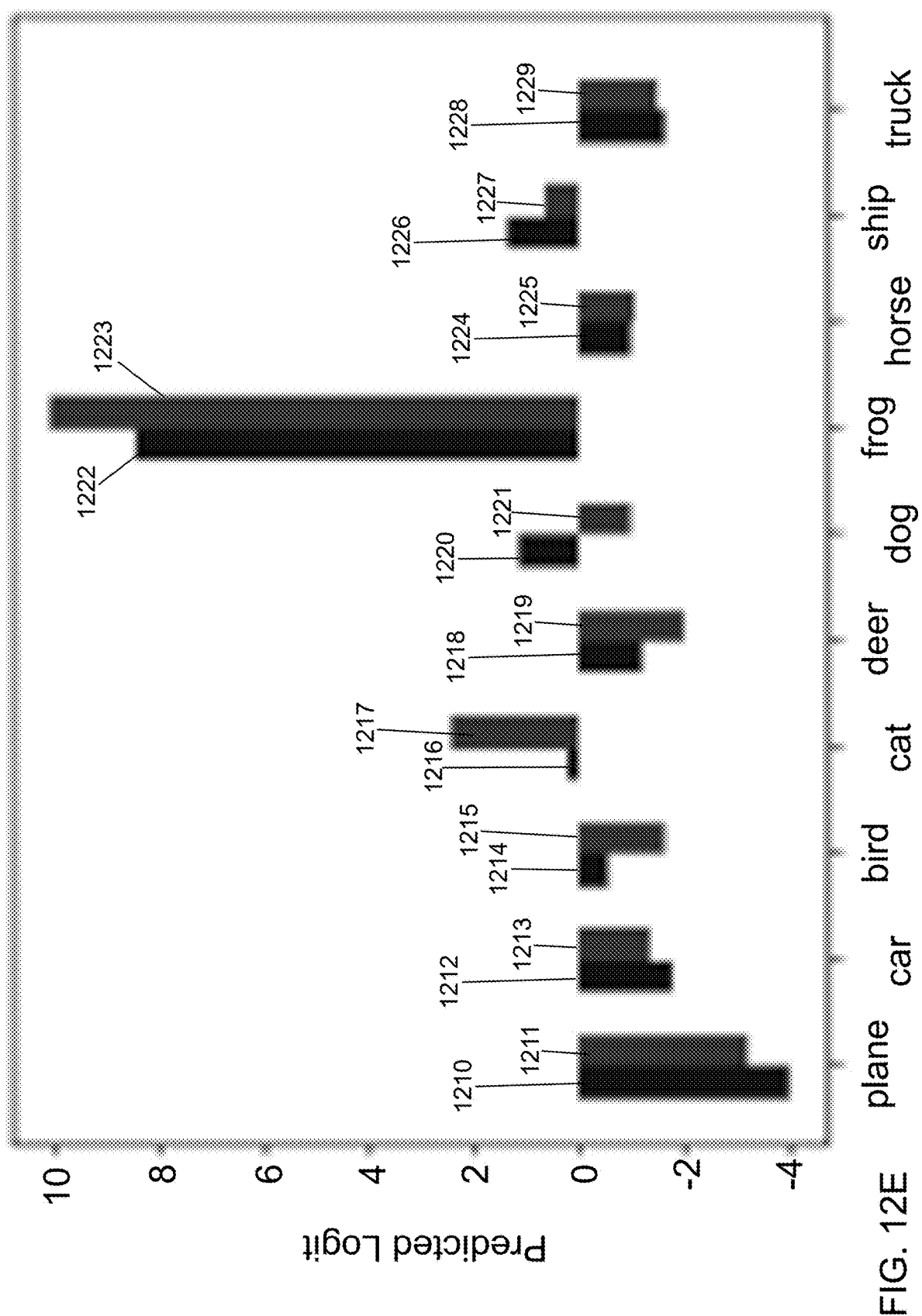
FIG. 12E shows a logit value for the second image of FIG. 12A predicted by the trained neural network.

FIG. 12E shows a logit value for second image 1200 predicted by the trained neural network for each class of CIFAR-10. A first histogram bar 1210 provides the logit value for a plane class prediction for second image 1200 after training DenseNet121 without using training application 122, and a second histogram bar 1211 provides the logit value for a plane class prediction for second image 1200 after training DenseNet121 using training application 122. A third histogram bar 1212 provides the logit value for a car class prediction for second image 1200 after training DenseNet121 without using training application 122, and a fourth histogram bar 1213 provides the logit value for a car class prediction for second image 1200 after training DenseNet121 using training application 122. A fifth histogram bar 1214 provides the logit value for a bird class prediction for second image 1200 after training DenseNet121 without using training application 122, and a sixth histogram bar 1215 provides the logit value for a bird class prediction for second image 1200 after training DenseNet121 using training application 122. A seventh histogram bar 1216 provides the logit value for a cat class prediction for second image 1200 after training DenseNet121 without using training application 122, and an eighth histogram bar 1217 provides the logit value for a cat class prediction for second image 1200 after training DenseNet121 using training application 122. A ninth histogram bar 1218 provides the logit value for a deer class prediction for second image 1200 after training DenseNet121 without using training application 122, and a tenth histogram bar 1219 provides the logit value for a deer class prediction for second image 1200 after training DenseNet121 using training application 122. An eleventh histogram bar 1220 provides the logit value for a dog class prediction for second image 1200 after training DenseNet121 without using training application 122, and a twelfth histogram bar 1221 provides the logit value for a dog class prediction for second image 1200 after training DenseNet121 using training application 122. A thirteenth histogram bar 1222 provides the logit value for a frog class prediction for second image 1200 after training DenseNet121 without using training application 122, and a fourteenth histogram bar 1223 provides the logit value for a frog class prediction for second image 1200 after training DenseNet121 using training application 122. A fifteenth histogram bar 1224 provides the logit value for a horse class prediction for second image 1200 after training DenseNet121 without using training application 122, and a sixteenth histogram bar 1225 provides the logit value for a horse class prediction for second image 1200 after training DenseNet121 using training application 122. A seventeenth histogram bar 1226 provides the logit value for a ship class prediction for second image 1200 after training DenseNet121 without using training application 122, and an eighteenth histogram bar 1227 provides the logit value for a ship class prediction for second image 1200 after training DenseNet121 using training application 122. A nineteenth histogram bar 1228 provides the logit value for a truck class prediction for second image 1200 after training DenseNet121 without using training application 122, and a twentieth histogram bar 1229 provides the logit value for a truck class prediction for second image 1200 after training DenseNet121 using training application 122. The logit value for the correct class of frog for second image 1200 is much larger using training application 122, and the logit value for the incorrect classes for second image 1200 tends to be smaller using training application 122.

Figure 13E:
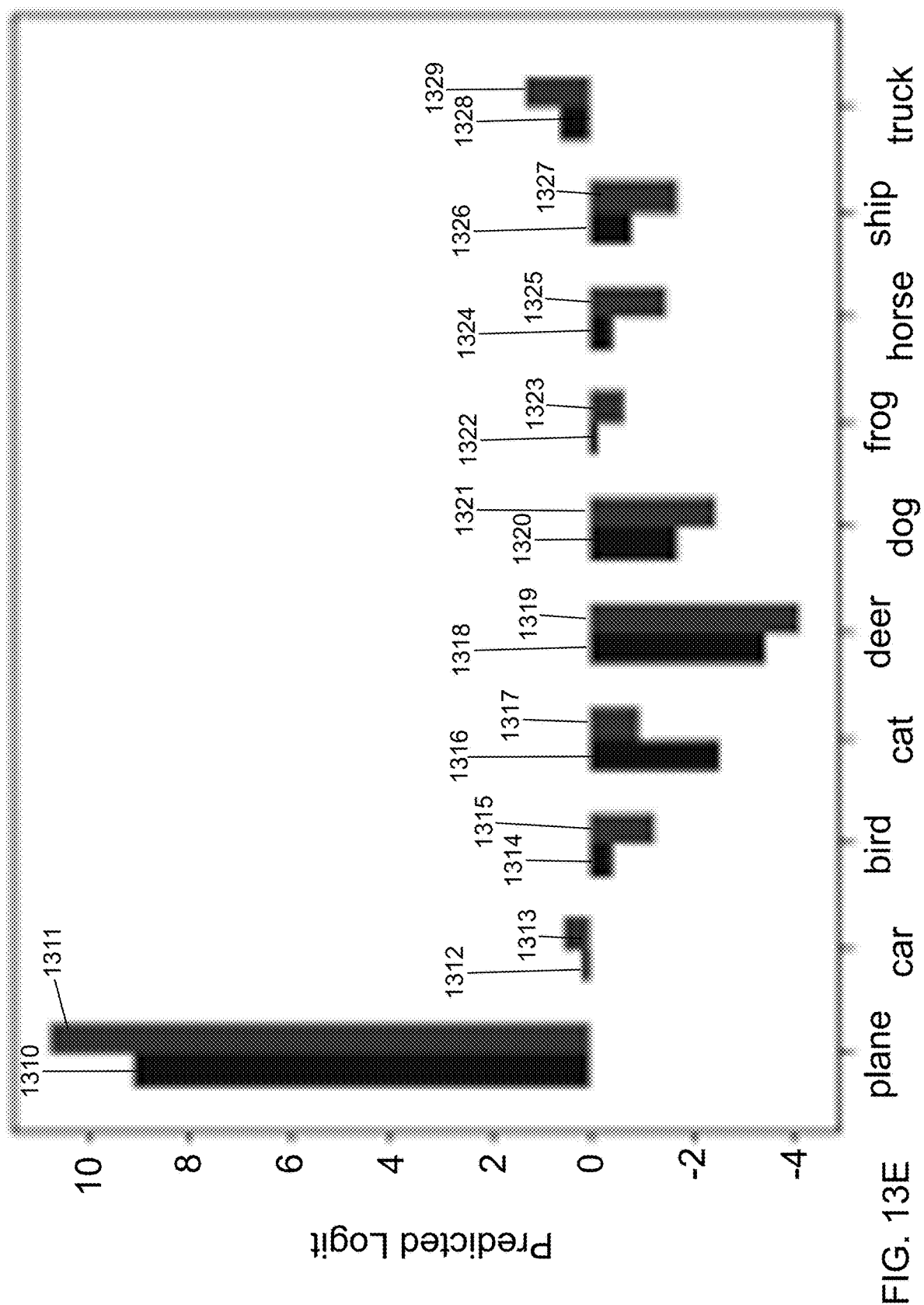
FIG. 13E shows a logit value for the third image of FIG. 13A predicted by the trained neural network.

FIG. 13E shows a logit value for third image 1300 predicted by the trained neural network for each class of CIFAR-10. A first histogram bar 1310 provides the logit value for a plane class prediction for third image 1300 after training DenseNet121 without using training application 122, and a second histogram bar 1311 provides the logit value for a plane class prediction for third image 1300 after training DenseNet121 using training application 122. A third histogram bar 1312 provides the logit value for a car class prediction for third image 1300 after training DenseNet121 without using training application 122, and a fourth histogram bar 1313 provides the logit value for a car class prediction for third image 1300 after training DenseNet121 using training application 122. A fifth histogram bar 1314 provides the logit value for a bird class prediction for third image 1300 after training DenseNet121 without using training application 122, and a sixth histogram bar 1315 provides the logit value for a bird class prediction for third image 1300 after training DenseNet121 using training application 122. A seventh histogram bar 1316 provides the logit value for a cat class prediction for third image 1300 after training DenseNet121 without using training application 122, and an eighth histogram bar 1317 provides the logit value for a cat class prediction for third image 1300 after training DenseNet121 using training application 122. A ninth histogram bar 1318 provides the logit value for a deer class prediction for third image 1300 after training DenseNet121 without using training application 122, and a tenth histogram bar 1319 provides the logit value for a deer class prediction for third image 1300 after training DenseNet121 using training application 122. An eleventh histogram bar 1320 provides the logit value for a dog class prediction for third image 1300 after training DenseNet121 without using training application 122, and a twelfth histogram bar 1321 provides the logit value for a dog class prediction for third image 1300 after training DenseNet121 using training application 122. A thirteenth histogram bar 1322 provides the logit value for a frog class prediction for third image 1300 after training DenseNet121 without using training application 122, and a fourteenth histogram bar 1323 provides the logit value for a frog class prediction for third image 1300 after training DenseNet121 using training application 122. A fifteenth histogram bar 1324 provides the logit value for a horse class prediction for third image 1300 after training DenseNet121 without using training application 122, and a sixteenth histogram bar 1325 provides the logit value for a horse class prediction for third image 1300 after training DenseNet121 using training application 122. A seventeenth histogram bar 1326 provides the logit value for a ship class prediction for third image 1300 after training DenseNet121 without using training application 122, and an eighteenth histogram bar 1327 provides the logit value for a ship class prediction for third image 1300 after training DenseNet121 using training application 122. A nineteenth histogram bar 1328 provides the logit value for a truck class prediction for third image 1300 after training DenseNet121 without using training application 122, and a twentieth histogram bar 1329 provides the logit value for a truck class prediction for third image 1300 after training DenseNet121 using training application 122. The logit value for the correct class of plane for third image 1300 is much larger using training application 122, and the logit value for the incorrect classes for third image 1300 tends to be smaller using training application 122.

Figure 14E:
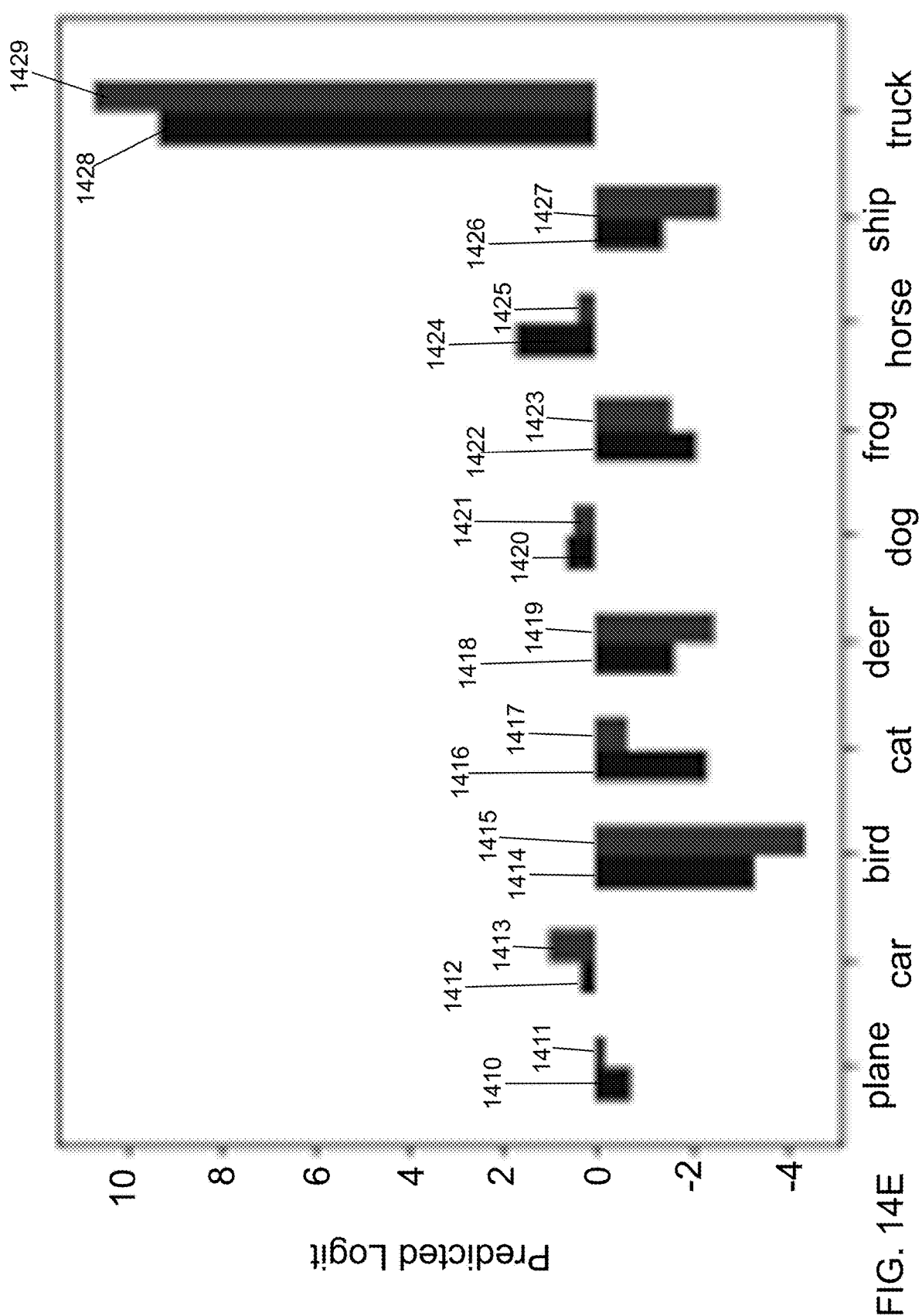
FIG. 14E shows a logit value for the fourth image of FIG. 14A predicted by the trained neural network.

FIG. 14E shows a logit value for fourth image 1400 predicted by the trained neural network for each class of CIFAR-10. A first histogram bar 1410 provides the logit value for a plane class prediction for fourth image 1400 after training DenseNet121 without using training application 122, and a second histogram bar 1411 provides the logit value for a plane class prediction for fourth image 1400 after training DenseNet121 using training application 122. A third histogram bar 1412 provides the logit value for a car class prediction for fourth image 1400 after training DenseNet121 without using training application 122, and a fourth histogram bar 1413 provides the logit value for a car class prediction for fourth image 1400 after training DenseNet121 using training application 122. A fifth histogram bar 1414 provides the logit value for a bird class prediction for fourth image 1400 after training DenseNet121 without using training application 122, and a sixth histogram bar 1415 provides the logit value for a bird class prediction for fourth image 1400 after training DenseNet121 using training application 122. A seventh histogram bar 1416 provides the logit value for a cat class prediction for fourth image 1400 after training DenseNet121 without using training application 122, and an eighth histogram bar 1417 provides the logit value for a cat class prediction for fourth image 1400 after training DenseNet121 using training application 122. A ninth histogram bar 1418 provides the logit value for a deer class prediction for fourth image 1400 after training DenseNet121 without using training application 122, and a tenth histogram bar 1419 provides the logit value for a deer class prediction for fourth image 1400 after training DenseNet121 using training application 122. An eleventh histogram bar 1420 provides the logit value for a dog class prediction for fourth image 1400 after training DenseNet121 without using training application 122, and a twelfth histogram bar 1421 provides the logit value for a dog class prediction for fourth image 1400 after training DenseNet121 using training application 122. A thirteenth histogram bar 1422 provides the logit value for a frog class prediction for fourth image 1400 after training DenseNet121 without using training application 122, and a fourteenth histogram bar 1423 provides the logit value for a frog class prediction for fourth image 1400 after training DenseNet121 using training application 122. A fifteenth histogram bar 1424 provides the logit value for a horse class prediction for fourth image 1400 after training DenseNet121 without using training application 122, and a sixteenth histogram bar 1425 provides the logit value for a horse class prediction for fourth image 1400 after training DenseNet121 using training application 122. A seventeenth histogram bar 1426 provides the logit value for a ship class prediction for fourth image 1400 after training DenseNet121 without using training application 122, and an eighteenth histogram bar 1427 provides the logit value for a ship class prediction for fourth image 1400 after training DenseNet121 using training application 122. A nineteenth histogram bar 1428 provides the logit value for a truck class prediction for fourth image 1400 after training DenseNet121 without using training application 122, and a twentieth histogram bar 1429 provides the logit value for a truck class prediction for fourth image 1400 after training DenseNet121 using training application 122. The logit value for the correct class of truck for fourth image 1400 is much larger using training application 122, and the logit value for the incorrect classes for fourth image 1400 tends to be smaller using training application 122.

Figure 15E:
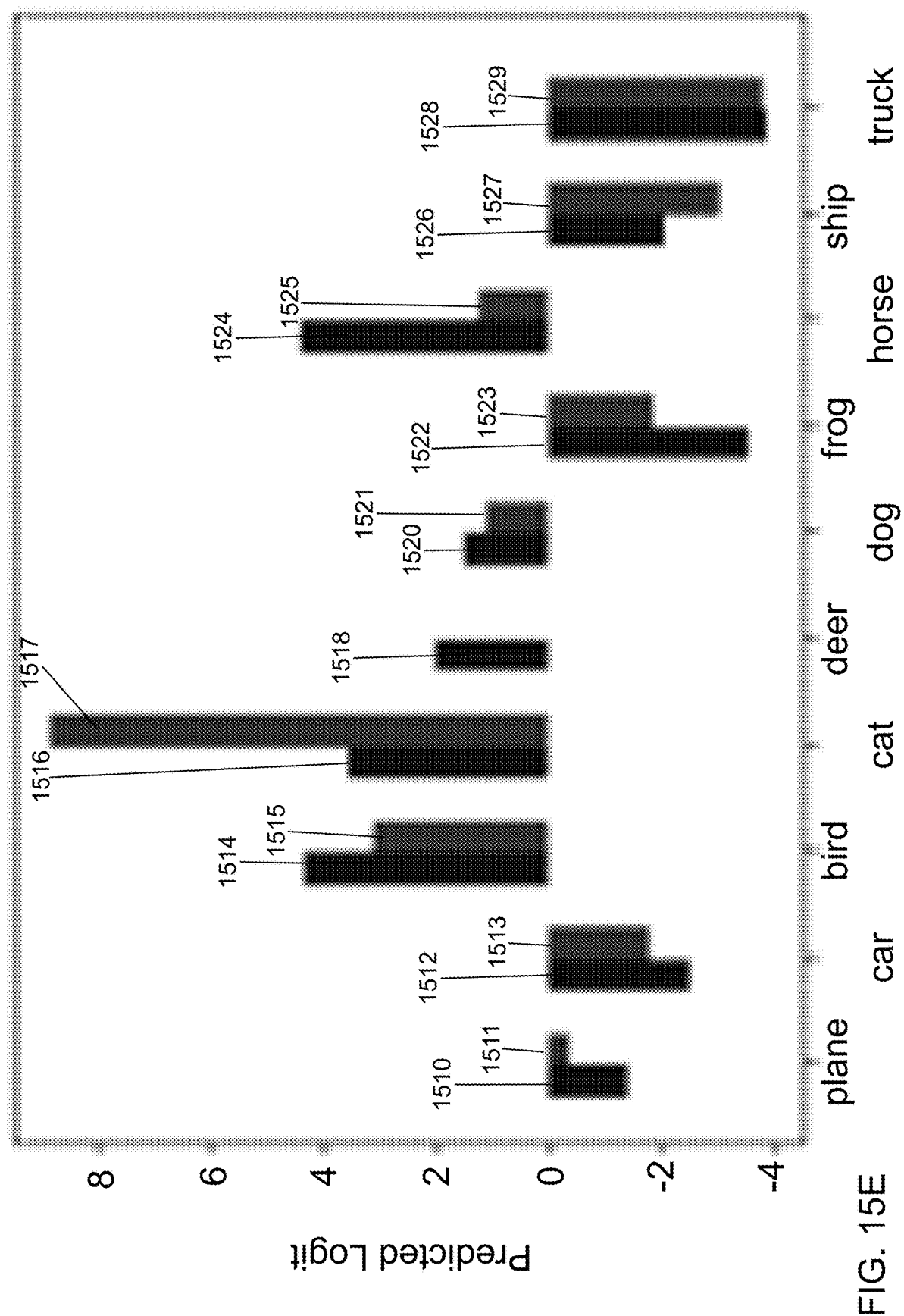
FIG. 15E shows a logit value for the fifth image of FIG. 15A predicted by the trained neural network.

FIG. 15E shows a logit value for fifth image 1500 predicted by the trained neural network for each class of CIFAR-10. A first histogram bar 1510 provides the logit value for a plane class prediction for fifth image 1500 after training DenseNet121 without using training application 122, and a second histogram bar 1511 provides the logit value for a plane class prediction for fifth image 1500 after training DenseNet121 using training application 122. A third histogram bar 1512 provides the logit value for a car class prediction for fifth image 1500 after training DenseNet121 without using training application 122, and a fourth histogram bar 1513 provides the logit value for a car class prediction for fifth image 1500 after training DenseNet121 using training application 122. A fifth histogram bar 1514 provides the logit value for a bird class prediction for fifth image 1500 after training DenseNet121 without using training application 122, and a sixth histogram bar 1515 provides the logit value for a bird class prediction for fifth image 1500 after training DenseNet121 using training application 122. A seventh histogram bar 1516 provides the logit value for a cat class prediction for fifth image 1500 after training DenseNet121 without using training application 122, and an eighth histogram bar 1517 provides the logit value for a cat class prediction for fifth image 1500 after training DenseNet121 using training application 122. A ninth histogram bar 1518 provides the logit value for a deer class prediction for fifth image 1500 after training DenseNet121 without using training application 122, and a tenth histogram bar having a zero value provides the logit value for a deer class prediction for fifth image 1500 after training DenseNet121 using training application 122. An eleventh histogram bar 1520 provides the logit value for a dog class prediction for fifth image 1500 after training DenseNet121 without using training application 122, and a twelfth histogram bar 1521 provides the logit value for a dog class prediction for fifth image 1500 after training DenseNet121 using training application 122. A thirteenth histogram bar 1522 provides the logit value for a frog class prediction for fifth image 1500 after training DenseNet121 without using training application 122, and a fourteenth histogram bar 1523 provides the logit value for a frog class prediction for fifth image 1500 after training DenseNet121 using training application 122. A fifteenth histogram bar 1524 provides the logit value for a horse class prediction for fifth image 1500 after training DenseNet121 without using training application 122, and a sixteenth histogram bar 1525 provides the logit value for a horse class prediction for fifth image 1500 after training DenseNet121 using training application 122. A seventeenth histogram bar 1526 provides the logit value for a ship class prediction for fifth image 1500 after training DenseNet121 without using training application 122, and an eighteenth histogram bar 1527 provides the logit value for a ship class prediction for fifth image 1500 after training DenseNet121 using training application 122. A nineteenth histogram bar 1528 provides the logit value for a truck class prediction for fifth image 1500 after training DenseNet121 without using training application 122, and a twentieth histogram bar 1529 provides the logit value for a truck class prediction for fifth image 1500 after training DenseNet121 using training application 122. The logit value for the correct class of cat for fifth image 1500 is significantly larger using training application 122, and the logit value for the incorrect classes for fifth image 1500 tends to be smaller using training application 122. In fact, after training DenseNet121 without using training application 122, the incorrect classes of bird or horse having higher logit values than the correct class of cat.

The impact of using training application 122 is to provide feature engineering by proportionally shrinking the important regions of each image and allowing the main neural network to focus on more relevant pixels with less noise using the feedback neural network and discriminative localization mapping. Training application 122 using the feedback neural network and discriminative localization mapping can be easily adapted to existing state-of-the-art neural networks without any architecture changes or optimization updates. Experiments show significant improvements using existing state-of-the-art architectures both in model training and inference. Training application 122 using the feedback neural network and discriminative localization mapping achieves both interpretability and accuracy improvements to enable neural network architectures to become more transparent and trusted by users.

There are applications for training application 122 and/or prediction application 422 in many areas such as process control and equipment health monitoring, image processing and classification, data segmentation, data analysis, etc. For example, the image processing may be applied to manufacturing defect detection, storm damage estimation, medical diagnoses, product identification, animal tacking, face detection, and agricultural product water stress, yield quality, and weed detection.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) execute a forward propagation of a first neural network to compute a first weight value for each neuron of the first neural network using a plurality of observation vectors, wherein the first neural network includes a layer type for each layer of a plurality of neural network layers, wherein the plurality of neural network layers include a plurality of convolutional layers;
   (B) execute a backward propagation of the first neural network from a last layer to a last convolution layer of the plurality of convolutional layers to compute a gradient vector for first weight values of the last convolution layer using the plurality of observation vectors;
   (C) compute a discriminative localization map for each observation vector of the plurality of observation vectors with the computed gradient vector using a discriminative localization map function;
   (D) execute a forward and a backward propagation of a second neural network to compute a second weight value for each neuron of the second neural network using the discriminative localization map computed for each observation vector of the plurality of observation vectors, wherein a definition of each layer of a plurality of neural network layers of the second neural network is identical to a definition of each layer of the plurality of neural network layers of the first neural network;
   (E) repeat (A) through (D) a predefined number of iterations, wherein the first weight value for each neuron of the first neural network in (A) is initialized with the second weight value for each neuron of the second neural network computed in (D) for a next iteration of (A); and
   output the computed second weight value for each neuron of the second neural network to define a trained second neural network model.

2. The non-transitory computer-readable medium of claim 1, wherein before (A), the computer-readable instructions further cause the computing device to execute the forward and the backward propagation of the second neural network a second predefined number of iterations to compute a third weight value for each neuron of the second neural network using the plurality of observation vectors, wherein the third weight value is used to initialize the second weight value on a first iteration of (D).

3. The non-transitory computer-readable medium of claim 1, wherein before (D), the computer-readable instructions further cause the computing device to initialize the second weight value for each neuron of the second neural network using a predefined weight value for each neuron of the second neural network.

4. The non-transitory computer-readable medium of claim 1, wherein before (A), the computer-readable instructions further cause the computing device to initialize the first weight value for each neuron of the first neural network using a predefined weight value for each neuron of the first neural network.

5. The non-transitory computer-readable medium of claim 1, wherein before (D), the computer-readable instructions further cause the computing device to randomly select a batch of observation vectors from the plurality of observation vectors, wherein a number of observation vectors selected in the batch of observation vectors is a batch size value, wherein the discriminative localization map computed for each observation vector of the batch of observation vectors is used in (D).

6. The non-transitory computer-readable medium of claim 1, wherein after (C) and before (D), the computer-readable instructions further cause the computing device to apply a predefined activation function to the discriminative localization map computed for each observation vector of the plurality of observation vectors to define a modified discriminative localization map for each observation vector of the plurality of observation vectors, wherein the modified discriminative localization map is used in (D) instead of the discriminative localization map.

7. The non-transitory computer-readable medium of claim 6, wherein the predefined activation function applies an up sampling of the discriminative localization map from a dimension of the last convolution layer to a dimension of a respective observation vector.

8. The non-transitory computer-readable medium of claim 1, wherein, after (E), the computer-readable instructions further cause the computing device to:
   read a new observation vector from a dataset;
   input the read new observation vector to the trained second neural network model to predict a characteristic value of the read new observation vector; and
   output the predicted characteristic value.

9. The non-transitory computer-readable medium of claim 8, wherein the new observation vector is a digital image.

10. The non-transitory computer-readable medium of claim 9, wherein the predicted characteristic value is a class selected to describe a content of the digital image.

11. The non-transitory computer-readable medium of claim 1, wherein each observation vector is a digital image.

12. The non-transitory computer-readable medium of claim 11, wherein each discriminative localization map identifies pixels in a respective digital image that are important relative to other pixels.

13. The non-transitory computer-readable medium of claim 12, wherein each discriminative localization map $G_{ij}$ is defined using $$G_{ij} = \begin{cases} 1 \text{ if } \sum_K \beta_{ij}^k A_{ij}^k \geq a \\ 0 \text{ otherwise} \end{cases}, \text{ where } \beta_{ij}^k = \frac{\partial y^l}{\partial A_{ij}^k},$$

i and j are an index to a pixel of a feature map $A^k$ of a channel k defined by the last convolution layer, K is a total number of channels included in the last convolution layer, $y^l$ is a logit value for a class l, l is a predefined class for the respective digital image, and $\alpha$ is a predefined threshold.

14. The non-transitory computer-readable medium of claim 13, wherein after (C) and before (D), the computer-readable instructions further cause the computing device to apply a predefined activation function to each discriminative localization map to define a modified discriminative localization map for each observation vector of the plurality of observation vectors, wherein the modified discriminative localization map is used in (D) instead of the discriminative localization map.

15. The non-transitory computer-readable medium of claim 14, wherein the predefined activation function up samples the discriminative localization map from a dimension of the last convolution layer to a dimension of the respective digital image.

16. A computing device comprising:
a processor; and
a non-transitory computer-readable medium operably coupled to the processor, the computer-readable medium having computer-readable instructions stored thereon that, when executed by the processor, cause the computing device to
(A) execute a forward propagation of a first neural network to compute a first weight value for each neuron of the first neural network using a plurality of observation vectors, wherein the first neural network includes a layer type for each layer of a plurality of neural network layers, wherein the plurality of neural network layers include a plurality of convolutional layers;
(B) execute a backward propagation of the first neural network from a last layer to a last convolution layer of the plurality of convolutional layers to compute a gradient vector for first weight values of the last convolution layer using the plurality of observation vectors;
(C) compute a discriminative localization map for each observation vector of the plurality of observation vectors with the computed gradient vector using a discriminative localization map function;
(D) execute a forward and a backward propagation of a second neural network to compute a second weight value for each neuron of the second neural network using the discriminative localization map computed for each observation vector of the plurality of observation vectors, wherein a definition of each layer of a plurality of neural network layers of the second neural network is identical to a definition of each layer of the plurality of neural network layers of the first neural network;
(E) repeat (A) through (D) a predefined number of iterations, wherein the first weight value for each neuron of the first neural network in (A) is initialized with the second weight value for each neuron of the second neural network computed in (D) for a next iteration of (A); and
output the computed second weight value for each neuron of the second neural network to define a trained second neural network model.

17. A method of training a neural network machine learning model, the method comprising:
(A) executing, by a computing device, a forward propagation of a first neural network to compute a first weight value for each neuron of the first neural network using a plurality of observation vectors, wherein the first neural network includes a layer type for each layer of a plurality of neural network layers, wherein the plurality of neural network layers include a plurality of convolutional layers;
(B) executing, by the computing device, a backward propagation of the first neural network from a last layer to a last convolution layer of the plurality of convolutional layers to compute a gradient vector for first weight values of the last convolution layer using the plurality of observation vectors;
(C) computing, by the computing device, a discriminative localization map for each observation vector of the plurality of observation vectors with the computed gradient vector using a discriminative localization map function;
(D) executing, by the computing device, a forward and a backward propagation of a second neural network to compute a second weight value for each neuron of the second neural network using the discriminative localization map computed for each observation vector of the plurality of observation vectors, wherein a definition of each layer of a plurality of neural network layers of the second neural network is identical to a definition of each layer of the plurality of neural network layers of the first neural network;
(E) repeating, by the computing device, (A) through (D) a predefined number of iterations, wherein the first weight value for each neuron of the first neural network in (A) is initialized with the second weight value for each neuron of the second neural network computed in (D) for a next iteration of (A); and
outputting, by the computing device, the computed second weight value for each neuron of the second neural network to define a trained second neural network model.

18. The method of claim 17, further comprising, before (A), executing, by the computing device, the forward and the backward propagation of the second neural network a second predefined number of iterations to compute a third weight value for each neuron of the second neural network using the plurality of observation vectors, wherein the third weight value is used to initialize the second weight value on a first iteration of (D).

19. The method of claim 17, further comprising before (D), initializing, by the computing device, the second weight value for each neuron of the second neural network using a predefined weight value for each neuron of the second neural network.

20. The method of claim 17, further comprising before (A), initializing, by the computing device, the first weight value for each neuron of the first neural network using a predefined weight value for each neuron of the first neural network.

21. The method of claim 17, further comprising before (D), randomly selecting, by the computing device, a batch of observation vectors from the plurality of observation vectors, wherein a number of observation vectors selected in the batch of observation vectors is a batch size value, wherein the discriminative localization map computed for each observation vector of the batch of observation vectors is used in (D).

22. The method of claim 17, further comprising after (C) and before (D), applying, by the computing device, a predefined activation function to the discriminative localization map computed for each observation vector of the plurality of observation vectors to define a modified discriminative localization map for each observation vector of the plurality of observation vectors, wherein the modified discriminative localization map is used in (D) instead of the discriminative localization map.

23. The method of claim 22, wherein the predefined activation function applies an up sampling of the discriminative localization map from a dimension of the last convolution layer to a dimension of a respective observation vector.

24. The method of claim 17, wherein each observation vector is a digital image.

25. The method of claim 17, further comprising, after (E):
reading, by the computing device, a new observation vector from a dataset;
inputting, by the computing device, the read new observation vector to the trained second neural network model to predict a characteristic value of the read new observation vector; and
outputting, by the computing device, the predicted characteristic value.

26. The method of claim 25, wherein the new observation vector is a digital image and the predicted characteristic value is a class selected to describe a content of the digital image.

27. The method of claim 24, wherein each discriminative localization map identifies pixels in a respective digital image that are important relative to other pixels.

28. The method of claim 27, wherein each discriminative localization map $G_{ij}$ is defined using $$G_{ij} = \begin{cases} 1 & \text{if } \sum_K \beta_{ij}^k A_{ij}^k \geq \alpha \\ 0 & \text{otherwise} \end{cases},$$

where $$\beta_{ij}^k = \frac{\partial y^l}{\partial A_{ij}^k},$$

i and j are an index to a pixel of a feature map $A^k$ of a channel k defined by the last convolution layer, K is a total number of channels included in the last convolution layer, $y^l$ is a logit value for a class l, l is a predefined class for the respective digital image, and α is a predefined threshold.

29. The method of claim 28, further comprising, after (C) and before (D), applying, by the computing device, a predefined activation function to each discriminative localization map to define a modified discriminative localization map for each observation vector of the plurality of observation vectors, wherein the modified discriminative localization map is used in (D) instead of the discriminative localization map.

30. The method of claim 29, wherein the predefined activation function up samples the discriminative localization map from a dimension of the last convolution layer to a dimension of the respective digital image.

* * * * *

UNITED STATES PATENT AND TRADEMARK OFFICE
CERTIFICATE OF CORRECTION

PATENT NO. : 11,195,084 B1
APPLICATION NO. : 17/198737
DATED : December 7, 2021
INVENTOR(S) : Xinmin Wu et al.

It is certified that error appears in the above-identified patent and that said Letters Patent is hereby corrected as shown below:

In the Specification

Column 3, Lines 66-67 – Column 4, Lines 1-2:
Delete the phrase "$W_i \in R^{h \times d}$ with a set of input $x_i \in R^{d_i}$ (neurons) and a bias term $\beta_i \in R^{h_i}$. The corresponding output of the layer is itself a set of neurons $\alpha_i(x_i) \in R^{h_i}$" and replace with --$W_i \in \mathbb{R}^{h \times d}$ with a set of input $x_i \in \mathbb{R}^{d_i}$ (neurons) and a bias term $\beta_i \in \mathbb{R}^{h_i}$. The corresponding output of the layer is itself a set of neurons $a_i(x_i) \in \mathbb{R}^{h_i}$ --.

Column 4, Line 4:
Delete the phrase "$\alpha_i(x_i) = \sigma(W_i x_i + \beta_i)$," and replace with --$a_i(x_i) = \sigma(W_i x_i + \beta_i)$,--.

Column 4, Line 7:
Delete the phrase "$\cup \{W_i, \beta_i\}_{i=1}^{l}$" and replace with --$\cup \{W_i, \beta_i\}_{i=1}^{l}$--.

Column 4, Line 9:
Delete the phrase "$w \in R^d$" and replace with --$w \in \mathbb{R}^d$--.

Column 14, Line 20:
Delete the phrase "$\beta_{ij}^k$" and replace with --$\beta_{ij}^k$--.

Column 14, Line 26:
Delete the phrase "$\Sigma_K \beta_{ij}^k A_{ij}^k < \alpha$," and replace with --$\Sigma_K \beta_{ij}^k A_{ij}^k < a$--.

Column 14, Line 38:
Delete the phrase "$X_{mn}'$" and replace with --$X'_{mn}$--.

Signed and Sealed this
Twenty-fourth Day of May, 2022

*Katherine Kelly Vidal*
Katherine Kelly Vidal
*Director of the United States Patent and Trademark Office*

CERTIFICATE OF CORRECTION (continued)
U.S. Pat. No. 11,195,084 B1

Column 14, Line 39:
Delete the phrase "$X_{mn}' = F(G_{ij})X_{mn}$," and replace with --$X'_{mn} = F(G_{ij})X_{mn}$,--.

Column 14, Line 42:
Delete the phrase "$X_{mn}'$" and replace with --$X'_{mn}$--.

Column 14, Line 43:
Delete the phrase "$X_{mn}'$" and replace with --$X'_{mn}$--.

Column 15, Line 14:
Delete the phrase "$X_{mn}'$" and replace with --$X'_{mn}$--.